United States Patent
Oh

(10) Patent No.: US 12,271,089 B2
(45) Date of Patent: Apr. 8, 2025

(54) VARIABLE-FOCUS VIRTUAL IMAGE DEVICES BASED ON POLARIZATION CONVERSION

(71) Applicant: Magic Leap, Inc., Plantation, FL (US)

(72) Inventor: Chulwoo Oh, Cedar Park, TX (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 18/626,181

(22) Filed: Apr. 3, 2024

(65) Prior Publication Data

US 2024/0248363 A1  Jul. 25, 2024

Related U.S. Application Data

(62) Division of application No. 18/207,607, filed on Jun. 8, 2023, now Pat. No. 11,982,916, which is a division
(Continued)

(51) Int. Cl.
*G02F 1/137* (2006.01)
*F21V 8/00* (2006.01)
(Continued)

(52) U.S. Cl.
CPC ........... *G02F 1/137* (2013.01); *G02B 6/0026* (2013.01); *G02B 6/0055* (2013.01);
(Continued)

(58) Field of Classification Search
None
See application file for complete search history.

(56) References Cited

U.S. PATENT DOCUMENTS 4,991,924 A  *  2/1991  Shankar ............... G02F 1/31
                                                      349/196
5,050,966 A       9/1991  Berman
(Continued)

FOREIGN PATENT DOCUMENTS

CA   2187177 A1   10/1995
CN   1774661 A    5/2006
(Continued)

OTHER PUBLICATIONS

"Deep Learning," Wikipedia, URL=https://en.wikipedia.org.wiki/Deep_learning#Deep_neural_networks, download date Apr. 27, 2016. (40 pages).
(Continued)

*Primary Examiner* — Ryan Crockett
(74) *Attorney, Agent, or Firm* — Seed IP Group LLP

(57) ABSTRACT

Example display devices include a waveguide configured to propagate visible light under total internal reflection in a direction parallel to a major surface of the waveguide. The waveguide has formed thereon an outcoupling element configured to outcouple a portion of the visible light in a direction normal to the major surface of the waveguide. The example display devices additionally include a cholesteric liquid crystal (CLC) reflector disposed on a forward side of said waveguides, said CLC reflector configured to have an optical power or a depth of focus that is adjustable upon application of an electrical signal. The out-coupling element is disposed to extract light from the waveguide and direct at least a portion of said light propagating within said waveguide to the CLC reflector, said light being directed from said CLC reflector back through said waveguide and into said eye to present an image from the optical display into the eye of the wearer.

10 Claims, 58 Drawing Sheets

Related U.S. Application Data of application No. 17/646,094, filed on Dec. 27, 2021, now Pat. No. 11,714,326, which is a division of application No. 16/986,106, filed on Aug. 5, 2020, now Pat. No. 11,215,895, which is a division of application No. 15/902,927, filed on Feb. 22, 2018, now Pat. No. 11,036,109.

(60) Provisional application No. 62/462,850, filed on Feb. 23, 2017.

(51) Int. Cl.
  G02B 26/08 (2006.01)
  G02B 27/01 (2006.01)
  G02F 1/133 (2006.01)
  G02F 1/29 (2006.01)

(52) U.S. Cl.
  CPC ......... *G02B 6/0056* (2013.01); *G02B 6/0076* (2013.01); *G02B 6/0088* (2013.01); *G02B 26/0825* (2013.01); *G02B 27/0172* (2013.01); *G02F 1/13306* (2013.01); *G02F 1/13718* (2013.01); *G02F 1/29* (2013.01); *G02F 2203/07* (2013.01)

(56) References Cited

U.S. PATENT DOCUMENTS

| | | | |
|---|---|---|---|
| 5,082,354 A | | 1/1992 | Kalmanash |
| 5,594,563 A * | | 1/1997 | Larson .................. G02B 5/26 348/E9.027 |
| 5,683,622 A * | | 11/1997 | Kratzschmar ........ G02B 5/3016 252/585 |
| 5,684,497 A | | 11/1997 | Hildebrand et al. |
| 5,808,797 A | | 9/1998 | Bloom et al. |
| 5,966,242 A | | 10/1999 | Yamanaka |
| 6,188,462 B1 | | 2/2001 | Lavrentovich et al. |
| 6,271,696 B1 | | 8/2001 | Kobayashi |
| 6,850,221 B1 | | 2/2005 | Tickle |
| 6,853,491 B1 | | 2/2005 | Ruhle et al. |
| 6,982,818 B2 | | 1/2006 | Riza et al. |
| D514,570 S | | 2/2006 | Ohta |
| 7,372,480 B1 | | 5/2008 | Lavrentovich et al. |
| 7,375,784 B2 * | | 5/2008 | Smith ............... G02F 1/133753 349/193 |
| 7,573,640 B2 | | 8/2009 | Nivon et al. |
| 7,705,943 B2 | | 4/2010 | Kume et al. |
| 8,339,566 B2 | | 12/2012 | Escuti et al. |
| 9,081,426 B2 | | 7/2015 | Armstrong |
| 9,195,092 B2 * | | 11/2015 | Escuti ............... G02F 1/133528 |
| 9,215,293 B2 | | 12/2015 | Miller |
| D752,529 S | | 3/2016 | Loretan et al. |
| 9,345,402 B2 | | 5/2016 | Gao |
| 9,348,143 B2 | | 5/2016 | Gao et al. |
| D759,657 S | | 6/2016 | Kujawski et al. |
| 9,417,452 B2 | | 8/2016 | Schowengerdt et al. |
| 9,470,906 B2 | | 10/2016 | Kaji et al. |
| 9,547,174 B2 | | 1/2017 | Gao et al. |
| 9,671,566 B2 | | 6/2017 | Abovitz et al. |
| D794,288 S | | 8/2017 | Beers et al. |
| 9,740,006 B2 | | 8/2017 | Gao |
| 9,791,700 B2 | | 10/2017 | Schowengerdt |
| D805,734 S | | 12/2017 | Fisher et al. |
| 9,846,967 B2 | | 12/2017 | Schowengerdt |
| 9,851,563 B2 | | 12/2017 | Gao et al. |
| 9,857,591 B2 | | 1/2018 | Welch et al. |
| 9,874,749 B2 | | 1/2018 | Bradski et al. |
| 10,459,231 B2 | | 10/2019 | Miller et al. |
| 10,895,784 B2 | | 1/2021 | Oh et al. |
| 10,962,855 B2 | | 3/2021 | Schowengerdt et al. |
| 10,969,588 B2 | | 4/2021 | Samec et al. |
| 10,983,351 B2 | | 4/2021 | Samec et al. |
| 11,036,109 B2 | | 6/2021 | Oh |
| 11,106,041 B2 | | 8/2021 | Miller et al. |
| 11,156,835 B2 | | 10/2021 | Samec et al. |
| 11,215,895 B2 | | 1/2022 | Oh |
| 11,256,097 B2 | | 2/2022 | Tominaga et al. |
| 11,269,144 B2 | | 3/2022 | Oh et al. |
| 11,300,844 B2 | | 4/2022 | Schowengerdt et al. |
| 11,681,153 B2 | | 6/2023 | Lin et al. |
| 2003/0147112 A1 | | 8/2003 | Mukawa |
| 2004/0108971 A1 | | 6/2004 | Waldern et al. |
| 2004/0184163 A1 * | | 9/2004 | Nishioka ............... G02B 13/007 359/726 |
| 2004/0189901 A1 * | | 9/2004 | Kim ....................... G02F 1/1335 349/114 |
| 2005/0123229 A1 | | 6/2005 | Huck et al. |
| 2005/0253112 A1 | | 11/2005 | Kelly et al. |
| 2005/0264502 A1 | | 12/2005 | Sprague et al. |
| 2006/0028436 A1 | | 2/2006 | Armstrong |
| 2006/0132914 A1 | | 6/2006 | Weiss et al. |
| 2006/0181769 A1 | | 8/2006 | Kumasawa et al. |
| 2006/0227283 A1 | | 10/2006 | Ooi et al. |
| 2007/0008624 A1 | | 1/2007 | Hirayama |
| 2007/0081123 A1 | | 4/2007 | Lewis |
| 2007/0268234 A1 | | 11/2007 | Wakabayashi et al. |
| 2008/0043334 A1 | | 2/2008 | Itzkovitch et al. |
| 2008/0169479 A1 | | 7/2008 | Xu et al. |
| 2009/0195751 A1 | | 8/2009 | Hillis et al. |
| 2009/0275819 A1 | | 11/2009 | Miwa |
| 2010/0097549 A1 | | 4/2010 | Ishikawa et al. |
| 2010/0177113 A1 * | | 7/2010 | Gay ..................... G02B 30/27 359/484.04 |
| 2012/0086903 A1 | | 4/2012 | Escuti et al. |
| 2012/0127062 A1 | | 5/2012 | Bar-Zeev et al. |
| 2012/0127577 A1 | | 5/2012 | Desserouer |
| 2012/0194554 A1 | | 8/2012 | Kaino et al. |
| 2012/0242918 A1 * | | 9/2012 | Valyukh ............... G02F 1/13718 349/33 |
| 2013/0082922 A1 | | 4/2013 | Miller |
| 2013/0100362 A1 | | 4/2013 | Saeedi et al. |
| 2013/0117377 A1 | | 5/2013 | Miller |
| 2013/0125027 A1 | | 5/2013 | Abovitz |
| 2013/0169909 A1 | | 7/2013 | Srivastava et al. |
| 2013/0208234 A1 | | 8/2013 | Lewis |
| 2013/0242262 A1 | | 9/2013 | Lewis |
| 2013/0250380 A1 | | 9/2013 | Fujikawa et al. |
| 2013/0300635 A1 | | 11/2013 | White et al. |
| 2013/0322810 A1 | | 12/2013 | Robbins |
| 2014/0003762 A1 | | 1/2014 | Macnamara |
| 2014/0016051 A1 | | 1/2014 | Kroll et al. |
| 2014/0055740 A1 * | | 2/2014 | Spaulding ............... G02C 7/04 351/159.02 |
| 2014/0071539 A1 | | 3/2014 | Gao |
| 2014/0140654 A1 | | 5/2014 | Brown et al. |
| 2014/0177023 A1 | | 6/2014 | Gao et al. |
| 2014/0218468 A1 | | 8/2014 | Gao et al. |
| 2014/0232993 A1 | | 8/2014 | Kim |
| 2014/0240834 A1 | | 8/2014 | Mason |
| 2014/0267420 A1 | | 9/2014 | Schowengerdt et al. |
| 2014/0306866 A1 | | 10/2014 | Miller et al. |
| 2015/0002528 A1 | | 1/2015 | Bohn et al. |
| 2015/0016777 A1 | | 1/2015 | Abovitz et al. |
| 2015/0087924 A1 | | 3/2015 | Li et al. |
| 2015/0103306 A1 | | 4/2015 | Kaji et al. |
| 2015/0168731 A1 * | | 6/2015 | Robbins ................. G06T 19/006 345/8 |
| 2015/0178939 A1 * | | 6/2015 | Bradski ................. H04N 13/00 345/633 |
| 2015/0185475 A1 | | 7/2015 | Saarikko et al. |
| 2015/0205126 A1 * | | 7/2015 | Schowengerdt ........ G06T 15/00 345/633 |
| 2015/0222883 A1 | | 8/2015 | Welch |
| 2015/0222884 A1 | | 8/2015 | Cheng |
| 2015/0234205 A1 | | 8/2015 | Schowengerdt |
| 2015/0235431 A1 | | 8/2015 | Schowengerdt |
| 2015/0248786 A1 * | | 9/2015 | Schowengerdt .......... G06T 7/50 345/633 |
| 2015/0268415 A1 | | 9/2015 | Schowengerdt et al. |
| 2015/0277123 A1 | | 10/2015 | Chaum et al. |
| 2015/0293409 A1 * | | 10/2015 | Usukura ................ G02F 1/1337 349/123 |

(56) References Cited

U.S. PATENT DOCUMENTS

| | | | |
|---|---|---|---|
| 2015/0302652 A1* | 10/2015 | Miller | G06T 13/80 |
| | | | 345/419 |
| 2015/0309263 A2 | 10/2015 | Abovitz et al. | |
| 2015/0326570 A1 | 11/2015 | Publicover et al. | |
| 2015/0346490 A1 | 12/2015 | Tekolste et al. | |
| 2015/0346495 A1 | 12/2015 | Welch et al. | |
| 2015/0378074 A1 | 12/2015 | Kollin et al. | |
| 2016/0011419 A1 | 1/2016 | Gao | |
| 2016/0026253 A1* | 1/2016 | Bradski | H04N 13/128 |
| | | | 345/8 |
| 2016/0033698 A1* | 2/2016 | Escuti | G02F 1/1334 |
| | | | 349/194 |
| 2016/0270656 A1 | 9/2016 | Samec et al. | |
| 2017/0007182 A1* | 1/2017 | Samec | A61B 3/085 |
| 2017/0010466 A1 | 1/2017 | Klug et al. | |
| 2017/0010488 A1 | 1/2017 | Klug et al. | |
| 2017/0269368 A1 | 9/2017 | Yun et al. | |
| 2017/0373459 A1* | 12/2017 | Weng | G02B 27/4261 |
| 2018/0046859 A1 | 2/2018 | Jarvenpaa | |
| 2018/0143485 A1 | 5/2018 | Oh | |
| 2018/0164627 A1 | 6/2018 | Oh | |
| 2018/0239147 A1 | 8/2018 | Schowengerdt et al. | |
| 2018/0239177 A1 | 8/2018 | Oh | |
| 2019/0018247 A1 | 1/2019 | Gao et al. | |
| 2019/0317352 A1 | 10/2019 | Saitoh et al. | |
| 2019/0331922 A1 | 10/2019 | Kim et al. | |
| 2020/0057309 A1 | 2/2020 | Miller et al. | |
| 2020/0073123 A1* | 3/2020 | Martinez | G02B 27/288 |
| 2020/0278547 A1 | 9/2020 | Singer et al. | |
| 2020/0393709 A1 | 12/2020 | Oh | |
| 2020/0409159 A1 | 12/2020 | Samec | |
| 2021/0240018 A1 | 8/2021 | Schowengerdt et al. | |
| 2021/0286180 A1 | 9/2021 | Samec et al. | |
| 2021/0389593 A1 | 12/2021 | Miller et al. | |
| 2022/0121046 A1 | 4/2022 | Oh | |

FOREIGN PATENT DOCUMENTS

| | | |
|---|---|---|
| CN | 1930510 A | 3/2007 |
| CN | 101589326 A | 11/2009 |
| CN | 101945612 A | 1/2011 |
| CN | 104737061 A | 6/2015 |
| CN | 105911697 A | 8/2016 |
| CN | 205485048 U | 8/2016 |
| DE | 102017126908 A1 | 5/2019 |
| EP | 0415735 A2 | 3/1991 |
| EP | 2918402 A1 | 9/2015 |
| JP | H02132411 A | 5/1990 |
| JP | H03144419 A | 6/1991 |
| JP | H0818896 A | 1/1996 |
| JP | H10511190 A | 10/1998 |
| JP | 2000180785 A | 6/2000 |
| JP | 2004247947 A | 9/2004 |
| JP | 2006227581 A | 8/2006 |
| JP | 2009268778 A | 11/2009 |
| JP | 2012505430 A | 3/2012 |
| JP | 2012155655 A | 8/2012 |
| JP | 2015504616 A | 2/2015 |
| JP | 2015525365 A | 9/2015 |
| JP | 2015528919 A | 10/2015 |
| JP | 2016519327 A | 6/2016 |
| JP | 2017500605 A | 1/2017 |
| KR | 20040101315 A | 12/2004 |
| KR | 20130130735 A | 12/2013 |
| KR | 20130139280 A | 12/2013 |
| KR | 20160147636 A | 12/2016 |
| KR | 20170015374 A | 2/2017 |
| WO | WO 2005088384 A1 | 9/2005 |
| WO | WO 2012078410 A1 | 6/2012 |
| WO | WO 2012118573 A1 | 9/2012 |
| WO | WO 2014159045 A1 | 10/2014 |
| WO | WO 2015145119 A1 | 10/2015 |
| WO | WO 2015157482 A1 | 10/2015 |
| WO | WO 2016025443 A1 | 2/2016 |
| WO | WO 2016054092 A1 | 4/2016 |
| WO | WO 2016194961 A1 | 12/2016 |
| WO | WO 2017005608 A1 | 1/2017 |
| WO | WO 2018094079 A1 | 5/2018 |
| WO | WO 2018106963 A1 | 6/2018 |
| WO | WO 2018156779 A1 | 8/2018 |
| WO | WO 2018156784 A1 | 8/2018 |

OTHER PUBLICATIONS

"Deep Learning," Wikipedia, URL=https://en.wikipedia.org.wiki/Deep_learning, download date Oct. 3, 2017. (23 pages).

"Feature Extraction Using Convolution," Ufldl, URL=http://deeplearning.stanford.edu/wiki/index.php/Feature_extraction-using_convolution, printed Sep. 1, 2016. (3 pages).

"Machine Learning," Wikipedia, URL=https://en.wikipedia.org/wiki/Machine_learning, download date Oct. 3, 2017. (14 pages).

Anthony, "MIT releases open-source software that reveals invisible motion and detail in video," *Extreme Tech*, Feb. 2013, as accessed Aug. 4, 2017. (5 pages).

ARToolKit: htpps://web.archive.org/web/20051013062315/http://www.hitl.washington.edu:80/artoolkit/documentation/hardware.htm, archived Oct. 13, 2005.

Aubry et al., "Seeing 3D Chairs: Example Part-Based 2D-3D Alignment Using a Large Dataset of CAD Models," *2014 IEEE Conference on Computer Vision and Pattern Recognition*, Columbus, Ohio, USA, Jun. 23-28, 2014, Computer Vision Foundation—Open Acces Version, Jun. 23-28, 2017. (8 pages).

Azuma, "A Survey of Augmented Reality," *In Presence: Teleoperators and Virtual Environments* 6(4):355-385, http://www.cs.unc.edu/~azuma, Aug. 1997.

Azuma, "Predictive Tracking for Augmented Reality," Dissertation, TR95-007, Doctor of Philosophy, Department of Computer Science, UNC-Chapel Hill, NC, Feb. 1995. (262 pages).

Bimber et al., "Spatial Augmented Reality—Merging Real and Virtual Worlds," 2005. (393 pages).

Carreira et al., "Human Pose Estimation with Iterative Error Feedback," *IEEE Conference on Computer Vision and Pattern Recognition*, Las Vegas, Nevada, USA, Jun. 27-30, 2016, pp. 4733-4742.

Chigrinov, "Photoaligning and Photopatterning Technology: Applications in Displays and Photonics", *Proceedings of SPIE, Emerging Liquid Crystal Technologies I, vol. 9769*, Mar. 2016. (11 pages).

Choy et al., "3D-R2N2: A Unified Approach for Single and Multi-view 3D Object Reconstruction," arXiv, e-print arXiv:1604.00449v1, Apr. 2016. (17 pages).

Collet et al., "The MOPED Framework: Object Recognition and Pose Estimation for Manipulation," *The International Journal of Robotics Research* 30(10), Sep. 2011, preprint Apr. 2011. (22 pages).

Crawford et al., "Liquid-Crystal Diffraction Gratings Using Polarization Holography Alighnment Techniques," *Journal of Applied Physics* 98(123102), 2005.

Dai et al., "Instance-aware Semantic Segmentation via Multi-task Network Cascades," *IEEE Conference on Computer Vision and Pattern Recognition (CVPR)*, Las Vegas, Nevada, USA, Jun. 27-30, 2016, pp. 3150-3158.

Dierking, "Chiral Liquid Crystals: Structures, Phases, Effects," *Symmetry* 6(2):444-472, Jun. 2014.

Escuti et al., "39.4: Polarization—Independent Switching with High Contrast From a Liquid Crystal Polarization Grating," *SID Symposium Digest, vol. 37*, Jun. 2006. (6 pages).

Escuti et al., "Polarization—Independent LC Microdisplays Using Liquid Crystal Polarization Gratings: A Viable Solution," ILCC presentation, Jul. 1, 2008. (15 pages).

Everingham et al., "The PASCAL Visual Object Classes (VOC) Challenge," International Journal of Computer Vision 88(2), Jun. 2010. (35 pages).

International Preliminary Report on Patentability, dated Aug. 27, 2019, for International Application No. PCT/US18/19250. (10 pages).

International Preliminary Report on Patentability, dated Aug. 27, 2019, for International Application No. PCT/US18/19257. (6 pages).

(56) References Cited

OTHER PUBLICATIONS

International Search Report and Written Opinion, dated Apr. 6, 2018, for International Application No. PCT/US2017/65182. (16 pages).

International Search Report and Written Opinion, dated Jan. 25, 2018, for International Application No. PCT/US2017/062063. (13 pages).

International Search Report and Written Opinion, dated Jul. 2, 2018, for International Application No. PCT/US18/19257. (17 pages).

International Search Report and Written Opinion, dated Jun. 22, 2018, for International Application No. PCT/US2018/023425. (22 pages).

International Search Report and Written Opinion, dated Jun. 29, 2018, for International Application No. PCT/US18/19250. (23 pages).

Invitation to Pay Additional Fees and, Where Applicable, Protest Fee, dated Feb. 14, 2018, for International Application No. PCT/US2017/65182. (3 pages).

Invitation to Pay Additional Fees and, Where Applicable, Protest Fee, dated May 2, 2018, for International Application No. PCT/US18/19250, mailed May 2, 2018. (3 pages).

Invitation to Pay Additional Fees and, Where Applicable, Protest Fee, dated May 3, 2018, for International Application No. PCT/US18/19257. (3 pages).

Jacob, "Eye Tracking in Advanced Interface Design," *Virtual Environments and Advanced Interface Design, ed.* by W Barfield and TA Furness, Oxford University Press, New York, Human-Computer Interaction Lab Naval Research Laboratory, Washington, D.C., 1995, pp. 258-288.

Kar et al., "Category-specific Object Reconstruction from a Single Image," IEEE Conference on Computer Vision and Pattern Recognition (CVPR), Boston, MA, USA, Jun. 7-12, 2015, pp. 1966-1974.

Kim et al., "Wide-angle Nonmechanical Beam Steering with High Throughput Utilizing Polarization Gratings," *Applied Optics* 50(17), Jun. 2011. (4 pages).

Komanduri et al., "18:3: Late-News Paper: Polarization Independent Liquid Crystal Microdisplays," *SID Digest* 39(1): 236-239, May 2008.

Komanduri et al., "34.4L: Late-News Paper: Polarization Independent Projection Systems Using Thin Film Polymer Polarization Gratings and Standard Liquid Crystal Microdisplays," *SID Digest* 40(1), Jun. 2009. (4 pages).

Komanduri et al., "Elastic Continuum Analysis of the Liquid Crystal Polarization Grating," *Physical review. E, Statistical, non linear, and soft matter physics*, May 2007. (8 pages).

Komanduri et al., "Multi-twist Retarders: Broadband Retaration Control Using Self-Aligning Reactive Liquid Crystal Layers," *Optical Society of America, Optics Express* 21(1), pp. 404-420, Jan. 2013.

Komanduri et al., "Polarization Independent Projection Systems Using Thin Film Polymer Polarization Gratings and Standard Liquid Crystal Microdisplays," SID-Display week presentation, Jun. 2009. (12 pages).

Komanduri et al., "Polarization-Independent Modulation for Projection Displays Using Small-Period LC Polarization Gratings," *Journal of the Society for Information Display* 15(8): 589-594, Aug. 2007.

Kurioz et al., "P-128: Orientation of a Reactive Mesogen on Photosensitive Surface," Society for Information Display (SID) Symposium Digest of Technical Papers 38(1): 688-690, May 2007.

Lee et al., "Negative Dispersion of Birefringence in Two Dimensionally Self-Organized Smectic Liquid Crystal and Monomer Thin Film," *Optics Letters* 39(17): 5146-5149, Sep. 2014.

Lim et al., "Anisotropic Nano-Imprinting Technique for Fabricating a Patterned Optical Film of a Liquid Crystalline Polymer," *Journal of Nanoscience and Nanotechnology* 8(9): 4775-4778, Sep. 2008.

Lub et al., "Formation of Optical Films by Photo-Polymerisation of Liquid Crystalline Acrylates and Application of These Films in Liquid Crystal Display Technology," *Molecular Crystals and Liquid Crystals* 429(1), May 2005. (24 pages).

Nikolova et al., "Diffraction Efficiency and Selectivity of Polarization Holographic Recording," *Journal of Modern Optics* 31(5): 579-588, May 1984.

Notice of Allowance, dated Oct. 1, 2021, for U.S. Appl. No. 17/020,641. (8 pages).

Oh et al., "16.2: Polarization—Independent Modulation Using Standard Liquid Crystal Microdisplays and Polymer Polarization Gratings," IDRC, 2008. (4 pages).

Oh et al., "Achromatic Diffraction from Polarization Gratings with High Efficiency," *Optics Letters* 33(20): 2287-2289, Oct. 2008 & *Erratum Optics Letters* 34(23): 3637-3637, Dec. 2009.

Oh et al., "Numerical Analysis of Polarization Gratings Using the Finite-Difference Time-Domain Method," *Physical Review A, Atomic, Molecular and Optical Physics* 76(4), Oct. 2007. (8 pages).

Oh et al., "Polarization—Independent Modulation Using Standard LCDs and Polymer PGs," 2008. (6 pages).

Oh, "Broadband Polarization Gratings for Efficient Liquid Crystal Display, Beam Steering, Spectropolarimetry, and Fresnel Zone Plate," Dissertation, Doctor of Philosophy, North Carolina State University, Electrical Engineering, Raleigh, North Carolina, 2009. (190 pages).

Silva et al., "Angle-Tuned Filters From Cholesteric Liquid-Crystal for Visible Wavelength- Division Multiplexing," IEEE Photonics Technology Letters 26(5): 423-425, Mar. 2014.

Tanriverdi et al., "Interacting with Eye Movements in Virtual Environments," Department of Electrical Engineering and Computer Science, Tufts University, Medford, MA, *ACM CHI 2000 Human Factors in Computing Systems Conference*, The Hague, The Netherlands, Apr. 1-6, 2000, Association for Computing Machinery Press, pp. 265-272.

Xiang et al., "Data-Driven 3D Voxel Patterns for Object Category Recognition," IEEE Conference on Computer Vision and Pattern Recognition, Boston, MA, USA, Jun. 7-12, 2015. (9 pages).

Xiao et al., "Localizing 3D Cuboids in Single-View Images," in Advances in Neural Information Processing Systems 25 (NIPS 2012), Dec. 2012. (9 pages).

Yang et al., "Negative Dispersion of Birefringence of Smectic Liquid Crystal-Polymer Compostie: Dependence on the Constituent Molecules and Temperature," *Optical Society of America, Optics Express* 2466: 23(3), Feb. 2015.

Official Action dated Aug. 27, 2024 for Japanese application No. 2023-195873, 2 pages.

Notice of Allowance dated Sep. 10, 2024, for Japanese application No. 2022-120353, 4 pages.

\* cited by examiner

VARIABLE-FOCUS VIRTUAL IMAGE DEVICES BASED ON POLARIZATION CONVERSION

INCORPORATION BY REFERENCE

This application is a divisional of U.S. patent application Ser. No. 18,207,607, filed Jun. 8, 2023, which is a divisional of U.S. patent application Ser. No. 17/646,094, filed Dec. 27, 2021, now U.S. Pat. No. 11,714,326, which is a divisional of U.S. patent application Ser. No. 16/986,106, filed Aug. 5, 2020, now U.S. Pat. No. 11,215,895, which is a divisional of U.S. patent application Ser. No. 15/902,927, filed Feb. 22, 2018, now U.S. Pat. No. 11,036,109, which claims the benefit of U.S. Provisional Patent Application No. 62/462,850, filed Feb. 23, 2017. The content of each of these applications is incorporated by reference herein in its entirety. The U.S. Provisional Patent Application No. 62/462,850 includes the following sections both of which are incorporated by reference and form a part of this patent application:

1. SECTION I: Specification and Drawings for the portion of the application entitled "DISPLAY SYSTEM WITH VARIABLE POWER REFLECTOR."
2. SECTION II: Specification and Drawings for the portion of the application entitled "VARIABLE-FOCUS VIRTUAL IMAGE DEVICES BASED ON POLARIZATION CONVERSION."

Sections I and II of the U.S. Provisional Patent Application No. 62/462,850 both discuss variable focus or variable power devices and features associated with the components of these devices and both Sections equally form part of the disclosure of this application. Accordingly, various features, elements, structures, methods, etc. described in Section I can be used with, combined with, incorporated into, or are otherwise compatible with features, elements, structures, methods, etc. described in Section II in any combination. Likewise, various features, elements, structures, methods, etc. described in Section II can be used with, combined with, incorporated into, or are otherwise compatible with features, elements, structures, methods, etc. described in Section I in any combination.

This application also incorporates by reference the entirety of each of the following patent applications: U.S. application Ser. No. 14/555,585 filed on Nov. 27, 2014, now U.S. Pat. No. 9,791,700 B2; U.S. application Ser. No. 14/690,401 filed on Apr. 18, 2015, now U.S. Pat. No. 10,262,462 B2; U.S. application Ser. No. 14/212,961 filed on Mar. 14, 2014, now U.S. Pat. No. 9,417,452 B2; and U.S. application Ser. No. 14/331,218 filed on Jul. 14, 2014, now U.S. Pat. No. 9,671,566 B2.

BACKGROUND

Field

The present disclosure relates to display systems and, more particularly, to augmented reality display systems comprising diffractive devices based at least partly on polarization conversion.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 1 is depicted wherein a user of an AR technology sees a real-world park-like setting 1100 featuring people, trees, buildings in the background, and a concrete platform 1120. In addition to these items, the user of the AR technology also perceives that he "sees" "virtual content" such as a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

This application includes discussions of systems and methods that can be employed to provide variable optical power. Variable focus or variable power devices may find application in certain head mounted display devices that project images as if the images originated from different depths. By changing the optical power of an optical element in the head mounted display device, images presented to the wearer of the head mounted display device appear as if located at different distances from the wearer. The variable focus or variable power optical device can thus be modulated to cause different image content to be displayed as if the image content is situated at different locations with respect to the user. Some variable power elements comprise reflectors comprising movable membranes. Other variable power elements comprise liquid crystal switchable devices that can switch between optical power levels using switchable liquid crystal elements. Some variable focus devices described herein utilize the polarization properties of light to facilitate switching from one focus to another.

In an aspect, a display device comprises a waveguide configured to propagate visible light under total internal reflection in a direction parallel to a major surface of the waveguide; an outcoupling element formed on the waveguide and configured to outcouple a portion of the visible light in a direction normal to the major surface of the waveguide. The display device additionally comprises a polarization-selective notch reflector disposed on a first side of the waveguide and configured to reflect visible light having a first polarization while transmitting the portion of the visible light having a second polarization. The display device further comprises a polarization-independent notch reflector disposed on a second side of the waveguide and configured to reflect visible light having the first polarization and the second polarization, wherein the polarization-independent notch reflector is configured to convert a polarization of visible light reflecting therefrom.

In another aspect, a display device comprises a wave-guiding device interposed between a first switchable lens and a second switchable lens, wherein the wave-guiding device comprises one or more cholesteric liquid crystal (CLC) layers each comprising a plurality of chiral structures, wherein each chiral structure comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light. The wave-guiding device additionally includes one or more waveguides formed over the one or more CLC layers and configured to propagate visible light under total internal reflection (TIR) in a direction parallel to a major surface of the waveguide and to optically couple visible light to or from the one or more CLC layers.

In another aspect, a display device configured to display an image to an eye of a user comprises an optical display. The optical display has a forward side and a rearward side, where the rearward side is closer to the eye of the user than the forward side. The optical display is configured to output light having a wavelength range toward the rearward side. A first notch reflector is disposed rearward of the optical display, the first notch reflector configured to reflect light having the wavelength range output from the optical display. A second notch reflector is disposed forward of the optical display, the second notch reflector configured to reflect light having the wavelength range. The first notch reflector is configured to substantially transmit light having a first polarization and substantially reflect light having a second polarization that is different from the first polarization. The second notch reflector is configured to convert light incident on a rearward face having the second polarization to the first polarization and to redirect the light rearward.

In another aspect, a dynamically focused display system comprises a display configured to output circularly polarized light in a first circular polarization state. The display is disposed along an optical axis and has a forward side and a rearward side, the rearward side closer to the eye of the user than the forward side, the optical display configured to output light having a wavelength range toward the rearward side. A first switchable optical element is disposed along the optical axis, the first switchable optical element configured to change the circular polarization state of light transmitted through the first switchable optical element from the first circular polarization state to a second, different, circular polarization state. A first cholesteric liquid crystal (CLC) lens is disposed forward of the first switchable optical element along the optical axis. A second switchable optical element is disposed forward of the first CLC lens along the optical axis, the second switchable optical element configured to change the circular polarization state of light transmitted through the second switchable optical element from the first circular polarization state to a second, different, circular polarization state. A second CLC lens disposed forward of the second switchable optical element along the optical axis. A controller is configured to electronically switch the states of the first and the second switchable optical elements to dynamically select either the first CLC lens or the second CLC lens.

In another aspect, aspect, a wearable augmented reality head-mounted display system is configured to pass light from the world forward a wearer wearing the head-mounted system into an eye of the wearer. The wearable augmented reality head mounted display system comprises an optical display configured to output light to form an image; one or more waveguides disposed to receiving said light from said display; a frame configured to dispose the waveguides forward of said eye such that said one or more waveguides have a forward side and a rearward side, said rearward said closer to said eye than said forward side; a cholesteric liquid crystal (CLC) reflector disposed on said forward side of said one or more waveguides, said CLC reflector configured to have an optical power or a depth of focus that is adjustable upon application of an electrical signal; and one or more out-coupling elements disposed with respect to said one or more waveguides to extract light from the one or more waveguides and direct at least a portion of said light propagating within said waveguide to the CLC reflector, said light being directed from said CLC reflector back through said waveguide and into said eye to present an image from the display into the eye of the wearer.

In another aspect, a display device comprises a waveguide configured to propagate visible light under total internal reflection in a direction parallel to a major surface of the waveguide and to outcouple the visible light in a direction normal to the major surface. A notch reflector is configured to reflect visible light having a first polarization, wherein the notch reflector comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Throughout the drawings, reference numbers may be re-used to indicate correspondence between referenced elements. The drawings are provided to illustrate example embodiments described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" display is a display that may be mounted on the head of a viewer.

Figure 2:
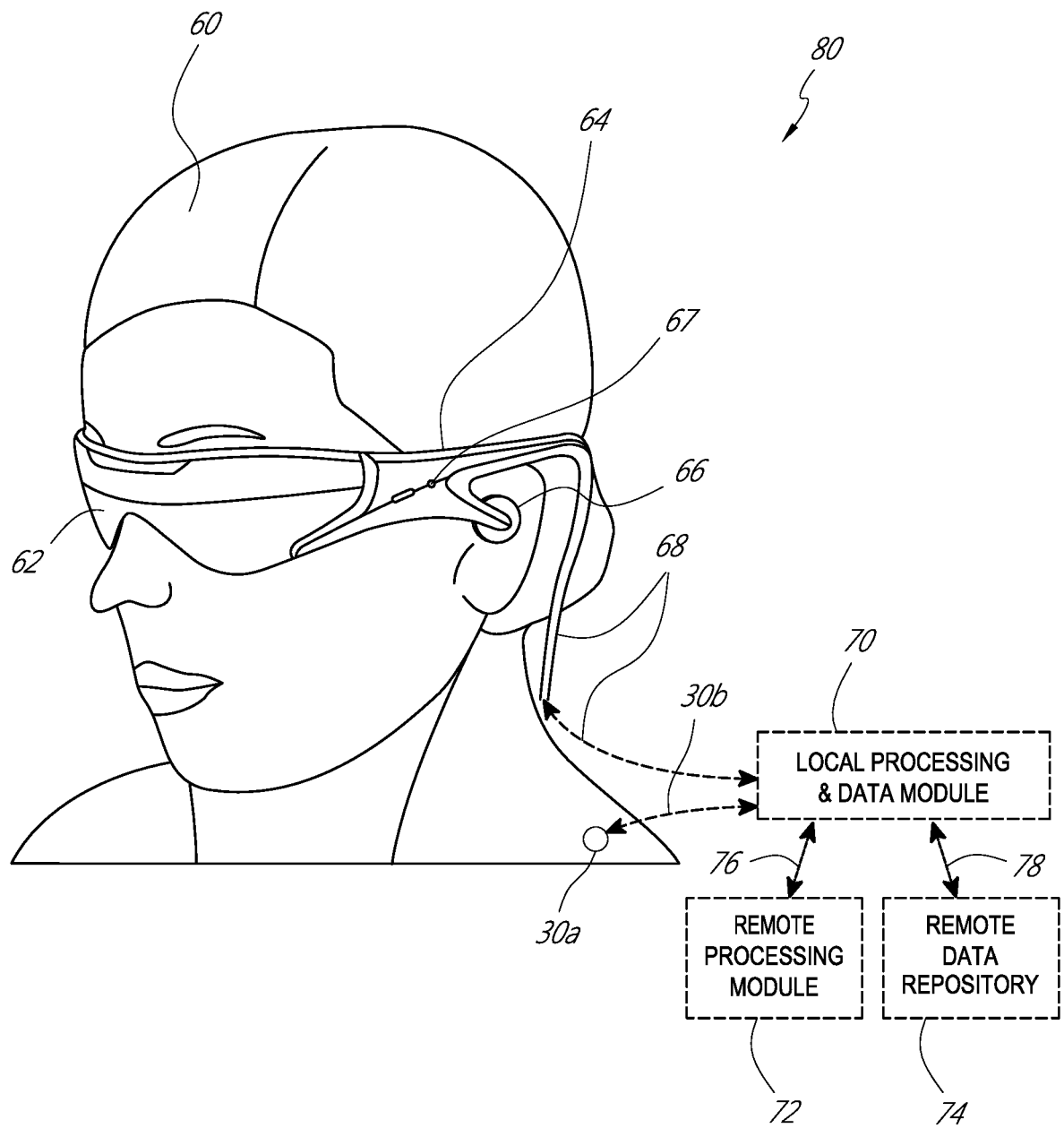
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.), and/or may allow audio communication with other persons (e.g., with other users of similar display systems. The microphone may further be configured as a peripheral sensor to continuously collect audio data (e.g., to passively collect from the user and/or environment). Such audio data may include user sounds such as heavy breathing, or environmental sounds, such as a loud bang indicative of a nearby event. The display system may also include a peripheral sensor 30a, which may be separate from the frame 64 and attached to the body of the user 60 (e.g., on the head, torso, an extremity, etc. of the user 60). The peripheral sensor 30a may be configured to acquire data characterizing the physiological state of the user 60 in some embodiments, as described further herein. For example, the sensor 30a may be an electrode.

With continued reference to FIG. 2, the display 62 is operatively coupled by communications link 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). Similarly, the sensor 30a may be operatively coupled by communications link 30b, e.g., a wired lead or wireless connectivity, to the local processor and data module 70. The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, gyros, and/or other sensors disclosed herein; and/or b) acquired and/or processed using remote processing module 72 and/or remote data repository 74 (including data relating to virtual content), possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the local processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
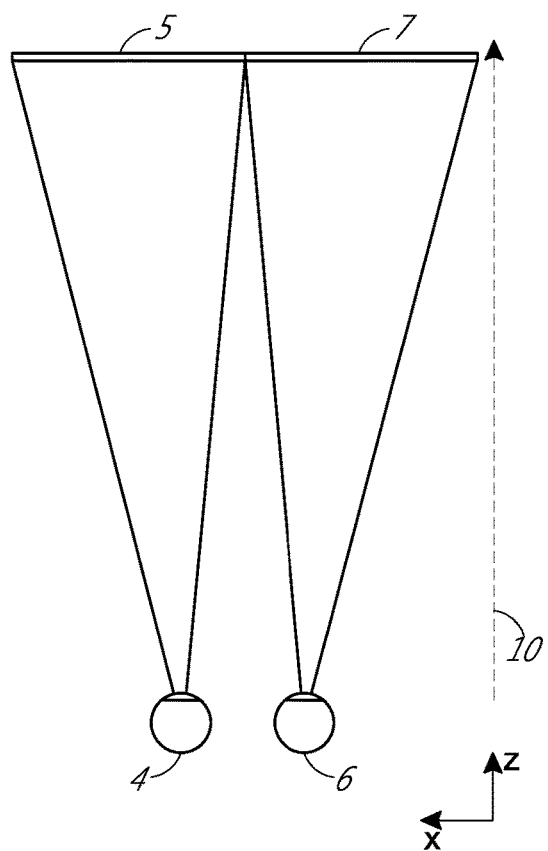
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
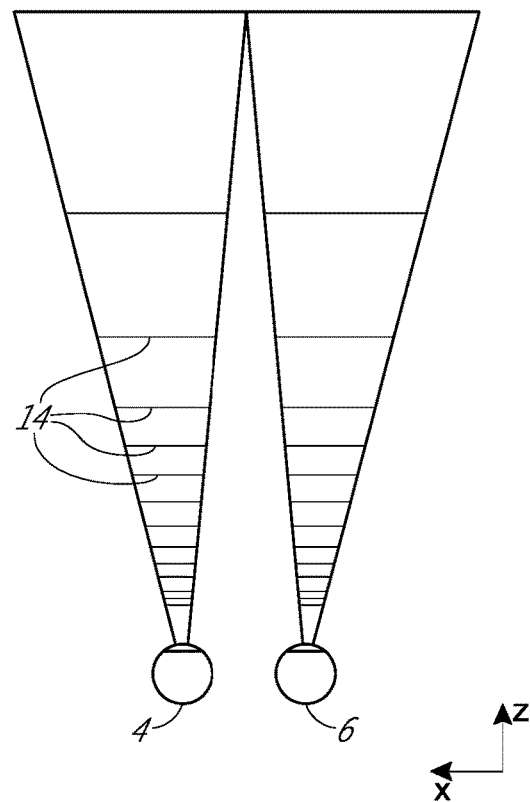
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. In addition, while shown as flat for case of illustration, it will be appreciated that the contours of a depth plane may be curved in physical space, such that all features in a depth plane are in focus with the eye in a particular accommodated state.

Figure 5A:
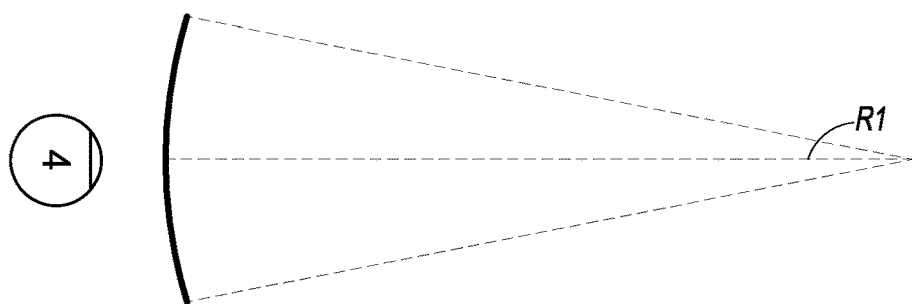
FIGS. 5A-5C illustrate relationships between radius of curvature and focal radius.
Figure 5B:
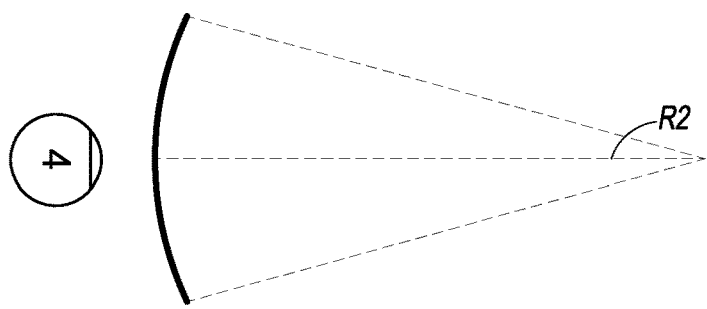
Figure 5C:
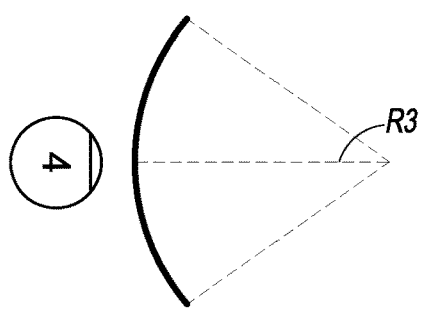

The distance between an object and the eye 4 or 6 may also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
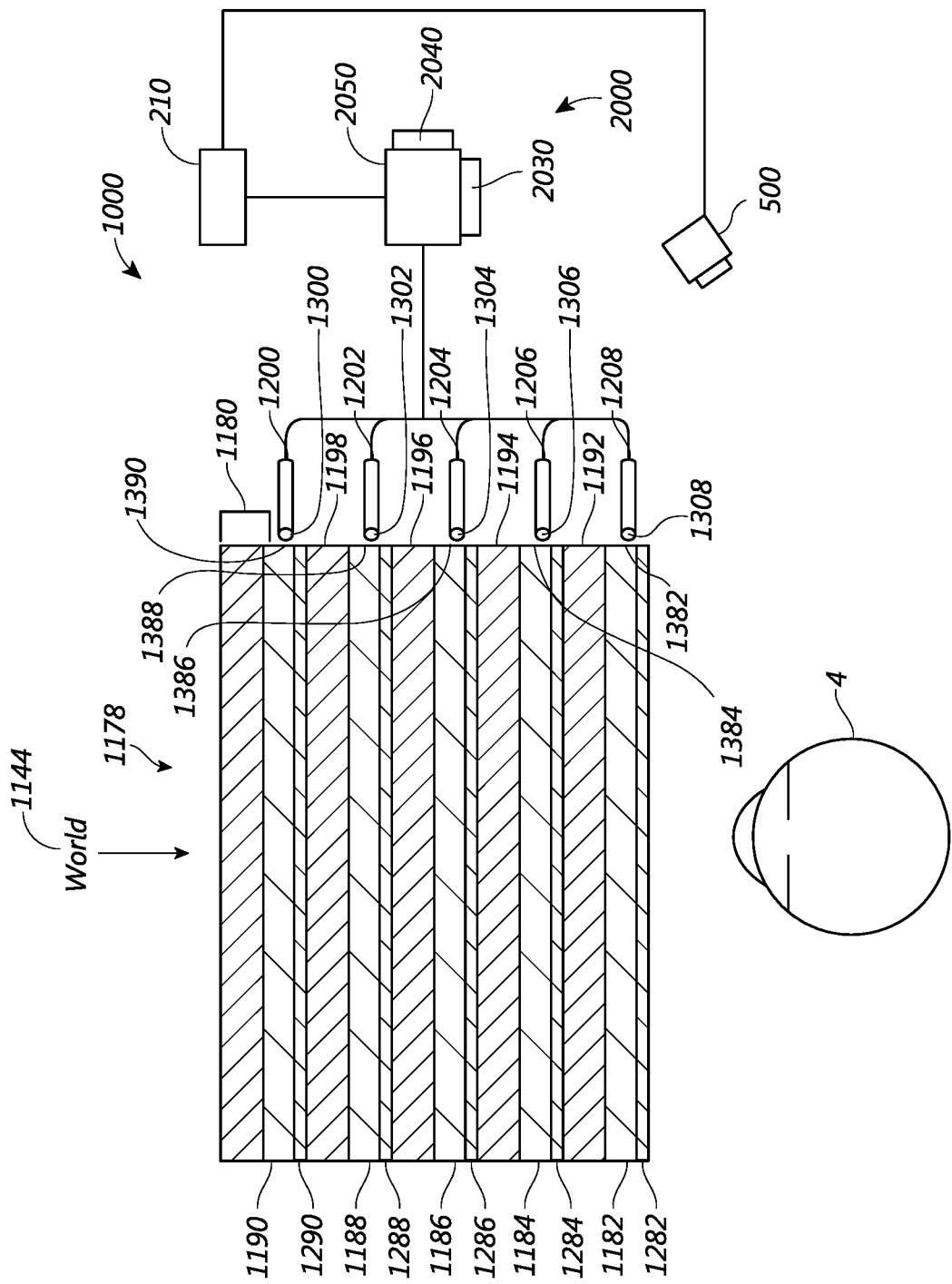
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 1178 that may be utilized to provide three-dimensional perception to the eye/brain using a plurality of waveguides 1182, 1184, 1186, 1188, 1190. In some embodiments, the display system 1000 is the system 80 of FIG. 2, with FIG. 6 schematically showing some parts of that system 80 in greater detail. For example, the waveguide assembly 1178 may be part of the display 62 of FIG. 2. It will be appreciated that the display system 1000 may be considered a light field display in some embodiments.

With continued reference to FIG. 6, the waveguide assembly 1178 may also include a plurality of features 1198, 1196, 1194, 1192 between the waveguides. In some embodiments, the features 1198, 1196, 1194, 1192 may be one or more lenses. The waveguides 1182, 1184, 1186, 1188, 1190 and/or the plurality of lenses 1198, 1196, 1194, 1192 may be configured to send image information to the eye with various levels of wavefront curvature or light ray divergence. Each waveguide level may be associated with a particular depth plane and may be configured to output image information corresponding to that depth plane. Image injection devices 1200, 1202, 1204, 1206, 1208 may function as a source of light for the waveguides and may be utilized to inject image information into the waveguides 1182, 1184, 1186, 1188, 1190, each of which may be configured, as described herein, to distribute incoming light across each respective waveguide, for output toward the eye 4. Light exits an output surface 1300, 1302, 1304, 1306, 1308 of the image injection devices 1200, 1202, 1204, 1206, 1208 and is injected into a corresponding input surface 1382, 1384, 1386, 1388, 1390 of the waveguides 1182, 1184, 1186, 1188, 1190. In some embodiments, the each of the input surfaces 1382, 1384, 1386, 1388, 1390 may be an edge of a corresponding waveguide, or may be part of a major surface of the corresponding waveguide (that is, one of the waveguide surfaces directly facing the world 1144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 1200, 1202, 1204, 1206, 1208 may be associated with and inject light into a plurality (e.g., three) of the waveguides 1182, 1184, 1186, 1188, 1190.

In some embodiments, the image injection devices 1200, 1202, 1204, 1206, 1208 are discrete displays that each produce image information for injection into a corresponding waveguide 1182, 1184, 1186, 1188, 1190, respectively. In some other embodiments, the image injection devices 1200, 1202, 1204, 1206, 1208 are the output ends of a single multiplexed display which may, e.g., pipe image information via one or more optical conduits (such as fiber optic cables) to each of the image injection devices 1200, 1202, 1204, 1206, 1208. It will be appreciated that the image information provided by the image injection devices 1200, 1202, 1204, 1206, 1208 may include light of different wavelengths, or colors (e.g., different component colors, as discussed herein).

In some embodiments, the light injected into the waveguides 1182, 1184, 1186, 1188, 1190 is provided by a light projector system 2000, which comprises a light module 2040, which may include a light emitter, such as a light emitting diode (LED). The light from the light module 2040 may be directed to and modified by a light modulator 2030, e.g., a spatial light modulator, via a beam splitter 2050. The light modulator 2030 may be configured to change the perceived intensity of the light injected into the waveguides 1182, 1184, 1186, 1188, 1190. Examples of spatial light modulators include liquid crystal displays (LCD) including a liquid crystal on silicon (LCOS) displays.

In some embodiments, the display system 1000 may be a scanning fiber display comprising one or more scanning fibers configured to project light in various patterns (e.g., raster scan, spiral scan, Lissajous patterns, etc.) into one or more waveguides 1182, 1184, 1186, 1188, 1190 and ultimately to the eye 4 of the viewer. In some embodiments, the illustrated image injection devices 1200, 1202, 1204, 1206, 1208 may schematically represent a single scanning fiber or a bundles of scanning fibers configured to inject light into one or a plurality of the waveguides 1182, 1184, 1186, 1188, 1190. In some other embodiments, the illustrated image injection devices 1200, 1202, 1204, 1206, 1208 may schematically represent a plurality of scanning fibers or a plurality of bundles of scanning, fibers each of which are configured to inject light into an associated one of the waveguides 1182, 1184, 1186, 1188, 1190. It will be appreciated that the one or more optical fibers may be configured to transmit light from the light module 2040 to the one or more waveguides 1182, 1184, 1186, 1188, 1190. It will be appreciated that one or more intervening optical structures may be provided between the scanning fiber, or fibers, and the one or more waveguides 1182, 1184, 1186, 1188, 1190 to, e.g., redirect light exiting the scanning fiber into the one or more waveguides 1182, 1184, 1186, 1188, 1190.

Figure 1:
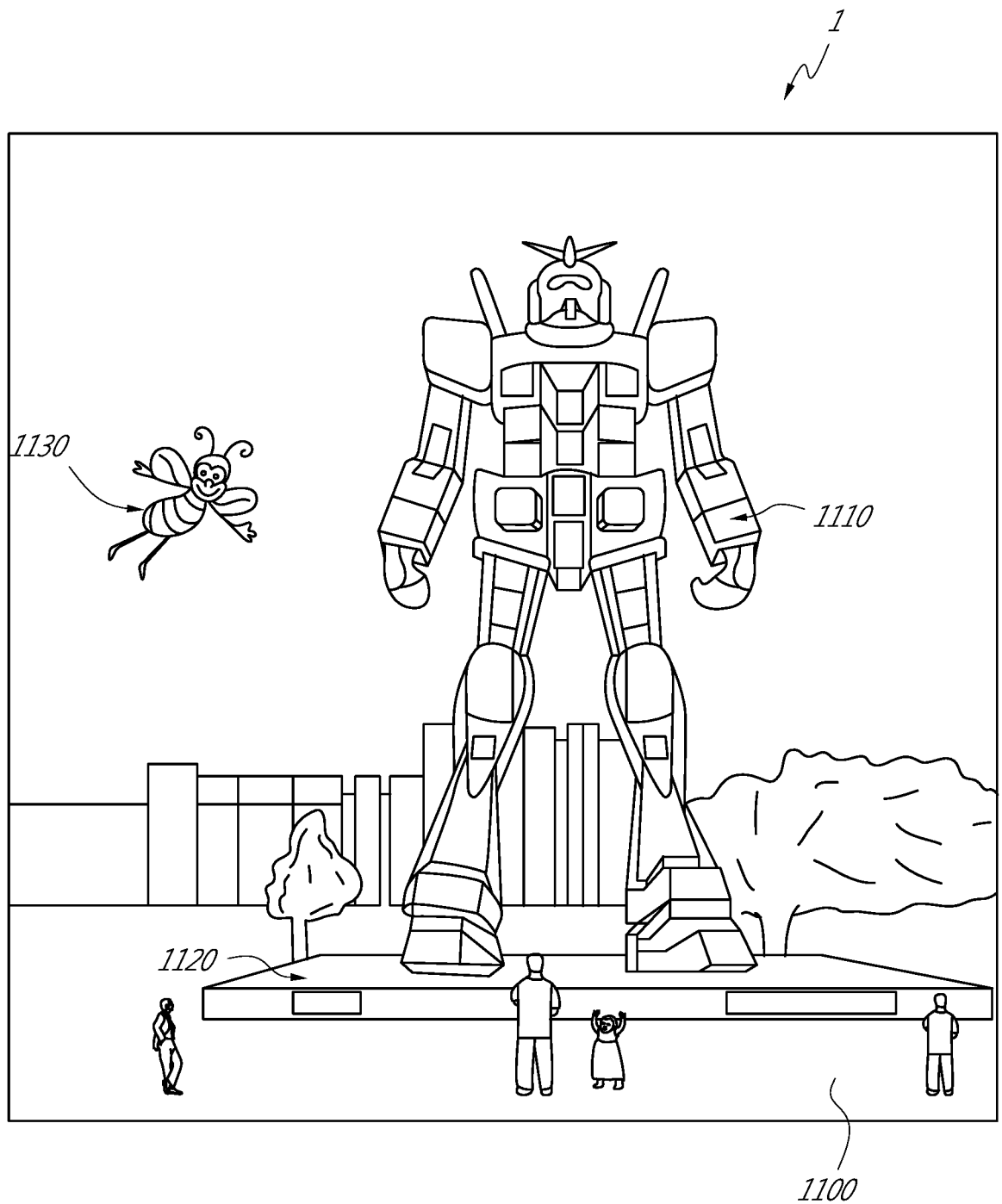
FIG. 1 illustrates a user's view of augmented reality (AR) through an AR device.

A controller 1210 controls the operation of one or more of the stacked waveguide assembly 1178, including operation of the image injection devices 1200, 1202, 1204, 1206, 1208, the light source 2040, and the light modulator 2030. In some embodiments, the controller 1210 is part of the local data processing module 70. The controller 1210 includes programming (e.g., instructions in a non-transitory medium) that regulates the timing and provision of image information to the waveguides 1182, 1184, 1186, 1188, 1190 according to, e.g., any of the various schemes disclosed herein. In some embodiments, the controller may be a single integral device, or a distributed system connected by wired or wireless communication channels. The controller 1210 may be part of the processing modules 70 or 72 (FIG. 1) in some embodiments.

With continued reference to FIG. 6, the waveguides 1182, 1184, 1186, 1188, 1190 may be configured to propagate light within each respective waveguide by total internal reflection (TIR). The waveguides 1182, 1184, 1186, 1188, 1190 may each be planar or have another shape (e.g., curved), with major top and bottom surfaces and edges extending between those major top and bottom surfaces. In the illustrated configuration, the waveguides 1182, 1184, 1186, 1188, 1190 may each include outcoupling optical elements 1282, 1284, 1286, 1288, 1290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The out-coupling optical elements 1282, 1284, 1286, 1288, 1290 may, for example, be gratings, including diffractive optical features, as discussed further herein. While illustrated disposed at the bottom major surfaces of the waveguides 1182, 1184, 1186, 1188, 1190 for case of description and drawing clarity, in some embodiments, the outcoupling optical elements 1282, 1284, 1286, 1288, 1290 may be disposed at the top and/or bottom major surfaces, and/or may be disposed directly in the volume of the waveguides 1182, 1184, 1186, 1188, 1190, as discussed further herein. In some embodiments, the outcoupling optical elements 1282, 1284, 1286, 1288, 1290 may be formed in a layer of material that is attached to a transparent substrate to form the waveguides 1182, 1184, 1186, 1188, 1190. In some other embodiments, the waveguides 1182, 1184, 1186, 1188, 1190 may be a monolithic piece of material and the outcoupling optical elements 1282, 1284, 1286, 1288, 1290 may be formed on a surface and/or in the interior of that piece of material.

With continued reference to FIG. 6, as discussed herein, each waveguide 1182, 1184, 1186, 1188, 1190 is configured to output light to form an image corresponding to a particular depth plane. For example, the waveguide 1182 nearest the eye may be configured to deliver collimated light, as injected into such waveguide 1182, to the eye 4. The collimated light may be representative of the optical infinity focal plane. The next waveguide up 1184 may be configured to send out collimated light which passes through the first lens 1192 (e.g., a negative lens) before it can reach the eye 4; such first lens 1192 may be configured to create a slight convex wavefront curvature so that the eye/brain interprets light coming from that next waveguide up 1184 as coming from a first focal plane closer inward toward the eye 4 from optical infinity. Similarly, the third up waveguide 1186 passes its output light through both the first 1192 and second 1194 lenses before reaching the eye 4; the combined optical power of the first 1192 and second 1194 lenses may be configured to create another incremental amount of wavefront curvature so that the eye/brain interprets light coming from the third waveguide 1186 as coming from a second focal plane that is even closer inward toward the person from optical infinity than was light from the next waveguide up 1184.

The other waveguide layers 1188, 1190 and lenses 1196, 1198 are similarly configured, with the highest waveguide 1190 in the stack sending its output through all of the lenses between it and the eye for an aggregate focal power representative of the closest focal plane to the person. To compensate for the stack of lenses 1198, 1196, 1194, 1192 when viewing/interpreting light coming from the world 1144 on the other side of the stacked waveguide assembly 1178, a compensating lens layer 1180 may be disposed at the top of the stack to compensate for the aggregate power of the lens stack 1198, 1196, 1194, 1192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 1182, 1184, 1186, 1188, 1190 may have the same associated depth plane. For example, multiple waveguides 1182, 1184, 1186, 1188, 1190 may be configured to output images set to the same depth plane, or multiple subsets of the waveguides 1182, 1184, 1186, 1188, 1190 may be configured to output images set to the same plurality of depth planes, with one set for each depth plane. This can provide advantages for forming a tiled image to provide an expanded field of view at those depth planes.

With continued reference to FIG. 6, the outcoupling optical elements 1282, 1284, 1286, 1288, 1290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 1282, 1284, 1286, 1288, 1290, which output light with a different amount of divergence depending on the associated depth plane. In some embodiments, the light extracting optical elements 1282, 1284, 1286, 1288, 1290 may be volumetric or surface features, which may be configured to output light at specific angles. For example, the light extracting optical elements 1282, 1284, 1286, 1288, 1290 may be volume holograms, surface holograms, and/or diffraction gratings. In some embodiments, the features 1198, 1196, 1194, 1192 may not be lenses; rather, they may simply be spacers (e.g., cladding layers and/or structures for forming air gaps).

In some embodiments, the outcoupling optical elements 1282, 1284, 1286, 1288, 1290 are diffractive features that form a diffraction pattern, or "diffractive optical element" (also referred to herein as a "DOE"). Preferably, the DOE's have a sufficiently low diffraction efficiency (a ratio of diffracted beam intensity to the incident beam intensity) so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 500 (e.g., a digital camera, including visible light and infrared light cameras) may be provided to capture images of the eye 4 and/or tissue around the eye 4 to, e.g., detect user inputs and/or to monitor the physiological state of the user. As used herein, a camera may be any image capture device. In some embodiments, the camera assembly 500 may include an image capture device and a light source to project light (e.g., infrared light) to the eye, which may then be reflected by the eye and detected by the image capture device. In some embodiments, the camera assembly 500 may be attached to the frame 64 (FIG. 2) and may be in electrical communication with the processing modules 70 and/or 72, which may process image information from the camera assembly 500 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 500 may be utilized for each eye, to separately monitor each eye.

Figure 7:
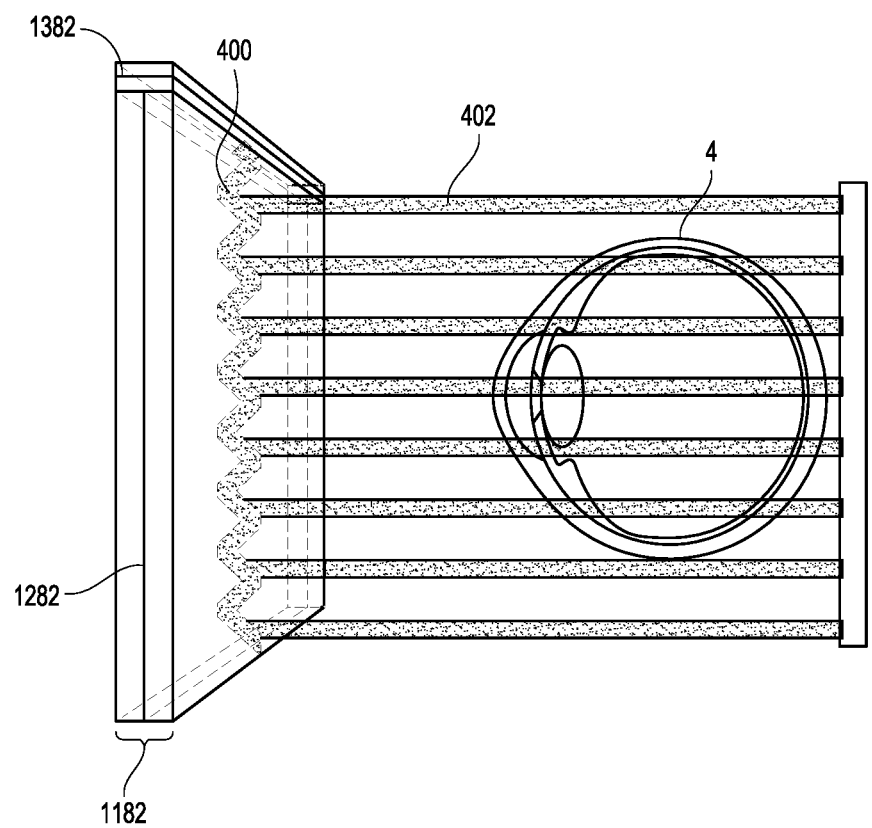
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 1178 (FIG. 6) may function similarly, where the waveguide assembly 1178 includes multiple waveguides. Light 400 is injected into the waveguide 1182 at the input surface 1382 of the waveguide 1182 and propagates within the waveguide 1182 by TIR. At points where the light 400 impinges on the DOE 1282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 1182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
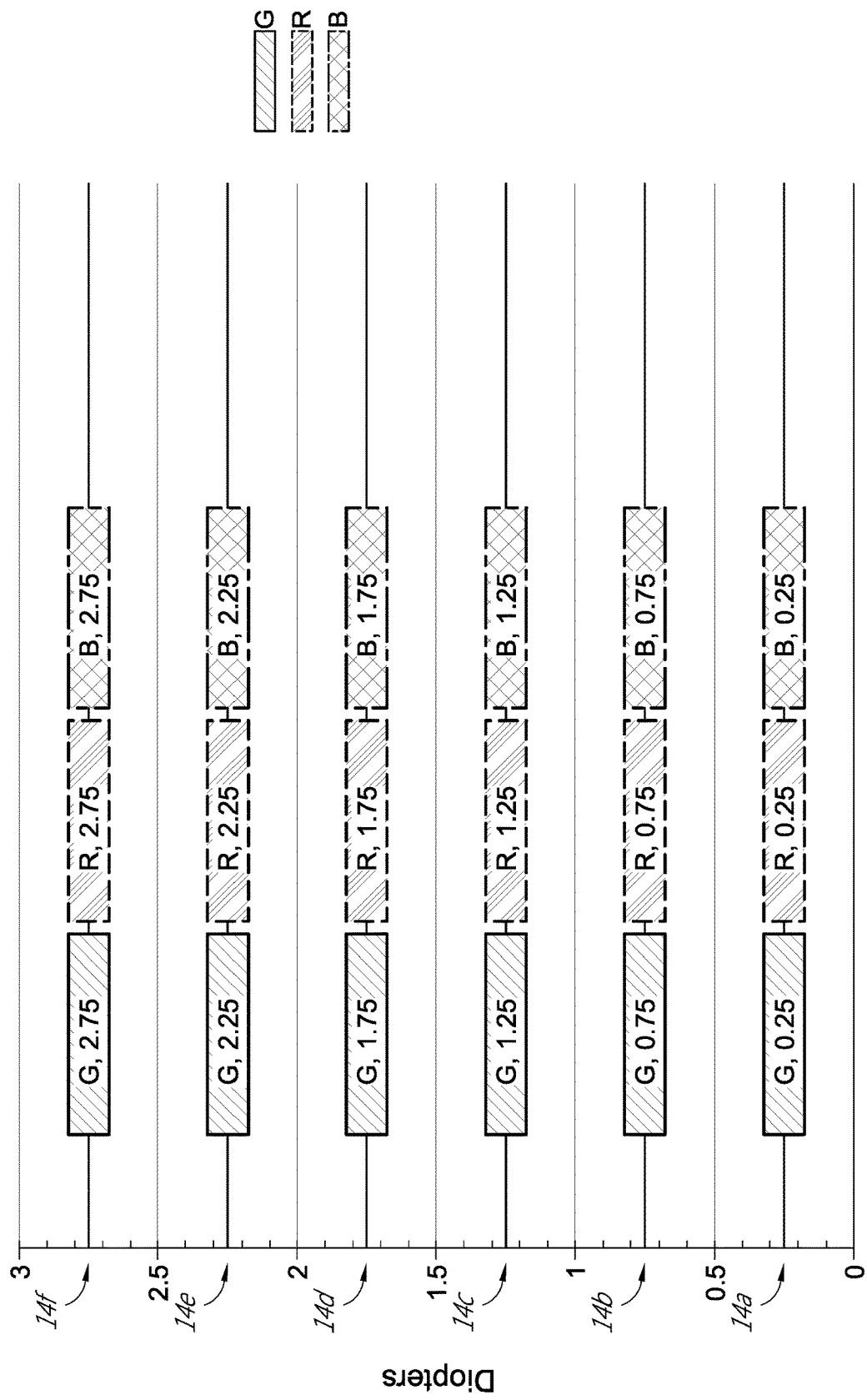
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (l/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for case of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 198, 196, 194, and 192 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 2040 (FIG. 6) may be configured to emit light of one or more wavelengths outside the visual perception range of the viewer, for example, infrared and/or ultraviolet wavelengths. In addition, the incoupling, outcoupling, and other light redirecting structures of the waveguides of the display 1000 may be configured to direct and emit this light out of the display towards the user's eye 4, e.g., for imaging and/or user stimulation applications.

Figure 9A:
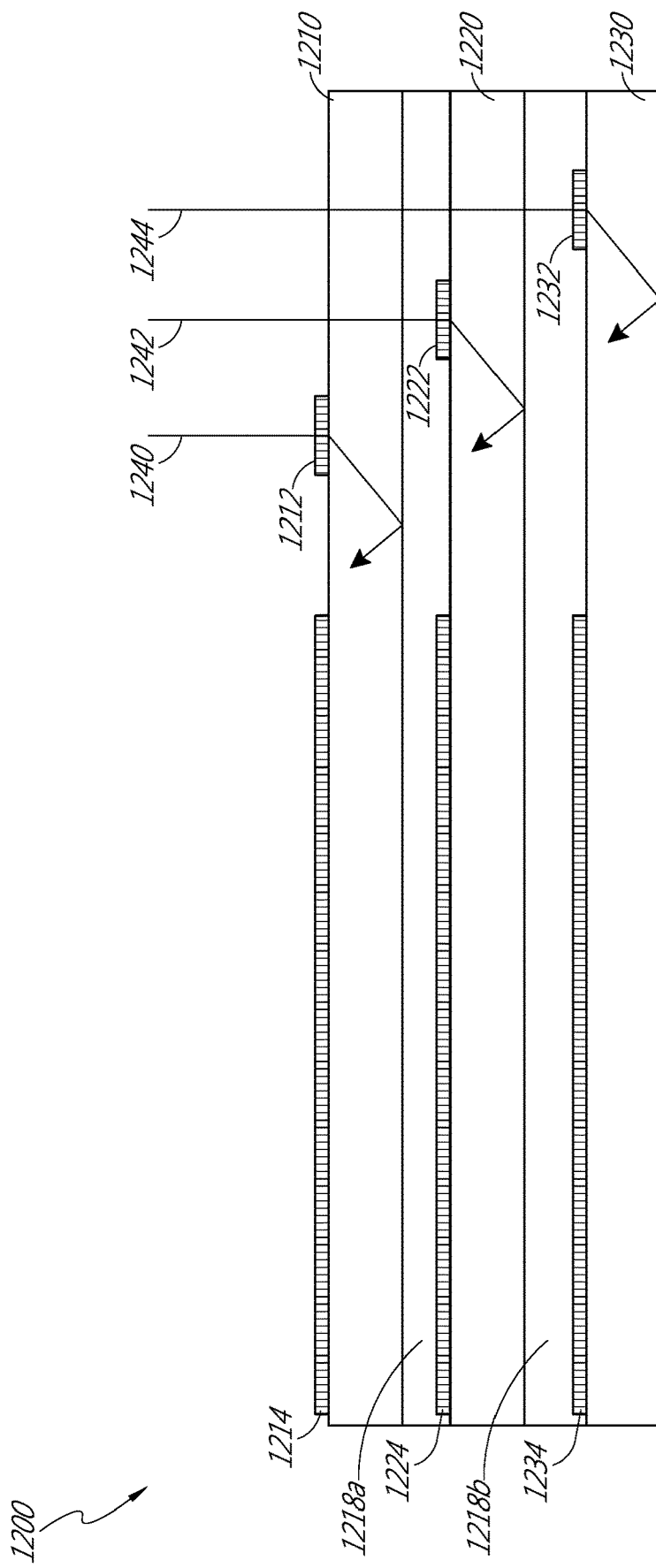
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 1178 (FIG. 6) and the illustrated waveguides of the stack 1200 may correspond to part of the plurality of waveguides 1182, 1184, 1186, 1188, 1190, except that light from one or more of the image injection devices 1200, 1202, 1204, 1206, 1208 is injected into the waveguides from a position that requires light to be redirected for in-coupling.

The illustrated set 1200 of stacked waveguides includes waveguides 1210, 1220, and 1230. Each waveguide includes an associated incoupling optical element (which may also be referred to as a light input area on the waveguide), with, e.g., incoupling optical element 1212 disposed on a major surface (e.g., an upper major surface) of waveguide 1210, incoupling optical element 1224 disposed on a major surface (e.g., an upper major surface) of waveguide 1220, and incoupling optical element 1232 disposed on a major surface (e.g., an upper major surface) of waveguide 1230. In some embodiments, one or more of the in-coupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 1200, 1202, 1204, 1206, and 1208 as shown in FIG. 6, and may be separated (e.g., laterally spaced apart) from other in-coupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by, e.g., gas, liquid, and/or solid layers of material. For example, as illustrated, layer 1218a may separate waveguides 1210 and 1220; and layer 1218b may separate waveguides 1220 and 1230. In some embodiments, the layers 1218a and 1218b are formed of low refractive index materials (that is, materials having a lower refractive index than the material forming the immediately adjacent one of waveguides 1210, 1220, 1230). Preferably, the refractive index of the material forming the layers 1218a, 1218b is 0.05 or more, or 0.10 or more less than the refractive index of the material forming the waveguides 1210, 1220, 1230. Advantageously, the lower refractive index layers 1218a, 1218b may function as cladding layers that facilitate total internal reflection (TIR) of light through the waveguides 1210, 1220, 1230 (e.g., TIR between the top and bottom major surfaces of each waveguide). In some embodiments, the layers 1218a, 1218b are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218a, 1218b are similar or the same. In some embodiments, the material forming the waveguides 1210, 1220, 1230 may be different between one or more waveguides, and/or the material forming the layers 1218a, 1218b may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 1200, 1202, 1204, 1206, 1208 (FIG. 6).

In some embodiments, the light rays 1240, 1242, 1244 have different properties, e.g., different wavelengths or different ranges of wavelengths, which may correspond to different colors. The incoupling optical elements 1212, 122, 1232 each deflect the incident light such that the light propagates through a respective one of the waveguides 1210, 1220, 1230 by TIR.

For example, incoupling optical element 1212 may be configured to deflect ray 1240, which has a first wavelength or range of wavelengths. Similarly, the transmitted ray 1242 impinges on and is deflected by the incoupling optical element 1222, which is configured to deflect light of a second wavelength or range of wavelengths. Likewise, the ray 1244 is deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234.

Figure 9B:
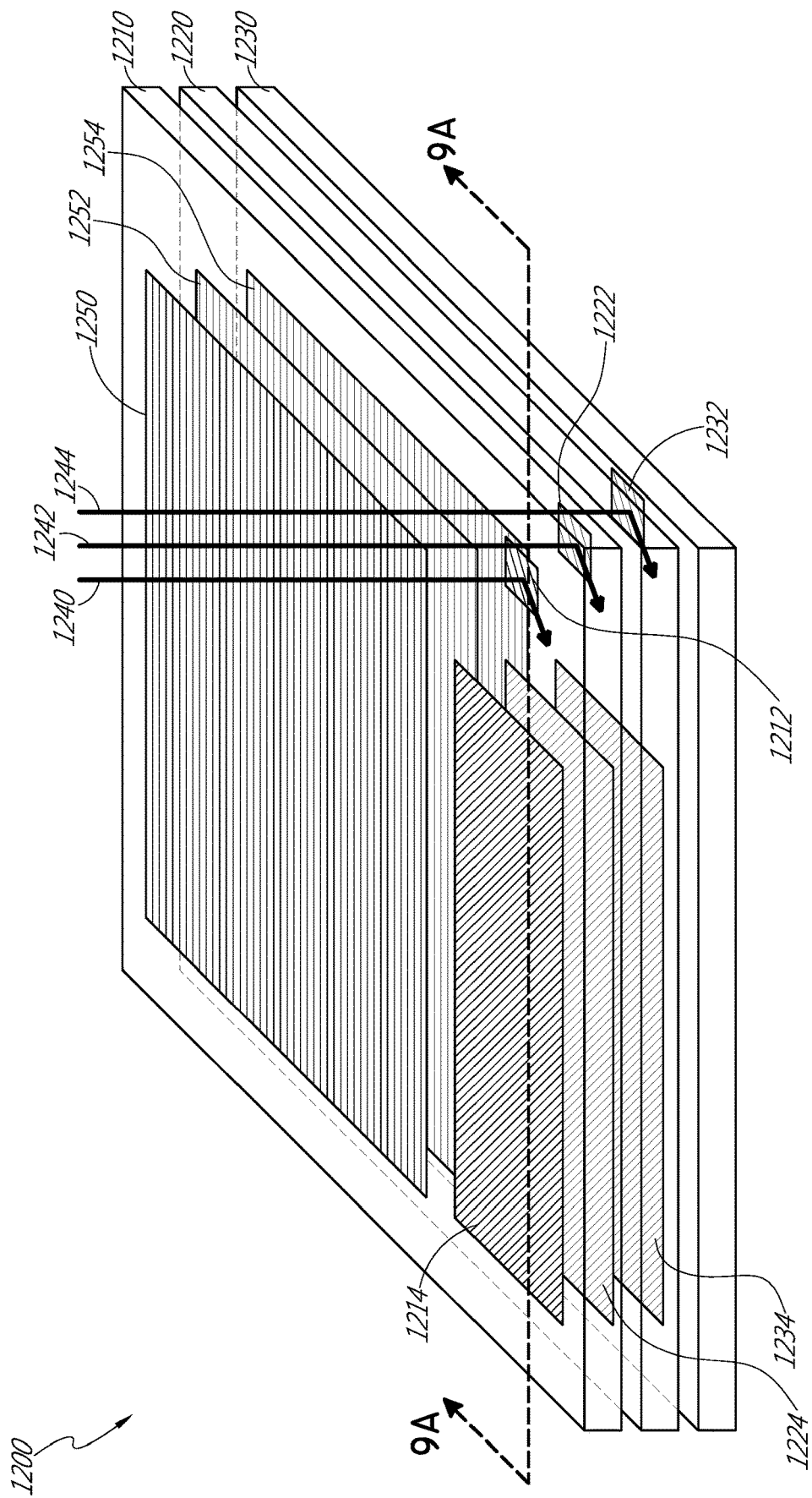
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1240 (e.g., blue light) is deflected by the first incoupling optical element 1212, and then continues to bounce down the waveguide, interacting with the light distributing element (e.g., OPE's) 1214 and then the outcoupling optical element (e.g., EPs) 1250, in a manner described earlier. The light rays 1242 and 1244 (e.g., green and red light, respectively) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EP's) 1252. Finally, light ray 1244 (e.g., red light) passes through the waveguide 1220 to impinge on the light incoupling optical elements 1232 of the waveguide 1230. The light in-coupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
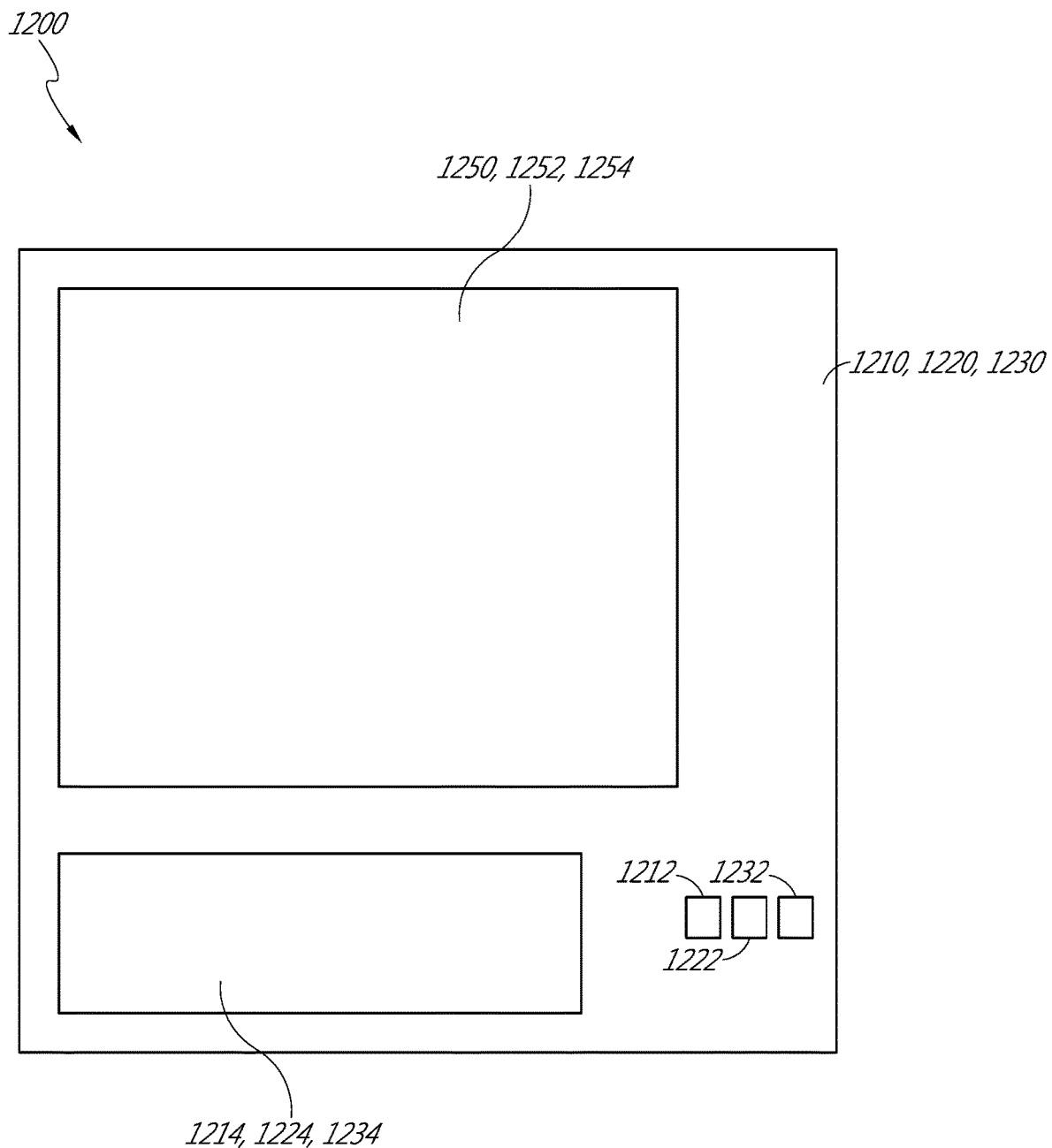
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this non-overlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated incoupling optical elements may be referred to as a shifted pupil system, and the in coupling optical elements within these arrangements may correspond to sub pupils.

Bragg-Reflective Structures Based on Liquid Crystals

Generally, liquid crystals possess physical properties that may be intermediate between conventional fluids and solids. While liquid crystals are fluid-like in some aspects, unlike most fluids, the arrangement of molecules within liquid crystals exhibits some structural order. Different types of liquid crystals include thermotropic, lyotropic, and polymeric liquid crystals. Thermotropic liquid crystals disclosed herein can be implemented in various physical states, e.g., phases, including a nematic state/phase, a smectic state/phase, a chiral nematic state/phase or a chiral smectic state/phase.

As described herein, liquid crystals in a nematic state or phase can have calamitic (rod-shaped) or discotic (disc-shaped) organic molecules that have relatively little positional order, while having a long-range directional order with their long axes being roughly parallel. Thus, the organic molecules may be free to flow with their center of mass positions being randomly distributed as in a liquid, while still maintaining their long-range directional order. In some implementations, liquid crystals in a nematic phase can be uniaxial; i.e., the liquid crystals have one axis that is longer and preferred, with the other two being roughly equivalent. In other implementations, liquid crystals can be biaxial; i.e., in addition to orienting their long axis, the liquid crystals may also orient along a secondary axis.

As described herein, liquid crystals in a smectic state or phase can have the organic molecules that form relatively well-defined layers that can slide over one another. In some implementations, liquid crystals in a smectic phase can be positionally ordered along one direction. In some implementations, the long axes of the molecules can be oriented along a direction substantially normal to the plane of the liquid crystal layer, while in other implementations, the long axes of the molecules may be tilted with respect to the direction normal to the plane of the layer.

Herein and throughout the disclosure, nematic liquid crystals are composed of rod-like molecules with the long axes of neighboring molecules approximately aligned to one another. To describe this anisotropic structure, a dimensionless unit vector n called the director, may be used to describe the direction of preferred orientation of the liquid crystal molecules.

Herein and throughout the disclosure, a tilt angle or a pre-tilt angle @ can refer to an angle measured in a plane perpendicular to a major surface (in an x-y plane) of the liquid crystal layers or of the substrate, e.g., the x-z plane, and measured between an alignment direction and the major surface or a direction parallel to the major surface, e.g., the x-direction.

Herein and throughout the disclosure, an azimuthal angle or a rotation angle q is used to describe an angle of rotation about a layer normal direction, or an axis normal to a major surface of a liquid crystal layer, which is measured in a plane parallel to a major surface of the liquid crystal layers or of the substrate, e.g., the x-y plane, and measured between an alignment direction, e.g., an elongation direction or the direction of the director, and a direction parallel to the major surface, e.g., the y-direction.

Herein and throughout the disclosure, when an angle such as the rotation angle q or a pre-tilt angle $\Phi$ are referred to as being substantially the same between different regions, it will be understood that an average alignment angles can, for example, be within about 1%, about 5% or about 10% of each other although the average alignment can be larger in some cases.

Herein and throughout the specification, a duty cycle can, for example, refers to a ratio between a first lateral dimension of a first region having liquid crystal molecules aligned in a first alignment direction, and the grating period of the zone having the first region. Where applicable, the first region corresponds to the region in which the alignment of the liquid crystals does not vary between different zones.

As describe herein, liquid crystals in a nematic state or a smectic state can also exhibit chirality. Such liquid crystals are referred to as being in a chiral phase or a cholesteric phase. In a chiral phase or a cholesteric phase, the liquid crystals can exhibit a twisting of the molecules perpendicular to the director, with the molecular axis parallel to the director. The finite twist angle between adjacent molecules is due to their asymmetric packing, which results in longer-range chiral order.

As described herein, liquid crystals in a chiral smectic state or phase can be configured such that the liquid crystal molecules have positional ordering in a layered structure, with the molecules tilted by a finite angle with respect to the layer normal. In addition, chirality can induce successive azimuthal twists of the liquid crystal molecules with respect to a direction perpendicular to the layer normal from one liquid crystal molecule to the next liquid crystal molecule in the layer normal direction, thereby producing a spiral twisting of the molecular axis along the layer normal.

As described herein and throughout the disclosure, a chiral structure refers to a plurality of liquid crystal molecules in a cholesteric phase that extend in a direction, e.g., a direction perpendicular to the director such as a layer depth direction, and are successively rotated or twisted in a rotation direction, e.g., clockwise or counterclockwise. In one aspect, the directors of the liquid crystal molecules in a chiral structure can be characterized as a helix having a helical pitch.

As described herein, liquid crystals in a cholesteric phase displaying chirality can be described as having a chiral pitch, or a helical pitch (p), which corresponds to a length in the layer depth direction corresponding to a net rotation angle of the liquid crystal molecules of the chiral structures by one full rotation in the first rotation direction. In other words, the helical pitch refers to the distance over which the liquid crystal molecules undergo a full 360° twist. The helical pitch (p) can change, e.g., when the temperature is altered or when other molecules are added to a liquid crystal host (an achiral liquid host material can form a chiral phase if doped with a chiral material), allowing the helical pitch (p) of a given material to be tuned accordingly. In some liquid crystal systems, the helical pitch is of the same order as the wavelength of visible light. As described herein, liquid crystals displaying chirality can also be described as having a twist angle, or a rotation angle ($\phi$), which can refer to, for example, the relative azimuthal angular rotation between successive liquid crystal molecules in the layer normal direction, and as having a net twist angle, or a net rotation angle, which can refer to, for example, the relative azimuthal angular rotation between an uppermost liquid crystal molecule and a lowermost liquid crystal molecule across a specified length, e.g., the length of a chiral structure or the thickness of the liquid crystal layer.

According to various embodiments described herein, liquid crystals having various states or phases as described above can be configured to offer various desirable material properties, including, e.g., birefringence, optical anisotropy, and manufacturability using thin-film processes. For example, by changing surface conditions of liquid crystal layers and/or mixing different liquid crystal materials, grating structures that exhibit spatially varying diffraction properties, e.g., gradient diffraction efficiencies, can be fabricated.

As described herein, "polymerizable liquid crystals" may refer to liquid crystal materials that can be polymerized, e.g., in-situ photopolymerized, and may also be described herein as reactive mesogens (RM).

It will be appreciated that the liquid crystal molecules may be polymerizable in some embodiments and, once polymerized, may form a large network with other liquid crystal molecules. For example, the liquid crystal molecules may be linked by chemical bonds or linking chemical species to other liquid crystal molecules. Once joined together, the liquid crystal molecules may form liquid crystal domains having substantially the same orientations and locations as before being linked together. For ease of description, the term "liquid crystal molecule" is used herein to refer to both the liquid crystal molecules before polymerization and to the liquid crystal domains formed by these molecules after polymerization.

According to particular embodiments described herein, photo-polymerizable liquid crystal materials can be configured to form Bragg-reflective structures, e.g., a diffraction grating, whose material properties, including birefringence, chirality, and case for multiple-coating, can be utilized to create diffraction gratings with different material properties, e.g., birefringence, chirality, and thickness, which can result in different optical properties, e.g., diffraction efficiency, wavelength selectivity and off-axis diffraction angle selectivity, to name a few.

It will be appreciated that, as described herein, a "transmissive" or "transparent" structure, e.g., a transparent substrate, may allow at least some, e.g., at least 20, 30 or 50%, of an incident light, to pass therethrough. Accordingly, a transparent substrate may be a glass, sapphire or a polymeric substrate in some embodiments. In contrast, a "reflective" structure, e.g., a reflective substrate, may reflect at least some, e.g., at least 20, 30, 50, 70, 90% or more of the incident light, to reflect therefrom.

Optical properties of a grating are determined by the physical structures of the grating (e.g., the periodicity, the depth, and the duty cycle), as well as material properties of the grating (e.g., refractive index, absorption, and birefringence). When liquid crystals are used, optical properties of the grating can be controlled by controlling, e.g., molecular orientation or distribution of the liquid crystal materials. For example, by varying molecular orientation or distribution of the liquid crystal material across the grating area, the grating may exhibit graded diffraction efficiencies. Such approaches are described in the following, in reference to the figures.

Cholesteric Liquid Crystal Diffraction Grating (CLCG)

As described supra in reference to FIGS. 6 and 7, display systems according to various embodiments described herein may include optical elements, e.g., incoupling optical elements, outcoupling optical elements, and light distributing elements, which may include diffraction gratings. For example, as described above in reference to FIG. 7, light 400 that is injected into the waveguide 1182 at the input surface 1382 of the waveguide 1182 propagates within the waveguide 1182 by total internal reflection (TIR). At points where the light 400 impinges on the out-coupling optical element 1282, a portion of the light exits the waveguide as exit beams 402. In some implementations, any of the optical elements 1182, 1282, or 1382 can be configured as a diffraction grating.

Efficient light in-coupling into (or out-coupling from) the waveguide 1182 can be a challenge in designing a waveguide-based see-through displays, e.g., for virtual/augmented/mixed display applications. For these and other applications, it is desirable to have the diffraction grating formed of a material whose structure is configurable to optimize various optical properties, including diffraction properties. The desirable diffraction properties include, among other properties, polarization selectivity, spectral selectivity, angular selectivity, high spectral bandwidth and high diffraction efficiencies, among other properties. To address these and other needs, in various embodiments disclosed herein, the optical element 1282 is configured as a cholesteric liquid crystal diffraction grating (CLCG). As described infra, CLCGs according to various embodiments can be configured to optimize, among other things, polarization selectivity, bandwidth, phase profile, spatial variation of diffraction properties, spectral selectivity and high diffraction efficiencies.

In the following, various embodiments of CLCGs configured as a reflective liquid crystal diffraction grating comprising cholesteric liquid crystals (CLC) optimized for various optical properties are described. Generally, diffraction gratings have a periodic structure, which splits and diffracts light into several beams travelling in different directions. The directions of these beams depend, among other things, on the period of the periodic structure and the wavelength of the light. To optimize certain optical properties, e.g., diffraction efficiencies, for certain applications such as outcoupling optical element 1282 (FIGS. 6, 7), various material properties of the CLC can be optimized as described infra.

As described supra, liquid crystal molecules of a cholesteric liquid crystal (CLC) layer in a chiral (nematic) phase or a cholesteric phase is characterized by a plurality of liquid crystal molecules that are arranged to have successive azimuthal twists of the director as a function of position in the film in a normal direction, or a depth direction, of the liquid crystal layer. As described herein, the liquid crystal molecules that arranged to have the successive azimuthal twists are collectively referred to herein as a chiral structure. As described herein, an angle ($\phi$) of azimuthal twist or rotation is described as the angle between the directors the liquid crystal molecules, as described supra, relative to a direction parallel to the layer normal. The spatially varying director of the liquid crystal molecules of a chiral structure can be described as forming a helical pattern in which the helical pitch (p) is defined as the distance (e.g., in the layer normal direction of the liquid crystal layer) over which the director has rotated by 360°, as described above. As described herein, a CLC layer configured as a diffraction grating has a lateral dimension by which the molecular structures of the liquid crystals periodically repeat in a lateral direction normal to the depth direction. This periodicity in the lateral direction is referred to as a grating period ($\Lambda$).

Figure 10:
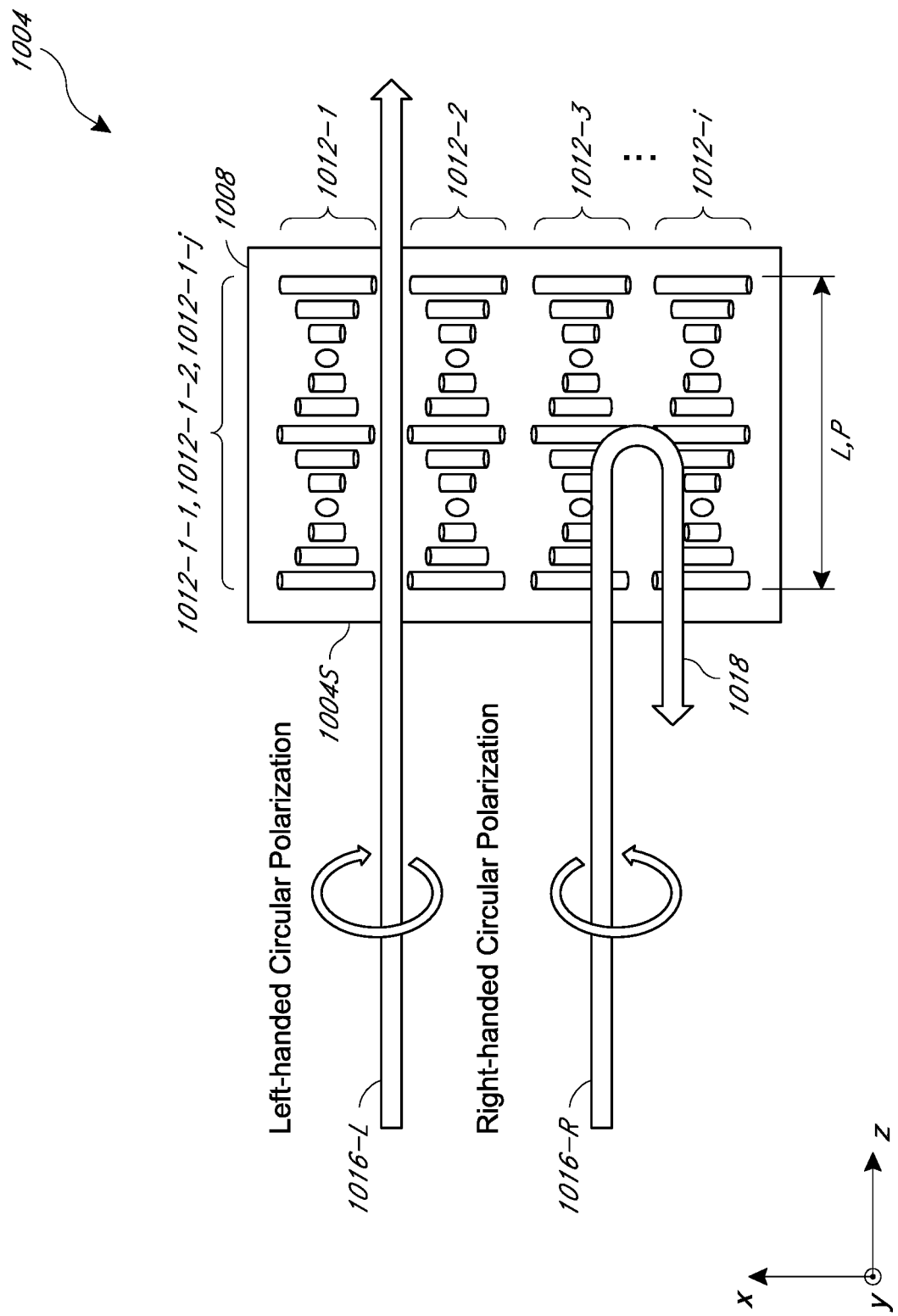
FIG. 10 illustrates a cross-sectional side view of an example of a cholesteric liquid crystal diffraction grating (CLCG) having a plurality of uniform chiral structures.

According to various embodiments described herein, a diffraction grating comprises a cholesteric liquid crystal (CLC) layer comprising a plurality of chiral structures, wherein each chiral structure comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction. The arrangements of the liquid crystal molecules of the chiral structures vary periodically in a lateral direction perpendicular to the layer depth direction FIG. 10 illustrates a cross-sectional side view of a cholesteric liquid crystal (CLC) layer 1004 comprising a plurality of uniform chiral structures. The CLC 1004 comprises a CLC layer 1008 comprising liquid crystal molecules arranged as a plurality of chiral structures 1012-1, 1012-2, . . . 1012-*i*, wherein each chiral structure comprises a plurality of liquid crystal molecules, where is any suitable integer greater than 2. For example, the chiral structure 1012-1 comprises a plurality of liquid crystal molecules 1012-1-1, 1012-1-2, . . . 1012-1-*j* that are arranged to extend in a layer normal direction, e.g., the z-direction in the illustrated embodiment, where j is any suitable integer greater than 2. The liquid crystal molecules of each chiral structure are successively rotated in a first rotation direction. In the illustrated embodiment, the liquid crystal molecules are successively rotated in a clockwise direction when viewing in a positive direction of the z-axis (e.g., the direction of the axis arrow), or the direction of propagation of the incident light beams 1016-L, 1016-R. For example, in the illustrated embodiment, the liquid crystal molecules 1012-1-1, 1012-1-2, . . . 1012-1-*j* of the chiral structure 1012-1 are successively rotated by rotation angles $\phi_1, \phi_2, \ldots \phi_j$, relative to, e.g., the positive x-direction. In the illustrated embodiment, for illustrative purposes, the plurality of liquid crystal molecules of each of the chiral structures 1012-1, 1012-2, . . . 1012-*i* between opposing ends in the z-direction are rotated by one full rotation or turn, such that the net rotation angle of the liquid crystal molecules is about 360°. As a result, the chiral structures 1012-1, 1012-2, . . . 1012-*i* have a length L in the z-direction that is the same as the helical pitch p. However, embodiments are not so limited, and the chiral structures 1012-1, 1012-2, . . . 1012-*i* can have any number of full rotations greater than or less than 1, any suitable net rotation angle that is lower or higher than 360°, and/or any suitable length L in the z-direction that is shorter or longer than the helical pitch p. For example, in various embodiments described herein, the number of full turns of the chiral structures can be between 1 and 3, between 2 and 4, between 3 and 5, between 4 and 6, between 5 and 7, between 6 and 8, between 7 and 9, or between 8 and 10, among other numbers.

Still referring to FIG. 10, the successive rotation angles between adjacent liquid crystal molecules in the z-direction, $\phi_1, \phi_2, \ldots \phi_j$, can be the same according to some embodiments, or be different according to some other embodiments. By way of illustration, in the illustrated embodiment, the length of the chiral structures 1012-1, 1012-2, . . . 1012-*i* is about p and the net rotation angle is 360°, such that adjacent liquid crystal molecules in the z-direction are rotated by about 360°/(m−1), where m is the number of liquid crystal molecules in a chiral structure. For example, for illustrative purposes, each of the chiral structure 1012-1, 1012-2, . . . 1012-*i* has 13 liquid crystal molecules, such that adjacent liquid crystal molecules in the z-direction are rotated with respect to each other by about 30°. Of course, chiral structures in various embodiments can have any suitable number of liquid crystal molecules.

Thus, still referring to FIG. 10, the chiral structures that are adjacent in a lateral direction, e.g., x-direction, have similarly arranged liquid crystal molecules. In the illustrated embodiment, the chiral structures 1012-1, 1012-2, . . . 1012-*i* are similarly configured such that liquid crystal molecules of the different chiral structures that are at about the same depth, e.g., the liquid crystal molecules closest to the light-incident surface 1004S, have the same rotation angle, as well as successive rotation angles of successive liquid crystal molecules at about the same depth, as well as the net rotation angle of the liquid crystal molecules of each chiral structure.

In the following, the CLC layer 1004 illustrated in FIG. 10 is further described in operation. As described, the CLC layer 1004 comprises the chiral structures 1012-1, 1012-2, . . . 1012-*i* having a uniform arrangement in a lateral direction, e.g., x-direction. In operation, when incident light having a combination of light beams having left-handed circular polarization and light beams having right-handed circular polarization are incident on the surface 1004S of the CLC layer 1008, by Bragg-reflection, light with one of the circular polarization handedness is reflected by the CLC layer 1004, while light with the opposite polarization handedness is transmitted through the CLC layer 1008 without substantial interference. As described herein and throughout the disclosure, the handedness is defined as viewed in the direction of propagation. According to embodiments, when the direction of polarization, or handedness of the polarization, of the light beams 1016-L, 1016-R is matched such that it and has the same direction of rotation as the liquid crystal molecules of the chiral structures 1012-1, 1012-2, . . .

1012-$i$, the incident light is reflected. As illustrated, incident on the surface 1004S are light beams 1016-L having left-handed circular polarization and light beams 1016-R having a right-handed circular polarization. In the illustrated embodiment, the liquid crystal molecules of the chiral structures 1012-1, 1012-2, . . . 1012-$i$ are rotated in a clockwise direction successively in the direction in which incident light beams 1016-L, 1016-R travel, i.e., positive x-direction, which is the same rotation direction as the light teams 1016-R having right-handed circular polarization. As a result, the light beams 1016-R having right-handed circular polarization are substantially reflected, whereas the light beams 1016-L having left-handed circular polarization are substantially transmitted through the CLC layer 1004.

Without being bound to any theory, under a Bragg-reflection condition, the wavelength of the incident light ($\lambda$) may be proportional to the mean or average refractive index (n) of a CLC layer and to the helical pitch (p), and can be expressed as satisfying the following condition under some circumstances:

$$\lambda \cong np \quad [1]$$

In addition, the bandwidth ($\Delta\lambda$) of Bragg-reflecting wavelengths may be proportional to the birefringence $\Delta n$ (e.g., the difference in refractive index between different polarizations of light) of CLC layer 1004 and to the helical pitch (p), and can be expressed as satisfying the following condition under some circumstances:

$$\Delta\lambda = \Delta n \cdot p \quad [2]$$

In various embodiments described herein, the bandwidth $\Delta\lambda$ is about 60 nm, about 80 nm or about 100 nm.

According to various embodiments, a peak reflected intensity within a visible wavelength range between, e.g., about 390 nm and about 700 nm, or within a near infrared wavelength range between, e.g., about 700 nm and about 2500 nm, can exceed about 60%, about 70%, about 80% or about 90%. In addition, according to various embodiments, the full width at half maximum (FWHM) can be less than about 100 nm, less than about 70 nm, less than about 50 nm or less than about 20 nm.

Figure 11:
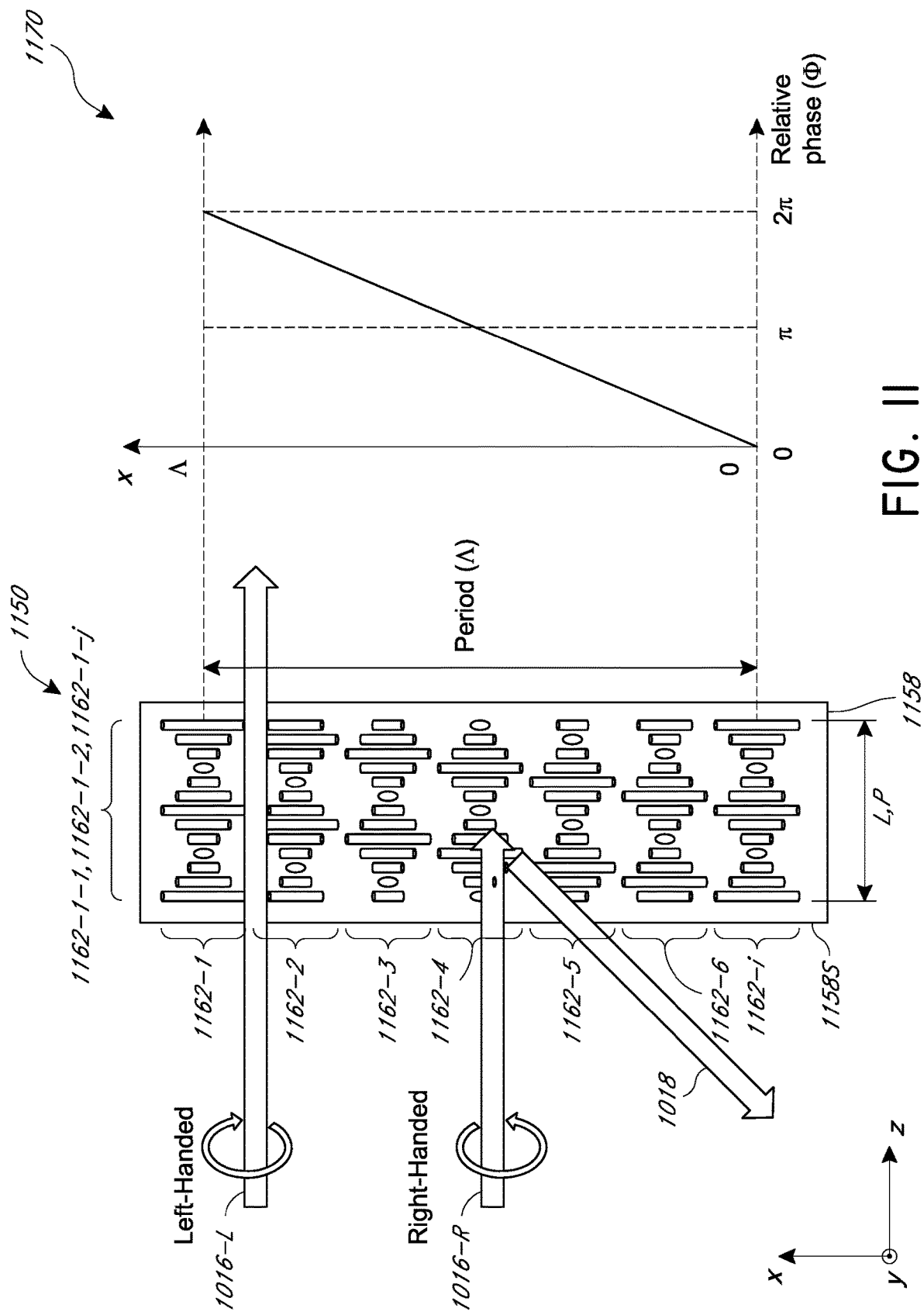
FIG. 11 illustrates a cross-sectional side view of an example of a CLCG having differently arranged chiral structures in a lateral direction.

FIG. 11 illustrates a cross-sectional side view of a CLC grating (CLCG) 1150 having differently arranged chiral structures in a lateral direction, e.g., varying twist angles in a lateral direction. Similar to the CLC layer 1004 of FIG. 10, the diffraction grating 1150 comprises a cholesteric liquid crystal (CLC) layer 1158 comprising liquid crystal molecules arranged as a plurality of chiral structures 1162-1, 1162-2, . . . 1162-$i$, wherein each chiral structure comprises a plurality of liquid crystal molecules. For example, the chiral structure 1162-1 comprises a plurality of liquid crystal molecules 1162-1-1, 1162-1-2, . . . 1162-1-$j$ that are arranged to extend in a layer normal direction, represented as z-direction in the illustrated embodiment. The liquid crystal molecules of each chiral structure are successively rotated in a first rotation direction in a similar manner as described with respect to FIG. 10. In addition, various other parameters of the chiral structures including the length L, the number of full rotations made by the liquid crystal molecules and the number of liquid crystal molecules per chiral structure are similar to the chiral structures described above with respect to FIG. 10.

In contrast to the illustrated embodiment of FIG. 10, however, in the illustrated embodiment of FIG. 11, the chiral structures that are adjacent in a lateral direction, e.g., x-direction, have differently arranged liquid crystal molecules. The chiral structures 1162-1, 1162-2, . . . 1162-$i$ are differently configured in the x-direction such that the liquid crystal molecules of the different chiral structures at about the same depth have different rotation angles. For example, in the illustrated embodiment, the liquid crystal molecules 1162-1-1, 1162-2-1, . . . 1162-$i$-1, that are closest to the incident surface 1158S, of the chiral structures 1162-1, 1162-2, . . . 1162-$i$, respectively, are successively rotated by rotation angles $\phi 1, \phi 2, \ldots \phi i$ in the positive x-axis direction relative to, e.g., positive x-direction. In the illustrated embodiment, the net rotation angle of the liquid crystal molecules 1162-1-1, 1162-2-1, . . . 1162-$i$-1, that are closest to the incident surface 1158S across a lateral length $\Lambda$, which corresponds to a period of the diffraction grating 1150, is a rotation angle of about 180°. In addition, liquid crystal molecules of different chiral structures that are disposed at about the same depth level are rotated by about the same rotation angle relative to respective surface-most liquid crystal molecules.

Still referring to FIG. 11A, the successive rotation angles $\phi_1, \phi_2, \ldots \phi_i$ of liquid crystal molecules that are at the same depth level across the period $\Lambda$ in the x-direction can be the same according to some embodiments, or be different according to some other embodiments. In the illustrated embodiment, for the period $\Lambda$, when the net rotation angle is 360° as in the illustrated embodiment, adjacent liquid crystal molecules in the x-direction are rotated by about 360°/(m−1), where m is the number of liquid crystal molecules spanned by a period $\Lambda$ in the x-direction. For example, for illustrative purposes, there are 7 liquid crystal molecules that span across the period $\Lambda$, such that adjacent liquid crystal molecules at the same vertical level in the x-direction are rotated with respect to each other by about 30°. Of course, chiral structures in various embodiments can have any suitable number of liquid crystal molecules.

It will be appreciated that, for illustrating purposes, the CLC layer 1158 is illustrated to have only one period $\Lambda$. Of course, embodiments are not so limited, and the CLC layer 1158 can have any suitable number of periods that is determined by the lateral dimension of the CLCG in the x-direction.

As illustrated by the CLCG 1150, when the chiral structures in a lateral direction, e.g., x-direction, are differently arranged, e.g., successively rotated, the successively rotated chiral structures induce shifts in the relative phases of the reflected light along the x-direction. This is illustrated with respect to graph 1170, which plots the phase change $\phi$ resulting from the chiral structures that are successively rotated by rotation angles $\phi_1, \phi_2, \ldots \phi_i$ in the x-axis direction in one period $\Lambda$. Without being bound to any theory, the relative phase difference (46) of reflected light 1018 can be expressed as $\Delta\phi(x)=(2\pi x/\Lambda)$, where x is the position along the lateral direction and $\Lambda$ is the period. The bandwidth can be expressed as $\Delta\lambda \approx \Delta n * p$.

Referring back to FIGS. 10-11 and Eqs. [1] and [2], according to various embodiments, the Bragg-reflected wavelength can be varied by varying the helical pitch p of the chiral structures. In various embodiments, without being bound to any theory, the helical pitch p can be varied by increasing or decreasing helical twisting power (HTP), which refers to the ability of a chiral compound to induce the rotation or twist angles as described above. The HTP can in turn be varied by changing the amount of chiral compound relative to the amount of non-chiral compound. In various embodiments, by mixing a chiral compound chemically and/or mechanically with a non-chiral compound, e.g., a nematic compound, the Bragg-reflection wavelength and thus the color can be varied based on an inverse relationship between the relative fraction of the chiral compound and the helical pitch. In various embodiments disclosed herein, the ratio of the amount of chiral compound to the amount of nonchiral compound can be about 20:1, 10:1, 5:1, 4:1, 3:1, 2:1, 1:1, 1:2, 1:3, 1:4, 1:5, 1:10 or about 1:20 by weight.

In the description supra with respect to FIGS. 10 and 11, the incident light beams 1016-L, 1016-R are illustrated as being propagating in a direction parallel to the layer normal, e.g., in the z-direction. For various applications, however, e.g., as described above with respect to FIGS. 6 and 7, light propagating within the waveguide 1182, e.g., propagating by total internal reflection (TIR), impinges on the outcoupling optical elements 1282, 1284, 1286, 1288, 1290, e.g., diffraction gratings, at an off-axis angle. The diffraction gratings described herein can be configured to maximize bandwidth and diffraction efficiency for such configurations, as described below.

In the description supra with respect to FIGS. 10 and 11, the liquid crystal molecules are illustrated to not be pre-tilted. Embodiment are not so limited, however, and the liquid crystal molecules can have a pre-tilt angle @, relative to a direction parallel to a major surface of the CLCG, e.g., relative to the x-y plane that is between about +/−60 degrees and about +/−90 degrees or between about +/−65 degrees and about +/−85 degrees, for instance about +/−75 degree; between about +/−35 degrees and about +/−65 degrees or between about +/−40 degrees and about +/−60 degrees, for instance about +/−50 degrees; between about +/−10 degrees and about +/−40 degrees or between about +/−15 degrees and about +/−35 degrees, for instance about +/−25 degrees, according to some embodiments. According to some other embodiments, the pre-tilt angle @ can be between about +15 degrees or between about +10 degrees or between about +5, e.g., 0 degrees.

CLCGs Configured for High Bandwidth Reflection at Off-Axis Incident Angle

Figure 12:
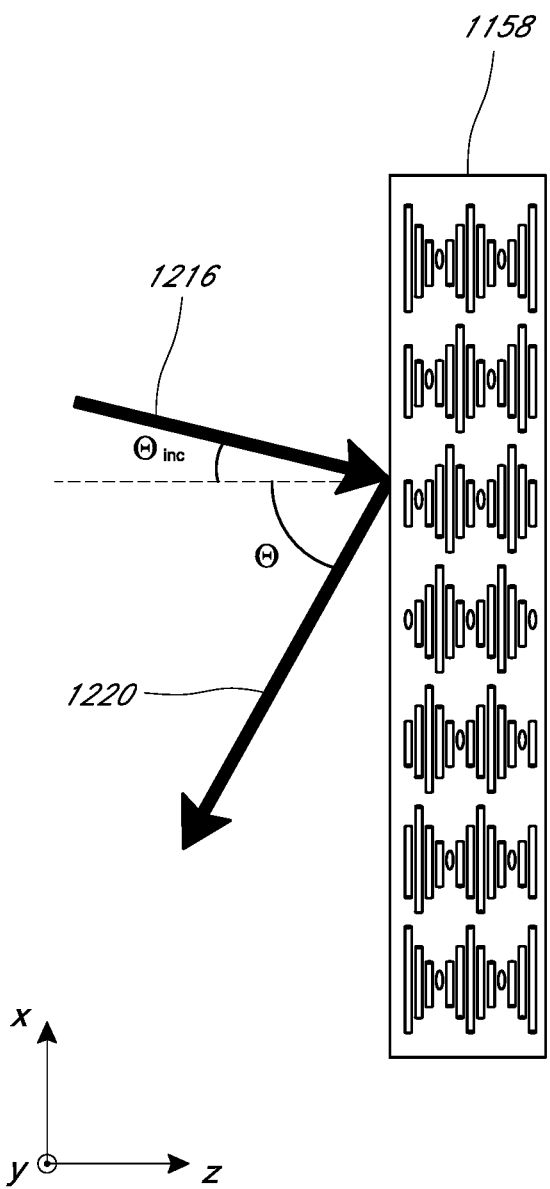
FIG. 12 illustrates a cross-sectional side view of an example of a CLC layer configured for Bragg reflection at an off-axis incident angle.

FIG. 12 illustrates a cross-sectional side view of a CLC layer 1158 configured for high bandwidth of reflection at an off-axis incident angle. As described herein, an off-axis incident angle refers an angle of incidence $\theta_{inc}$ of an incident beam 1216 with respect to the direction of layer normal (e.g., z-direction in FIG. 12) that has a non-zero value, resulting in a Bragg-reflected beam 1220 at a reflection angle θ. Under some circumstances, the reflection angle can be varied to a limited extent by varying a NA. Without being limited by any theory, under some circumstances, off-axis reflection can be described based on the following relationship:

$$n \cdot \sin(\theta) = \lambda/\Lambda + \sin(\theta_{inc}), \quad [3]$$

where $\theta_{inc}$ is the incident angle relative to the direction of layer normal, θ is the reflection angle relative to the direction of layer normal and n is a reflective index of a medium in which the reflected beam propagates. When the CLC layer 1158 is illuminated with the incident beam 1216 at an off-axis angle, the reflection spectrum may be shifted toward shorter wavelengths. According to various embodiments disclosed herein, the ratio λ/Λ can have a value between 0.5 and 0.8, between 0.6 and 0.9, between 0.7 and 1.0, between 0.8 and 1.1, between 0.9 and 1.2, between 1.0 and 1.6, between 1.1 and 1.5, or between 1.2 and 1.4.

Without being bound to any theory, the off-axis angle at which the CLC layer 1158 is configured to Bragg-reflect with high efficiency can also depend on the helical pitch p of the chiral structures.

Figures 13A, 13B:
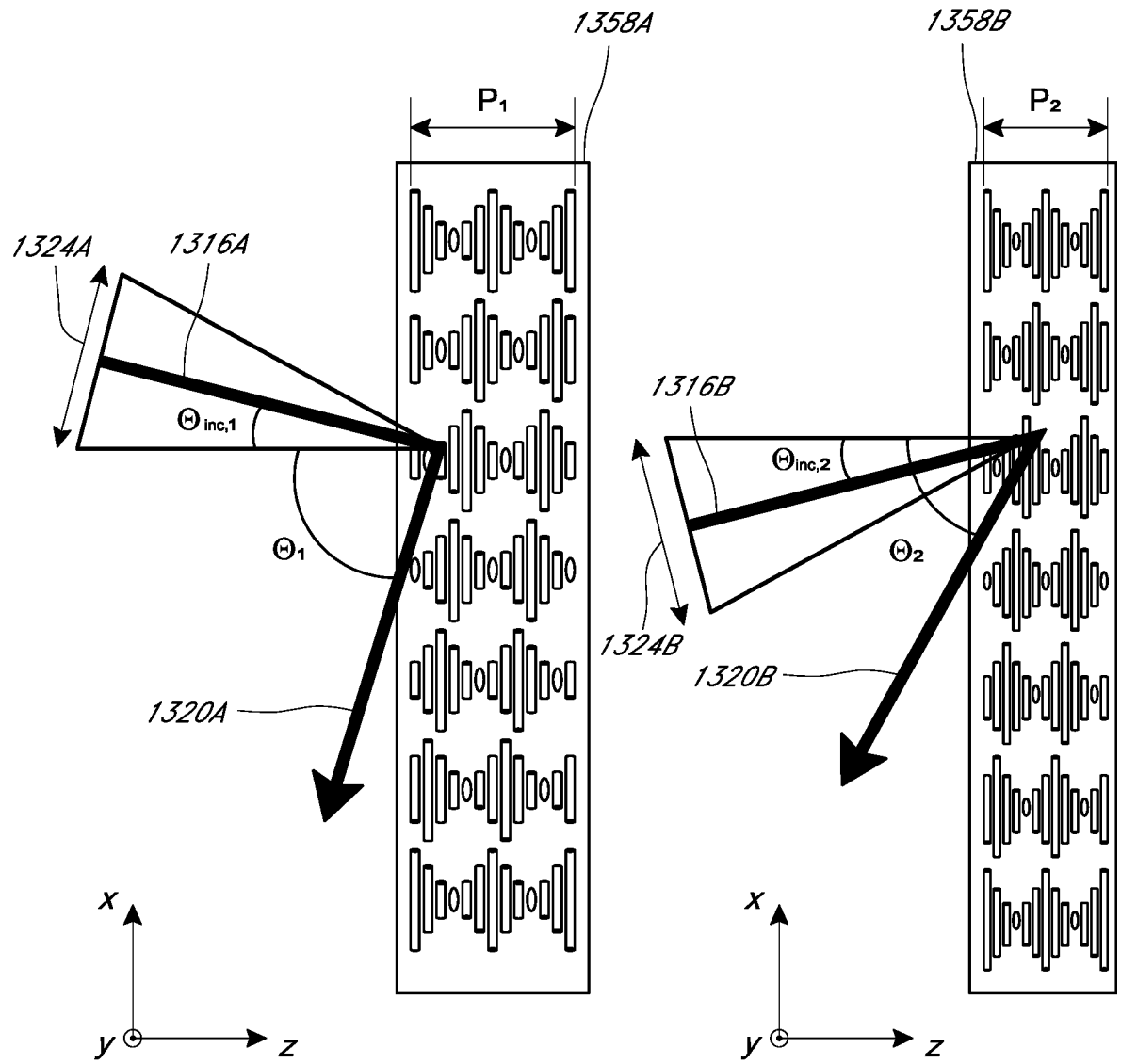
FIG. 13A illustrates a cross-sectional side view of an example of a CLC layer having a first helical pitch and configured for Bragg-reflection at a first off-axis incident angle.
FIG. 13B illustrates a cross-sectional side view of an example of a CLC layer having a second helical pitch and configured for Bragg-reflection at a second off-axis incident angle.

FIGS. 13A and 13B illustrate cross-sectional side views of CLC layers configured for reflection at off-axis incident angles. Referring to FIG. 13A, a first cholesteric liquid crystal (CLC) layer 1358A comprises a first plurality of chiral structures having a first helical pitch ($p_1$). The first CLC layer 1358A has a first helical pitch p1 such that Bragg-reflection is at a maximum when a first incident light beam 1316A is directed to an incident surface of the CLC layer 1358A at a first off-axis angle $\theta_{inc,1}$, which results in a first reflected light beam 1320A at a first reflection angle $\theta_1$. As illustrated, the CLC layer 1358A is further configured to have a first range 1324A of off-axis incident angles in which relatively high diffraction efficiency can be obtained. The first range 1324A can correspond to a range of off-axis incident angles outside of which the intensity of the first reflected light beam 1320A falls off by more than, e.g., 1/e. For example, the first range 1324A can have values of, $\theta_{inc,1}\pm 3°$, $\theta_{inc,1}\pm 5°$, $\theta_{inc,1}\pm 7°$, $\theta_{inc,1}\pm 10°$ or $\theta_{inc,1}\pm 20°$.

Referring to FIG. 13B, a second cholesteric liquid crystal (CLC) layer 1358B different from the first CLC layer 1358A comprising a second plurality of chiral structures having a second helical pitch ($p_2$) different from the first helical pitch $p_1$ of the first CLC layer 1358A of FIG. 13A.

As illustrated, the second CLC layer 1358B is configured such that when a second incident light beam 1316B is directed to an incident surface of the CLC layer 1358B at a second off-axis angle $\theta_{inc,2}$ different from the first off-axis angle $\theta_{inc,1}$, a second reflected light beam 1320B having a second reflection angle $\theta_2$ different from the first reflection angle $\theta_1$ is generated As illustrated, the CLC layer 1358B is further configured to have a second range 1324B of off-axis angles, similar to the first range 1324A described above with respect to FIG. 13A.

Figure 13C:
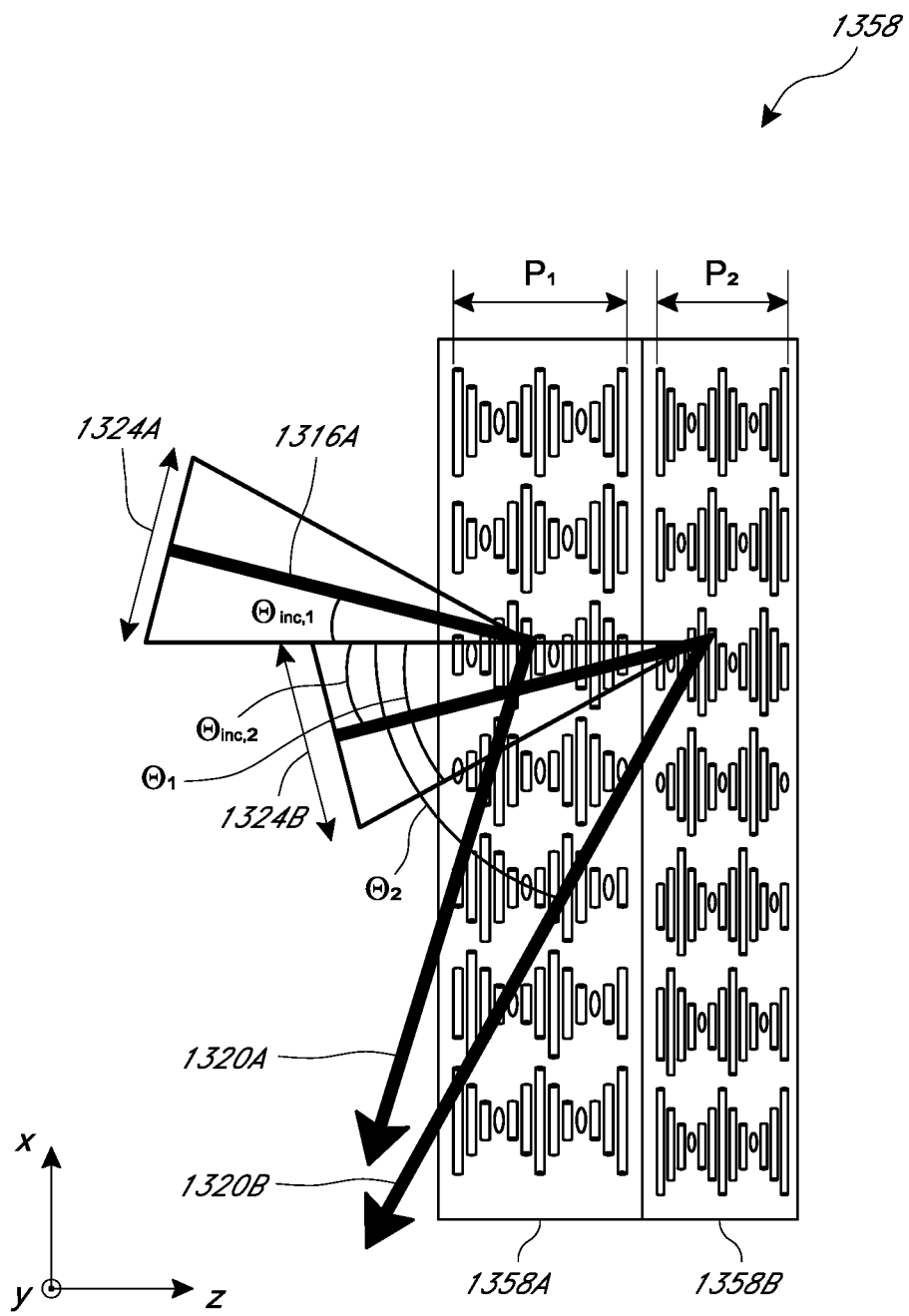
FIG. 13C illustrates a cross-sectional side view of an example of a CLCG including CLC layers of FIGS. 13A and 13B having different helical pitches in a stacked configuration for Bragg-reflection at a plurality of off-axis incident angles and high diffraction bandwidth.

FIG. 13C illustrates a cross-sectional side view of a CLCG 1358 including a plurality of CLC layers having different helical pitches in a stacked configuration for Bragg-reflection at a plurality of off-axis incident angles and high diffraction bandwidth. The CLCG 1358 includes CLC layers 1358A, 1358B described above with respect to FIGS. 13A and 13B, respectively, that are formed over one another, e.g., in a stacked configuration and/or in contact with each other. Various parameters of the plurality of CLC layers 1358A, 1358B including the different helical pitches can be improved or optimized such that the CLCG 1358 is configured for efficient reflection at a plurality of off-axis incident angles and for high diffraction efficiency over a wider range of off-axis angles than can be obtained using only one CLC. For example, in the illustrated embodiments, $p_1$ and $p_2$ can be selected such that the resulting first and second ranges 1324A and 1324B at least partially overlap to provide high diffraction efficiency over a contiguous range of wavelength that includes the first and second ranges 1324A and 1324B. However, in other embodiments, $p_1$ and $p_2$ can be selected such that the first and second ranges 1324A and 1324B do not overlap.

In operation, the first and second CLC layers 1358A, 1358B are formed over one another such that when first and second incident light beams 1316A, 1316B at first and second off-axis angles $\theta_{inc1}$, $\theta_{inc2}$, are directed to an incident surface of the first CLC layer 1358A, the first incident light beam 1316A is substantially reflected by the first CLC layer 1358A at a first reflection angle $\theta_1$, while the second incident light beam 1358B substantially transmits through the first CLC layer 1358A towards an incident surface of the second CLC layer 1358B, and substantially reflected by the second CLC layer 1358B at the second reflection angle $\theta_2$. It will be appreciated that, while not shown for clarity, the concepts described above can be extended to any suitable number of CLC layers.

As described herein and throughout the specification, a light beam that "substantially transmits" through a layer may refer to the light having at least 20%, 30%, 50%, 70% or 90%, of an incident light intensity remaining as the light exits the layer. Similarly, a light beam that is "substantially reflected" by a layer may refer to the light having at least 20, 30, 50%, 70% or 90%, of an incident light intensity remaining in the reflected light.

Still referring to FIG. 13C, in various embodiments, the liquid crystal molecules of the first and second CLC layers 1358A, 1358B can include the same chiral compound at different amounts, such that CLC layers 1358A, 1358B have different helical twisting power (HTP), as described supra. For example, the second CLC layer 1358B may have a higher relative amount of the same chiral compound compared to the first CLC layer 1358A. In some embodiments, the pitch p may be inversely proportional to the fraction of the chiral compound relative to the total liquid crystal compound which includes chiral and nonchiral compounds. However, embodiments are not so limited, and the first and second CLC layers 1358A, 1358B can have different chiral compounds.

In addition, in various embodiments, the liquid crystal molecules of the first and second CLC layers 1358A, 1358B can include the same or different chiral compounds, such that the CLC layers 1358A, 1358B have different ratios $\lambda/\Lambda_1$ and $\lambda/\Lambda_2$, respectively, such that the CLC layers 1358A, 1358B can be configured for high diffraction efficiencies at different incident angles $\theta_{inc1}$, $\theta_{inc2}$, e.g., according to Eq. [3].

Still referring to FIG. 13C, first and second CLC layers 1358A, 1358B can be fabricated directly on the top of each other, according to some embodiments. For example, the first CLC layer 1358A can be deposited on an alignment layer that provides alignment conditions for the first CLC layer 1358A and subsequently, the second CLC layer 1358B can be deposited on the first CLC layer 1358B. Under these fabrication conditions, the surface of the first CLC layer 1358A can provide alignment conditions for the second CLC layer 1358B. In some other embodiments, each of the CLC layers 1358A, 1358B can be fabricated with separate alignment layers. For example, the first CLC layer 1358A can be formed on a first alignment layer and, a second alignment layer can be formed on the first CLC layer 1358A, and the second CLC layer 1358B on the second alignment layer. An isolation layer, e.g., a thin oxide layer, may be formed on the first CLC layer 1358A, according to some embodiments, prior to forming the second alignment layer and/or the second CLC layer 1358B. In yet other embodiments, the two CLC layers 1358A, 1358B can be fabricated individually on different substrates and subsequently stacked. In various embodiments, an intermediate layer can be formed between the two CLC layers 1358A, 1358B, e.g., to enhance adhesion.

The concepts described above with respect to CLCGs having a plurality of CLC layers optimized for optimum diffraction efficiency at different off-axis angles can be extended to other alternative embodiments. In particular, in some embodiments, instead of forming a plurality of layers, a single CLC layer can be configured to have different regions that are optimized for optimum diffraction efficiency at different off-axis angles.

Figure 14:
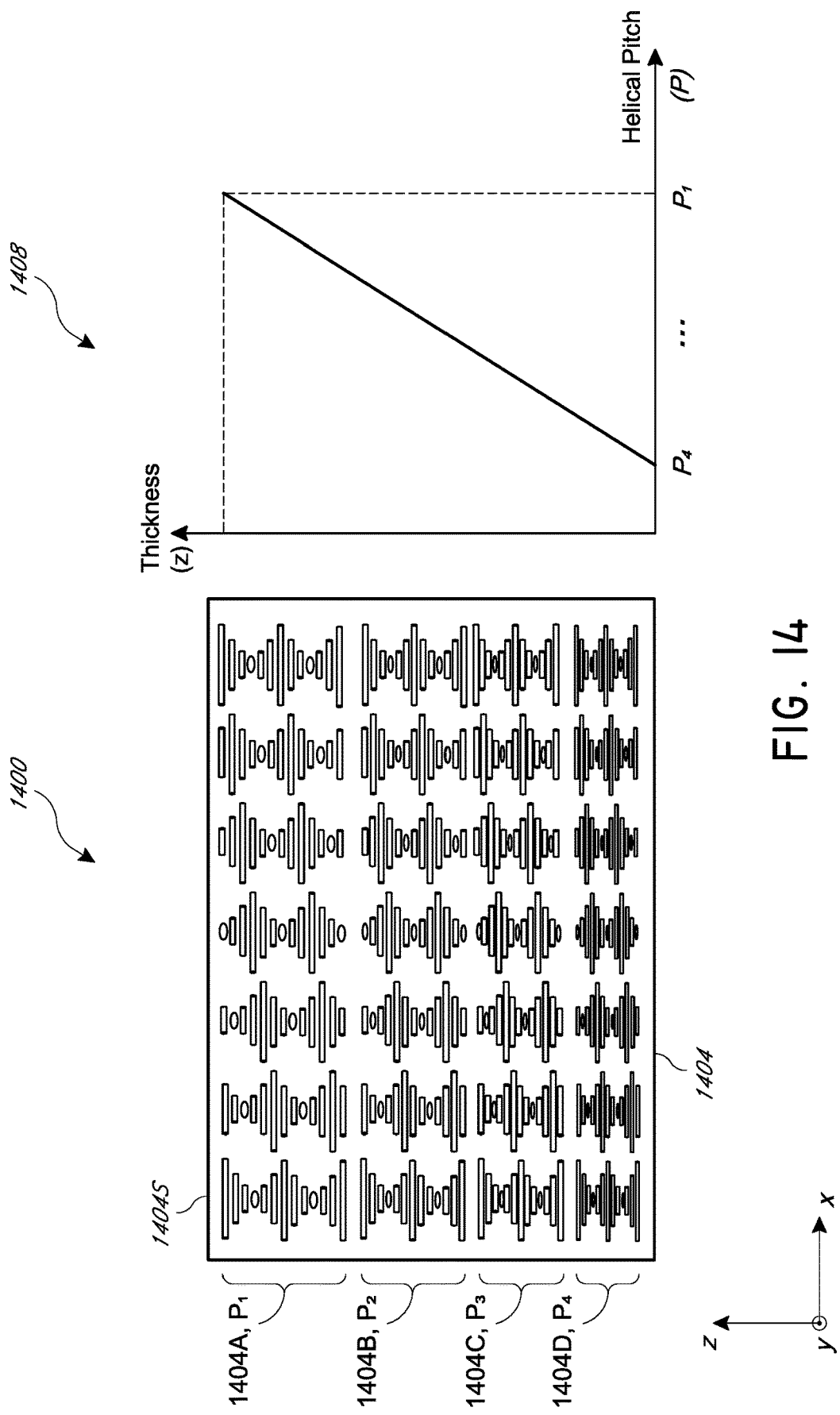
FIG. 14 illustrates a cross-sectional side view of an example of a CLCG including a CLC layer having vertical regions with different helical pitches along a depth direction for Bragg-reflection at a plurality of off-axis incident angles and high diffraction bandwidth.

FIG. 14 illustrates a cross-sectional side view of a CLCG 1400 including a single CLC layer 1404 having vertical regions with different helical pitches along a depth direction for Bragg-reflection at a plurality of off-axis incident angles at different vertical regions with high diffraction bandwidth. The CLC layer 1404 has a plurality of vertical regions having different parameters, e.g., different helical pitches, that are optimized such that high diffraction efficiency can be obtained over a wider range of off-axis angles than can be obtained using only one CLC layer having a uniform pitch in the depth direction. In the illustrated embodiment, the single CLC layer 1404 includes a plurality of vertical regions 1404A, 1404B, 1404C and 1404D, which can have different helical pitches $p_1$, $p_2$, $p_3$ and $p_4$, respectively. Similar to as described above with respect to FIGS. 13C, the helical pitches $p_1$, $p_2$, $p_3$ and $p_4$ can be selected such that the plurality of vertical regions 1404A, 1404B, 1404C and 1404D are configured for optimum diffraction efficiency at incident angles $\theta_{incA}$, $\theta_{incB}$, $\theta_{incC}$ and $\theta_{incD}$, respectively, which results in reflected light beams at different vertical depths at corresponding reflection angles $\theta_A$, $\theta_B$, $\theta_C$, and $\theta_D$, respectively. Furthermore, as described above with respect to FIG. 13C, the CLC layer 1404 is further configured to have respective ranges of off-axis angles in which relatively high diffraction efficiency can be obtained. Of course, while four vertical regions are illustrated for clarity, any suitable number of regions can be included in the CLC layer 1404. In addition, different variations described above with respect to the CLCG 1358 of FIG. 13C having a plurality of CLC layers can be applicable to the CLCG 1400.

In the illustrated embodiment of FIG. 14, the values of the helical pitches p1, p2, p3 and p4 decrease with increasing depth from an incident surface 1404S, such that a decreasing gradient in helical pitch is created in the depth direction (negative z-direction). When the rate of decrease of the helical pitch as a function of layer depth in the z-direction is uniform across the thickness of the CLC layer 1404, a graph 1408 representing a linear relationship between the depth and the helical pitch can be obtained. However, embodiments are not so limited. For example, the helical pitches $p_1$, $p_2$, $p_3$ and $p_4$ can increase or decrease at any depth and can change at different rates as a function of layer depth, according to some other embodiments.

The CLC layer 1404 having a gradient in helical pitch can be fabricated, by varying, e.g., increasing or decreasing, the helical twisting power (HTP) of the liquid crystal molecules at different depths of the CLC layer. The HTP can in turn be spatially varied by changing the relative amount of chiral compound. In various embodiments, by mixing a chiral compound chemically and/or mechanically with a non-chiral compound, e.g., a nematic compound, at different vertical depths, the helical pitches of the vertical regions 1404A, 1404B, 1404C and 1404D can be configured for optimum diffraction efficiency at different incident angles $\theta_{incA}$, $\theta_{incB}$, $\theta_{incC}$ and $\theta_{incD}$, respectively, based on an inverse relationship between the relative fraction of the chiral compound and the helical pitch. For example, a mixture of different chemical components (e.g., chiral di-acrylate monomers and nematic/non-chiral mono-acrylate monomers) that undergo polymerization process at different reaction rates under UV irradiation can be used. Additionally or alternatively, the HTP can be spatially varied by changing irradiation conditions, including exposure intensity and/or exposure time, of UV irradiation at different depths of the CLC layer. The HTP can also be spatially varied by varying the pre-/post-processing of UV polymerization process including thermal treatments before, after and/or during UV irradiation. For example, when a UV absorbing dye is added to a mixture, an intensity gradient of the UV light at different depth of the CLC layer can be created. For example, due to the UV intensity gradient, the polymerization near the surface may proceed at a faster rate compared to the bottom region of the CLC layer. For example, when the cholesteric component is a di-acrylate, the probability of being incorporated into the resulting polymer can be much higher, e.g., twice as high, as the probability of nematic mono-acrylate being incorporated in the polymer. Under some circumstances, if the overall polymerization rate is controlled such that a depletion of the chiral diacrylate near surface region of the CLC layer generates a di-acrylate concentration gradient in the depth direction of the CLC layer. This in turn starts diffusion of the di-acrylate towards the surface region of the CLC layer. The result after complete photo-polymerization can be that the surface region of the CLC layer contains more chiral material and thus has a shorter helical pitch compared to the bottom region of the CLC layer, which contains a relatively higher amount of non-chiral compound. Under some other circumstances, thermal treatment before/after or during UV irradiation can be added in the polymerization process to control the helical pitch gradient. Thus, by controlling the ratio between two different liquid crystal monomers and/or the dose of UV irradiation at different depths with or without thermal treatment, a helical pitch gradient can be achieved along the depth direction of the CLC layer.

For some applications, it may be desirable to have certain optical characteristics of a diffraction grating, such as off-angle diffraction efficiency, refractive index, wavelength selectivity, polarization selectivity and phase selectivity, among other parameters, to vary along a lateral direction orthogonal to the layer normal direction. The lateral variation be desired, for example, when the grating is stacked with a waveguide, e.g., as illustrated above with respect to FIGS. 6 and 7, such that the light propagates in the lateral direction. Under such configuration, however, the intensity of light may attenuate as it propagates within the waveguide (e.g., 1182 in FIG. 7). Such configurations may also be desirable, for example, to intentionally skew the light intensity across the grating (e.g., 1282 in FIG. 7) to adapt to spatial and/or angular variation of sensing efficiencies associated with the human eye to maximize the user experience. Thus, there is a need for optical elements, e.g., diffraction gratings, having spatially varying optical characteristics.

Figure 15:
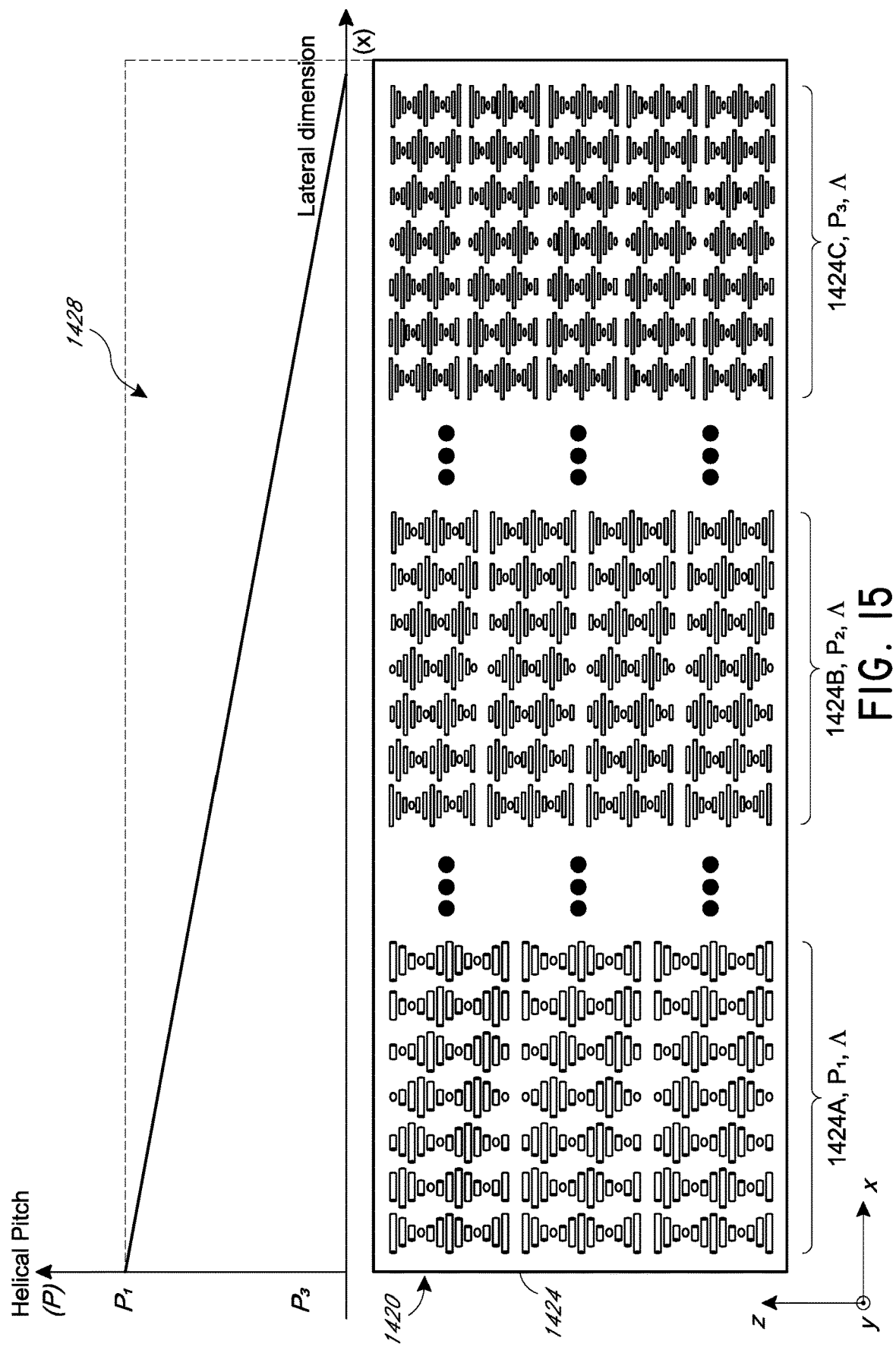
FIG. 15 illustrates a cross-sectional side view of an example of a CLCG including a CLC layer having lateral regions with different helical pitches along a lateral direction for spatially varying Bragg-reflection.

FIG. 15 illustrates a cross-sectional side view of a CLCG including a CLC layer having lateral regions with different helical pitches along a lateral direction for spatially varying Bragg-reflection. The CLC layer 1424 has a plurality of lateral regions having different liquid crystal material parameters, e.g., helical pitches, such that laterally varying properties, e.g., laterally varying off-axis incident angles for Bragg reflection, can be obtained. In the illustrated embodiment, the CLC layer 1424 includes a plurality of lateral regions 1424A, 1424B and 1424C each having a period A and having respective helical pitches $p_1$, $p_2$ and $p_3$. The helical pitches $p_1$, $p_2$ and $p_3$ can be selected such that the plurality of vertical regions 1424A, 1424B and 1404C are configured for optimum diffraction efficiency at different off-axis incident angles $\theta_{incA}$, $\theta_{incB}$ and $\theta_{incC}$ respectively, which results in reflected light beams at corresponding reflection angles $\theta_A$, $\theta_B$, and $\theta_C$, respectively. Furthermore, as described above with respect to FIG. 13C, different lateral regions of the CLC layer 1424 are further configured to have similar respective ranges of off-axis angles in which relatively high diffraction efficiency can be obtained. Of course, while three vertical regions are illustrated for clarity, any suitable number of regions can be included in the CLC layer 1424.

In the illustrated embodiment of FIG. 15, the magnitudes of helical pitches $p_1$, $p_2$ and $p_3$ can change monotonically in a lateral direction, such that a gradient in helical pitch is created. When the rate of change of the helical pitch in the x-direction is uniform across a width or a length of the CLC layer 1424, a linear relationship between the length or width and the helical pitch can be obtained, as illustrated in graph 1428 representing a. However, embodiments are not so limited. For example, the helical pitches $p_1$, $p_2$ and $p_3$ can increase or decrease at any lateral position and can change at different rates in the x-direction along the length or width, according to various other embodiments.

According to various embodiments, CLC layers can be fabricated to have laterally varying diffraction characteristics by, e.g., spatially varying alignment characteristics or other material properties of the liquid crystal molecules. For example, in a similar manner as described supra with respect to FIG. 14, e.g., by controlling the ratio between two different liquid crystal monomers and/or the dose of UV irradiation in different lateral regions, a lateral helical pitch gradient can be achieved along a lateral dimension.

Waveguides Coupled with CLCG for Wavelength-Selective Light Coupling

Figure 16:
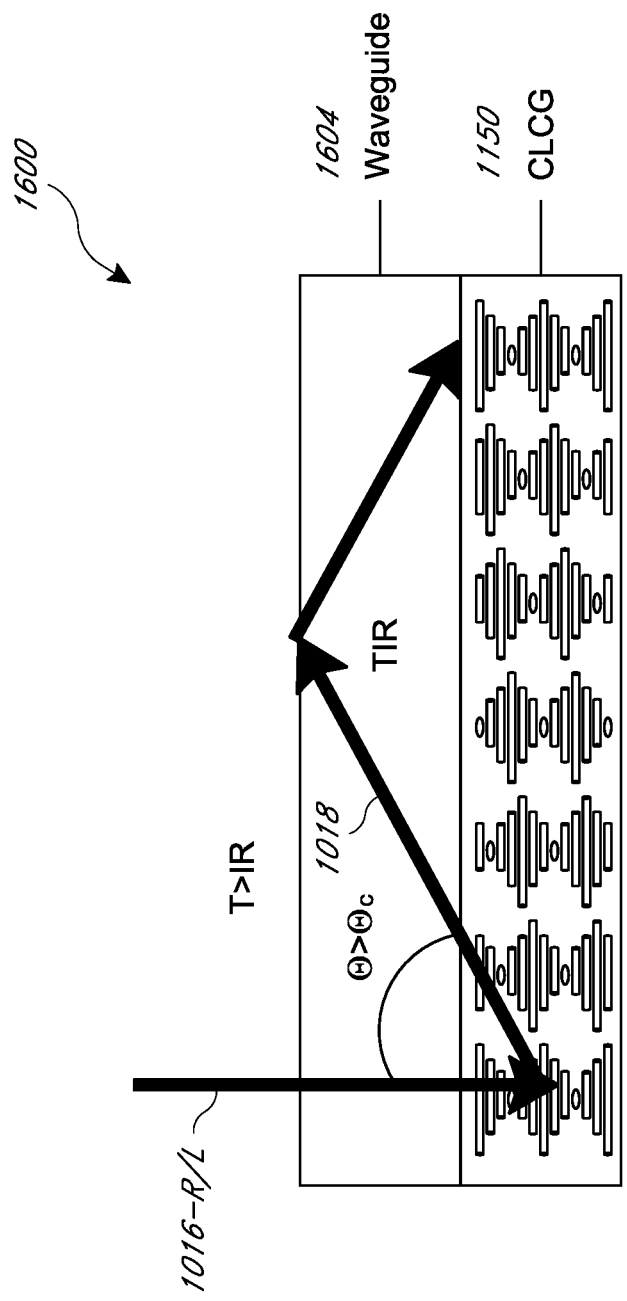
FIG. 16 illustrates an example of an optical wave-guiding device comprising a waveguide coupled to a CLCG and configured to propagate light by total internal reflection (TIR).

As described supra, for various applications including incoupling and outcoupling of light, a wave guide device can be configured to propagate light by total internal reflection (TIR). FIG. 16 illustrates an example of an optical waveguiding device 1600 comprising a waveguide 1604 coupled to a CLCG 1150. The CLCG 1150 comprises liquid crystal molecules arranged as a plurality of chiral structures in a similar manner to chiral structures 1162-1, 1162-2, . . . 1162-i described supra with respect to FIG. 11. The waveguide 1604 is disposed over the CLCG 1150 and optically coupled to the CLCG 1150. When elliptically/circularly polarized incident light 1016-R/L has a polarization handedness which matches the direction of rotation of the liquid crystal molecules of the chiral structures, the incident light 1016-R/L is Bragg-reflected by the CLCG 1150 and coupled into the waveguide 1604 at an angle such that the coupled light travels in a lateral direction (e.g., x-direction), by total internal reflection (TIR). Without being bound to any theory, the TIR condition can be satisfied when the diffraction angle θ is greater than the critical angle, $\theta_C$, of the waveguide. Under some circumstances, the TIR condition can be expressed as:

$$\sin(\theta_C) = 1/n_t \quad [4]$$

where $n_t$ is the refractive index of the waveguide 1604. According to various embodiments, $n_t$ may be between about 1 and about 2 between about 1.4 and about 1.8 or between about 1.5 and about 1.7. For example, the waveguide may comprise a polymer such as polycarbonate or a glass.

Figure 17A:
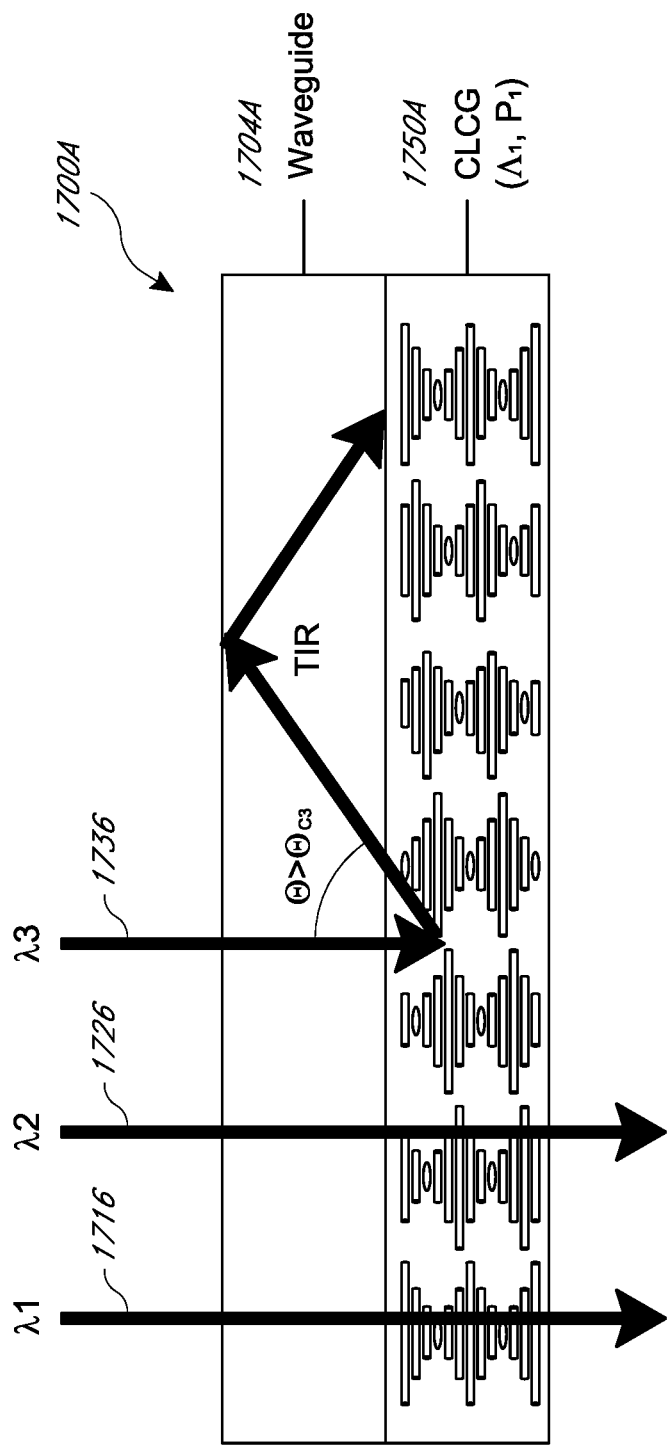
FIG. 17A illustrates an example of an optical wave-guiding device comprising a waveguide coupled to a CLCG and configured to selectively propagate light having a wavelength by total internal reflection (TIR).
Figure 17A:
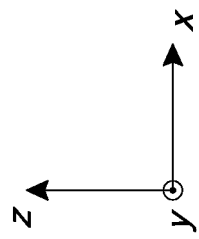

FIG. 17A illustrates a first optical wave-guiding device 1700A comprising a first waveguide 1704A coupled to a first CLCG 1750A and configured to propagate light having a third wavelength $\lambda_3$ by total internal reflection (TIR) when $\theta > \theta_{c3}$. The first CLCG 1750A has a first period $\Lambda_1$ and a first helical pitch $p_1$. According to some embodiments, the first wave-guiding device 1700A may be configured for propagating light by TIR in the visible spectrum (e.g., with wavelengths between about 400 nm and 700 nm). According to some other embodiments, the first wave-guiding device 1700A may be configured for propagating light by TIR in the infrared spectrum (e.g., in the near-infrared portion of the spectrum with wavelengths between about 700 nm and 1400 nm). As described above with respect to FIGS. 10 and 11, Bragg-reflection occurs at a wavelength expressed by Eq. [1] supra and within a bandwidth of wavelength 42 expressed by Eq. [2] supra. For example, the first CLCG 1750A may be designed for coupling by TIR third incident light 1736 having a third wavelength $\lambda_3$ in one of blue color (e.g., about 450 nm), green color (e.g., about 550 nm), red color (e.g., about 650 nm) or in the infrared. As illustrated, when $\Delta\lambda$ is about 60 nm, about 80 nm or about 100 nm, as described supra, first and second light 1716 and 1726 having first and second wavelengths 21, 22 are substantially transmitted because Eq. [1] is not satisfied for these colors, which are not coupled into the first waveguide 1704 because Eq. [4] is not satisfied.

Figure 17B:
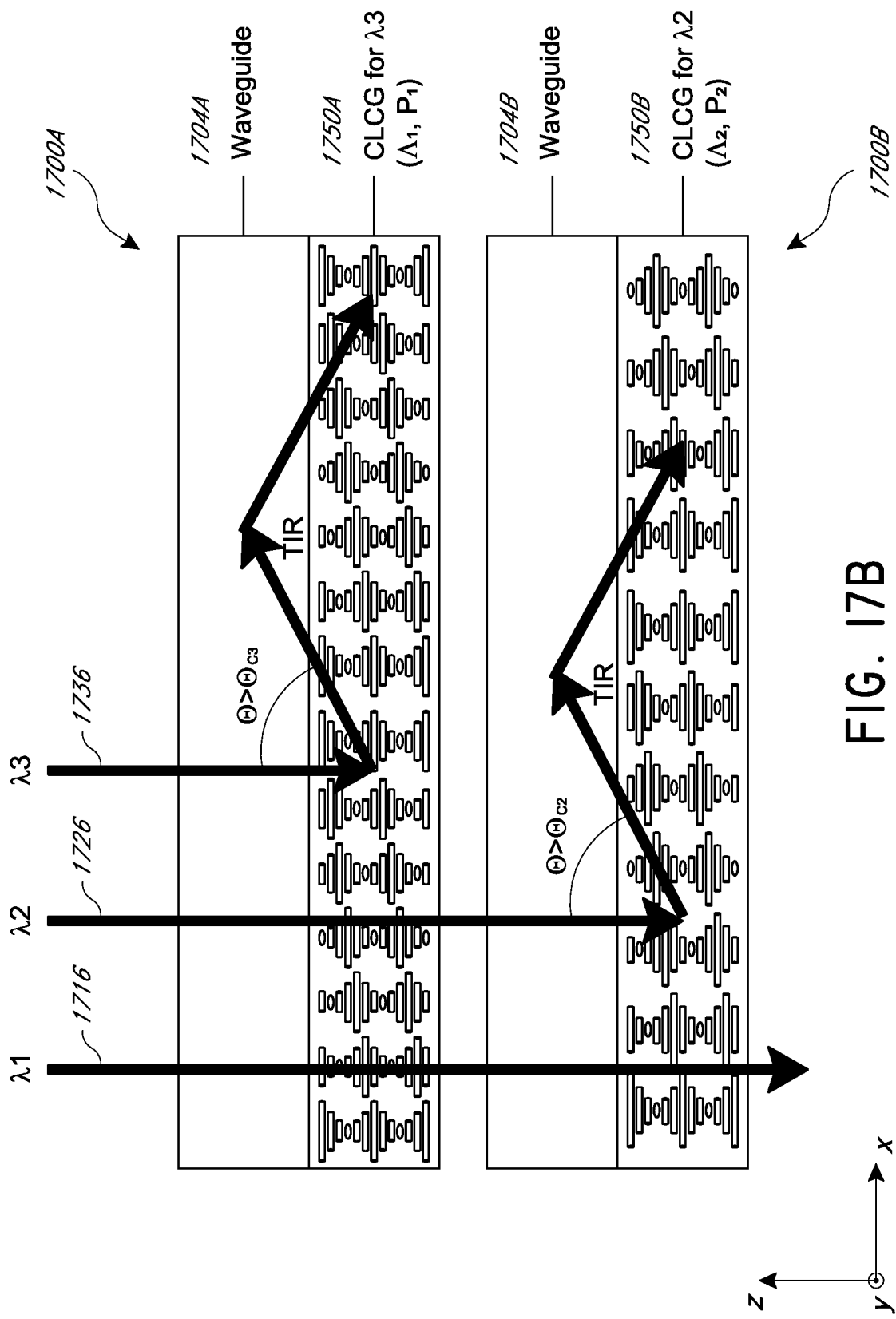
FIG. 17B illustrates an example of a plurality of optical wave-guiding devices in the same optical path, each comprising a waveguide coupled to a CLCG and configured to selectively propagate light having a wavelength by total internal reflection (TIR).

FIG. 17B illustrates a second optical wave-guiding device 1700B combined with the first optical wave-guiding device 1700A illustrated above with respect to FIG. 17A. The optical wave-guiding device 1700B is disposed in the optical path subsequent to the optical wave-guiding device 1700A, and comprises a second waveguide 1704B coupled to a second CLCG 1750B and configured to propagate second light 1726 having a second wavelength $\lambda_2$ by total internal reflection (TIR) when $\theta > \theta_{c2}$. The second CLCG 1750B has a second period $\Lambda_2$ and a second helical pitch $p_2$. As described above with respect to FIG. 17A, first and second light 1716 and 1726 having first and second wavelengths of $\lambda_1$, $\lambda_2$ are substantially transmitted through the first optical wave-guiding device 1700A. Of the transmitted first and second light 1716 and 1726, the second CLCG 1750B may be designed for coupling by TIR the second incident light 1726 having the second wavelength $\lambda_2$ in transmitted one of blue color (e.g., about 450 nm), green color (e.g., about 550 nm), red color (e.g., about 650 nm) or infrared, when $\theta > \theta_{c2}$. Thus, as illustrated, when $\Delta\lambda$ is about 60 nm, about 80 nm or about 100 nm, as described supra, first light 1716 having the first wavelength $\lambda_1$ is substantially transmitted further through the second wave-guiding device 1700B.

Figure 17C:
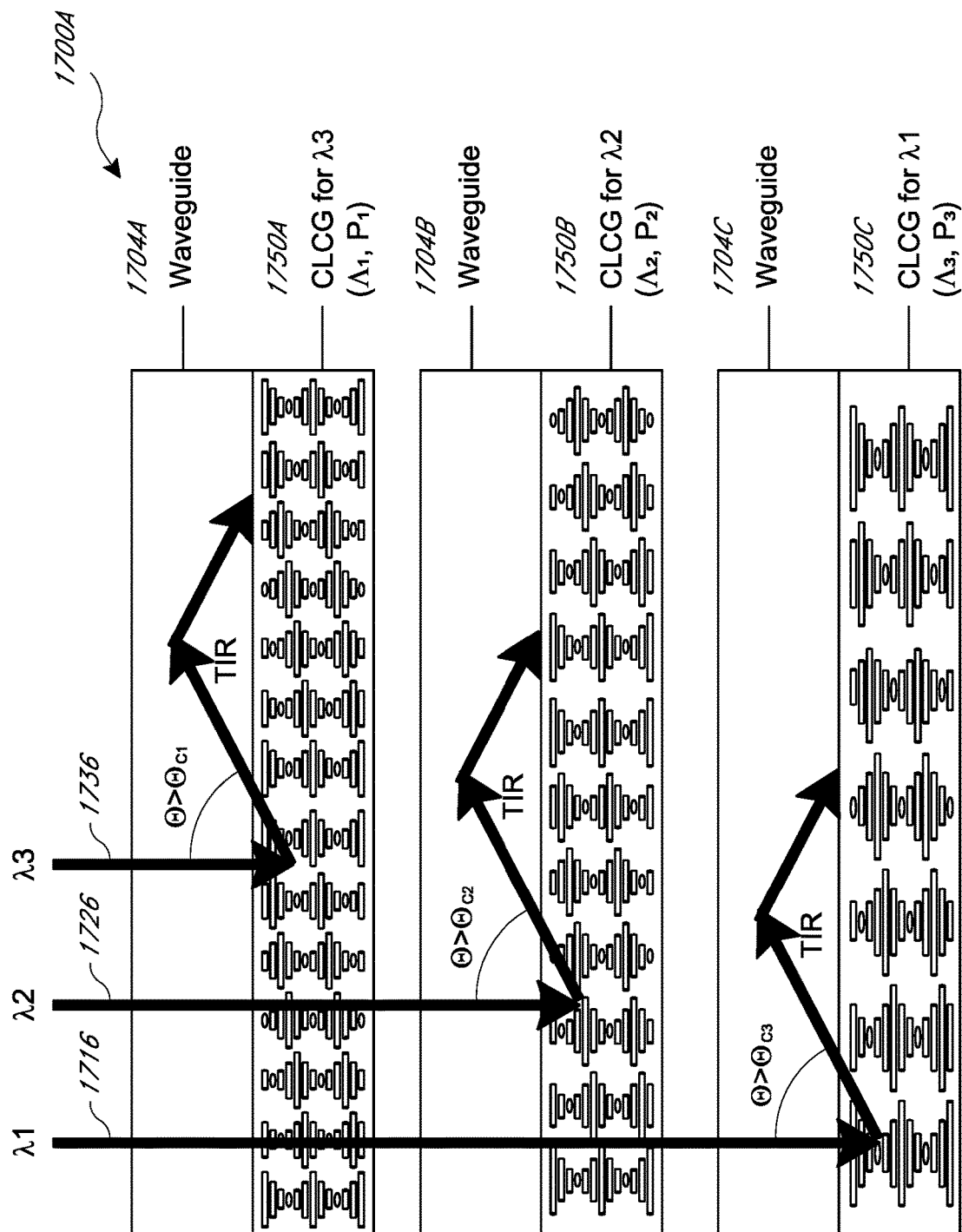
FIG. 17C illustrates an example of a plurality of optical wave-guiding devices in the same optical path, each comprising a waveguide coupled to a CLCG and configured to selectively propagate light having a wavelength by total internal reflection (TIR).

FIG. 17C illustrates a third optical wave-guiding device 1700C combined the first and second optical wave-guiding devices 1700A and 1700B illustrated above with respect to FIG. 17B. The third optical wave-guiding device 1700C is disposed in the optical path subsequent to the first and second optical wave-guiding devices 1700A and 1700B, and comprises a third waveguide 1704C coupled to a third CLCG 1750C and configured to propagate first light 1716 having a first wavelength $\lambda_2$ by total internal reflection (TIR) when $\theta > \theta_{c1}$. The third CLCG 1750C has a third period $\Lambda_3$ and a third helical pitch $p_3$. As described above with respect to FIG. 17B, first light 1716 having first wavelength $\lambda_1$ is substantially is transmitted through the first and second wave-guiding devices 1700A and 1700B. The third CLCG 1750C may be designed for coupling by TIR the first incident light 1716 having the first wavelength $\Delta_1$ in transmitted one of blue color (e.g., about 450 nm), green color (e.g., about 550 nm), red color (e.g., about 650 nm) or infrared when $\theta > \theta_{c1}$. Thus, as illustrated, when $\Delta\lambda$ is about 60 nm, about 80 nm or about 100 nm, as described supra, first light 1716 having the first wavelength $\lambda_1$ is substantially coupled into the third waveguide 1704C because Eq. [4] is satisfied.

Thus, as described above with respect to FIGS. 17A-17C, by placing one or more of the first, second and third optical wave-guiding devices 1700A, 1700B and 1700C in the same optical path, one or more of first, second and third light 1716, 1726 and 1736 having different wavelengths $\lambda_1$, $\lambda_2$ and $\lambda_3$ can be coupled to propagate by TIR in one of first, second and third waveguides 1704A, 1704B and 1704C, respectively. While in each of FIGS. 17A-17C, each of the first to third optical wave-guiding devices 1704A, 1704B and 1704C has a dedicated first to third waveguides 1704A, 1704B and 1704C, respectively, and a dedicated first to third CLCGs 1750A, 1750B and 1750C, embodiments are not so limited. For example, a single waveguide can couple by TIR Bragg-reflected light from a stack of a plurality of CLCGs, as illustrated infra with respect to FIG. 18. In addition, any suitable number of optical wave-guiding devices greater than three (or less than three) can also be combined for further selective coupling by Bragg-reflection.

Figure 18:
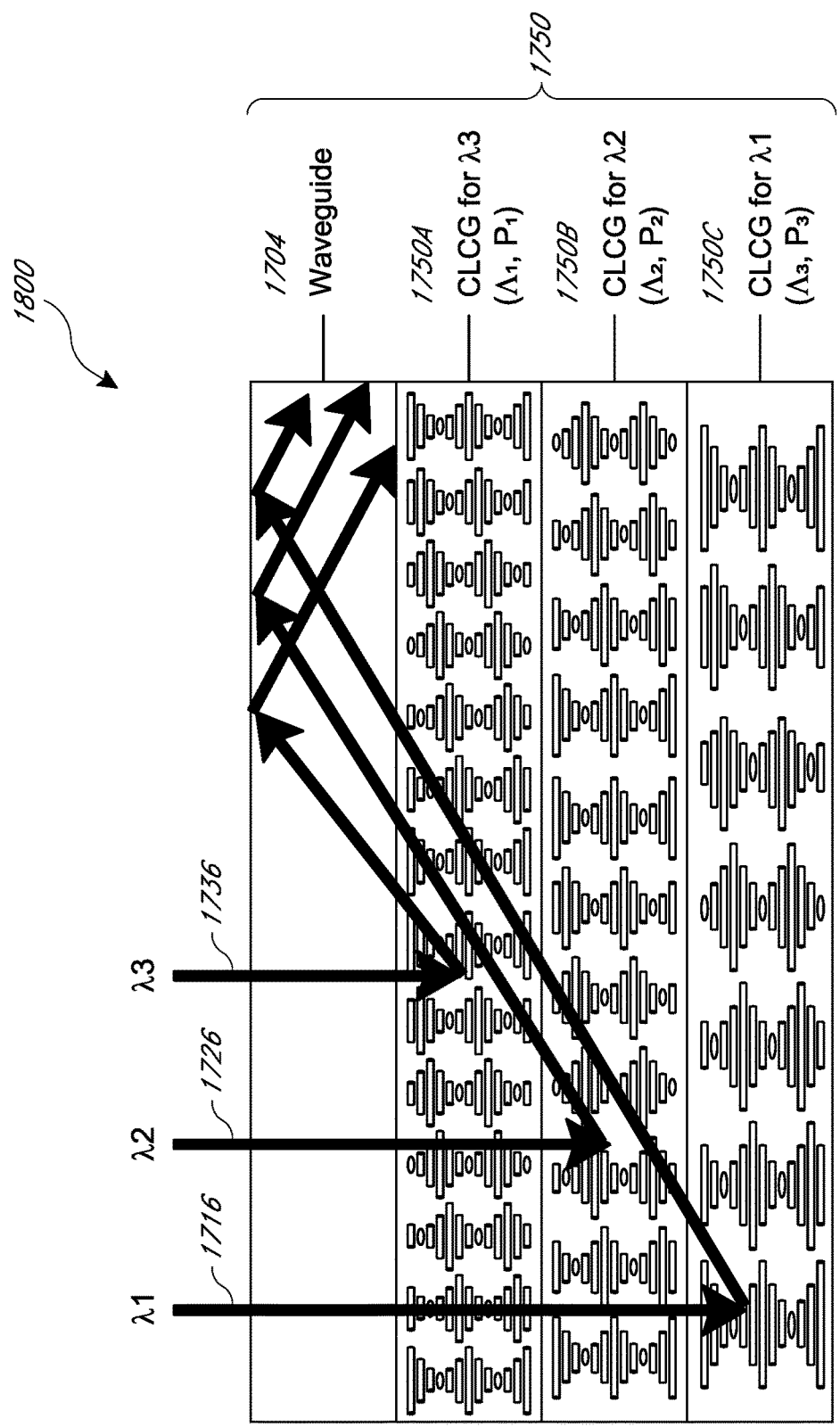
FIG. 18 illustrates an example of an optical wave-guiding device comprising a common waveguide coupled to a plurality of CLCGs and configured to selectively propagate light having a plurality of wavelengths by total internal reflection (TIR).

FIG. 18 illustrates an optical wave-guiding device 1800 comprising a common waveguide 1704 coupled to a plurality of CLCGs 1750. The plurality of CLCGs 1750 is configured as a stack comprising the first to third CLCGs 1750A-1750C and configured to propagate third, second and first light 1736, 1726 and 1716 having third, second and first wavelengths $\lambda_3$, $\lambda_2$ and $\lambda_1$, respectively, by total internal reflection (TIR). The TIR occurs when one or more of third, second and first lights 1736, 1726 and 1716, respectively, satisfies the condition $\theta > \theta_{c3}$ $\theta > \theta_{c2}$ and $\theta > \theta_{c1}$, respectively, in a similar manner as described above with respect to FIGS. 17A-17C. Also in a similar manner, first, second and third CLCGs 1750A, 1750B and 1750C are configured to selectively Bragg-reflect third, second and first light 1736, 1726 and 1716, respectively, when $\theta > \theta_{c3}\theta > \theta_{c2}$ and $\theta > \theta_{c1}$. Of course, any suitable number CLCGs less than or greater than three (or less than three) can be stacked for further selective coupling by Bragg-reflection. Thus, compared to the embodiments described above with respect to FIGS. 17B and 17C, a more compact wave-guiding device 1800 can be obtained by employing a common waveguide 1704. Also, instead of three distinct CLCG layers (as shown in FIG. 18), the stack of CLCG layers could be arranged as a single (or multiple) layers having a helical pitch gradient comprising the range from $p_1$ to $p_3$.

As described above with respect to FIGS. 17A-18, first to third CLCGs 1750, 1750B, 1750C have first to third periods $\Lambda_1$, $\Lambda_2$ and $\Lambda_3$, respectively and first to third helical pitches $p_1$, $p_2$ and $p_3$, respectively. In various embodiments, each of the CLCGs can be configured such that the wavelength/period ratio $\lambda/\Lambda$ is between about 0.3 and 2.3, between about 0.8 and 1.8 or between about 1.1 and about 1.5, for instance about 1.3. Alternatively, the period ($\Lambda$) can be configured to be between about 1 nm and 250 nm smaller, between about 50 nm and 200 nm smaller or between about 80 nm and 170 nm smaller, than the respective wavelength ($\lambda$) that the CLCGs are configured for Bragg reflection. For example, when $\lambda_1$, $\lambda_2$ and $\lambda_3$ are within the visible range, e.g., about 620 nm to about 780 nm, for instance about 650 nm (red), about 492 nm to about 577 nm, for instance 550 nm (green), and about 435 nm to about 493 nm, for instance about 450 nm (blue), respectively, the corresponding periods $\Lambda_1$, $\Lambda_2$ and $\Lambda_3$ can be about 450 nm to about 550 nm, for instance about 500 nm, about 373 nm to about 473 nm, for instance about 423 nm, and about 296 nm to about 396 nm, for instance about 346 nm, respectively. Alternatively, when $\Lambda_1$, $\Lambda_2$ and $\Lambda_3$ are in the infrared range, e.g., in the near infrared range between about 750 nm to about 1400 nm, for instance about 850 nm, the corresponding periods $\Lambda_1$, $\Lambda_2$ and $\Lambda_3$ can be about 975 nm to about 1820 nm, for instance about 1105 nm. In addition, various embodiments, each of the CLCGs can be configured such that the wavelength/helical pitch ratio $\lambda/p$ is between about 0.6 and 2.6, between about 1.1 and 2.1 or between about 1.4 and about 1.8, for instance about 1.6. Alternatively, the helical pitch (p) can be configured to be between about 50 nm and 350 nm smaller, between about 100 nm and 300 nm smaller or between about 140 nm and 280 nm smaller, than the respective wavelength ($\lambda$) that the CLCGs are configured for Bragg reflection. For example, when $\lambda_1$, $\lambda_2$ and $\lambda_3$ are about 620 nm to about 780 nm, for instance about 650 nm (red), about 492 nm to about 577 nm, for instance 550 nm (green), and about 435 nm to about 493 nm, for instance about 450 nm (blue), respectively, the corresponding helical pitches $p_1$, $p_2$ and $p_3$ can be about 350 nm to about 450 nm, for instance about 400 nm, about 290 nm to about 390 nm, for instance about 340 nm and about 230 nm to about 330 nm, for instance about 280 nm, respectively. Alternatively, when $\Lambda_1$, $\lambda_2$ and $\lambda_3$ are in the infrared range, e.g., in the near infrared range between about 750 nm to about 1400 nm, for instance about 850 nm, the corresponding periods $\Lambda_1$, $\Lambda_2$ and $\Lambda_3$ can be about 1200 nm to about 2240 nm, for instance about 1360 nm.

Figure 19:
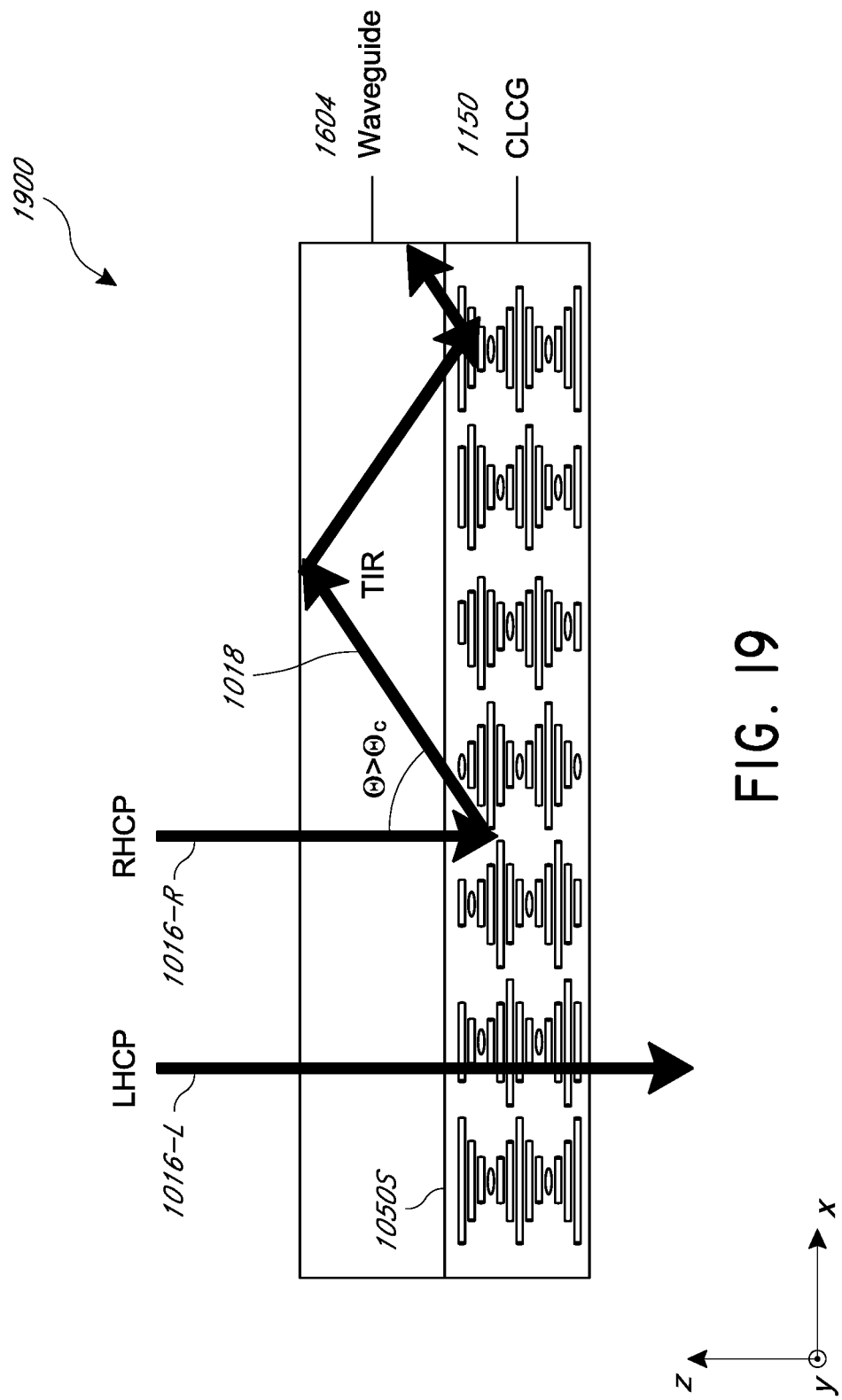
FIG. 19 illustrates an example of an optical wave-guiding device comprising a waveguide coupled to a CLCG and configured to propagate light by total internal reflection (TIR).

Waveguides Coupled with CLCG and a Mirror for Wavelength-Selective Light Coupling FIG. 19 illustrates an optical wave-guiding device 1900 comprising a waveguide 1604 coupled to a CLCG 1150, similar to the optical wave-guiding device described supra with respect to FIG. 16. As described supra with respect to FIGS. 10 and 11, in operation, when the handedness of polarization of the elliptical/circularly polarized incident light has the same direction of rotation as the liquid crystal molecules of the chiral structures of the CLCG 1150, the CLCG 1150 substantially reflects the incident light. As illustrated, incident on the surface 1050S are light beams 1016-L having a left-handed circular polarization and light beams 1016-R having a right-handed circular polarization. In the illustrated embodiment, the liquid crystal molecules of the chiral structures are successively rotated in a clockwise direction when viewing the direction in which incident light beams 1016-L, 1016-R travel, i.e., the negative z-direction, such that the rotation direction of the liquid crystal molecules match the handedness of the light teams 1016-R having a right-handed circular polarization. As a result, the light beams 1016-R having a right-handed circular polarization are substantially reflected by the CLCG 1150, whereas the light beams 1016-L having a left-handed circular polarization are substantially transmitted through the CLCG 1150.

For some applications, it may be desirable to flip the polarization handedness of an elliptical or circular polarized light prior to coupling into a wave-guiding device similar to that described above with respect to FIG. 19. Such may the case, e.g., when the polarization handedness of the incident elliptical or circular polarized light does not match the rotation direction of the chiral structures in the CLCG such that the CLCG is not configured to be Bragg-reflect the light for coupling into the waveguide, as discussed supra. For some other applications, it may be desirable to recycle light that is transmitted through the CLCG due to a lack of match between the polarization handedness of the incident elliptical or circular polarized light and the rotation direction of the chiral structures in the CLCG. To address these and other needs, in the following, various embodiments of wave-guiding devices employing a polarization converting reflector to address these needs are disclosed.

Figure 20:
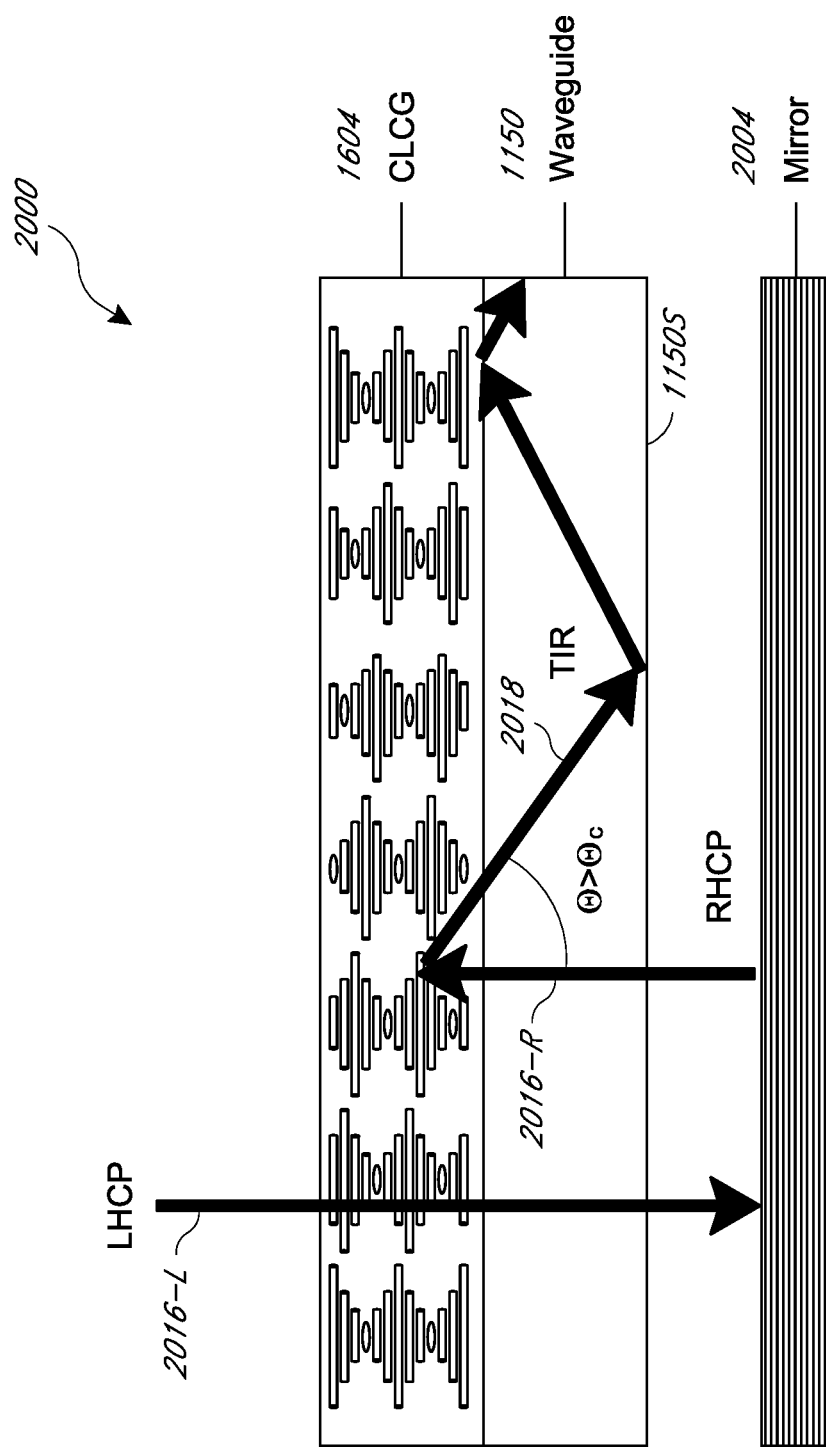
FIG. 20 illustrates an example of an optical wave-guiding device comprising a waveguide coupled to a CLCG and a polarization converting reflector, where the CLCG is configured to receive incident light and the waveguide is configured to propagate light Bragg-reflected from the CLCG by total internal reflection (TIR).

FIG. 20 illustrates an optical wave-guiding device 2000 comprising a waveguide 1150 coupled to a CLCG 1604 and a polarization converting reflector 2004, where the CLCG 1604 is configured to receive incident light and the waveguide 1150 is configured to propagate light Bragg-reflected from the CLCG by total internal reflection (TIR). The polarization converting reflector 2004 is configured such that, upon reflection therefrom, the polarization handedness of an incident elliptically or circularly polarized light is flipped to an opposite polarization handedness (e.g., left-handed to right-handed, or right-handed to left-handed). The wave-guiding device 2000 is similar to the wave-guiding device 1900 described above with respect to FIG. 19 except, instead of being configured to first receive an incident light beam through the waveguide 1150, the wave-guiding device 2000 is configured to first receive an incident light beam 2016-L having, e.g., a left-handed circular polarization, through the CLCG 1604. The incident light beam 2016-L has a polarization handedness that does not match the rotation direction of the chiral structures in the CLCG 1604 when viewed in the propagation direction (negative z-direction) of the incident light beam 2016-L, such that it is not Bragg-reflected by the CLCG 1604. As a result, the incident light beam 2016-L is substantially transmitted through the CLCG 1604 and subsequently reflected by the polarization converting reflector 2004. The reflected light beam 2016-R having, e.g., a right-handed circular polarization, thereby becomes an incident light beam on the surface 1150S of the waveguide 1150. Because of the flipped polarization handedness, the reflected light beam 2016-R now incident on surface 1150S of the waveguide 1150 has a polarization handedness that matches the rotation direction of the chiral structures in the CLCG 1604 when viewed in the propagation direction of reflected light beam 2016-R (positive z-direction), such that it is Bragg-reflected by the CLCG 1604. The reflected light beam 2016-R that is reflected as further reflected beam 2018 reflected at an angle $\theta > \theta_c$ relative to the layer normal direction (z-axis) couples to and travels through the waveguide 1150 in a lateral direction (e.g., x-direction).

Figure 21A:
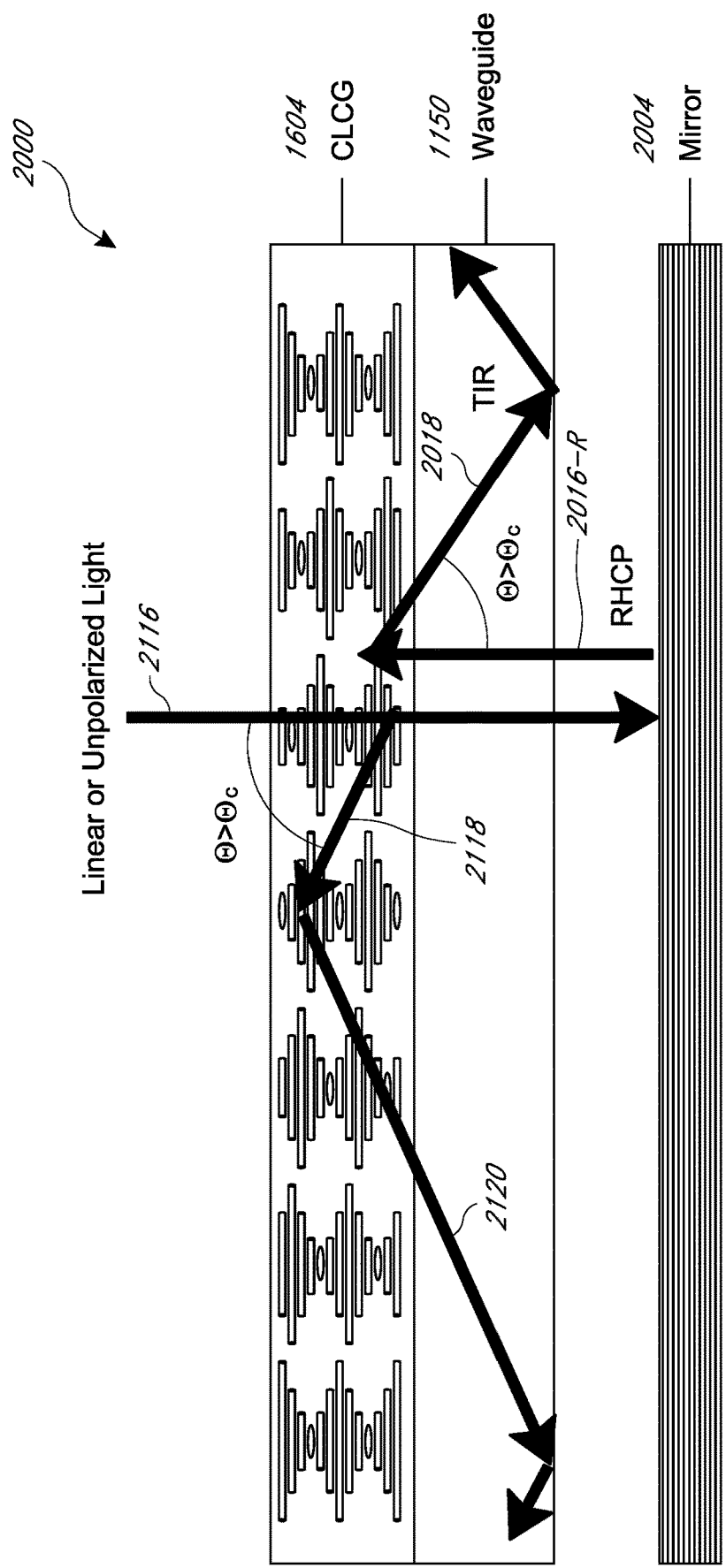
FIG. 21A illustrates the optical wave-guiding device of FIG. 20, where the CLCG is configured to receive incident light that is linearly polarized or unpolarized, and where the waveguide is configured to propagate light Bragg-reflected from the CLCG and light reflected by the reflector by total internal reflection (TIR).

FIG. 21A illustrates the optical wave-guiding device 2000 described above with respect to FIG. 20 under a condition in which the incident light beam 2116 is linearly polarized or unpolarized, each of which can be treated as comprising both left-handed and right-handed circular polarization components. Under such conditions, the incident light beam 2116 can be coupled into a waveguide by TIR in opposing lateral directions. For example, similar to as described above with respect to FIG. 20, the component of the incident light beam 2116 that has a polarization handedness, e.g., left-handedness, that does not match the rotation direction of the chiral structures in the CLCG 1604 is substantially transmitted through the CLCG 1604 and subsequently reflected by the polarization converting reflector 2004, to be flipped in polarization handedness, e.g., flipped to right-handedness, and coupled into and travels through the waveguide 1150 in a first lateral direction (e.g., positive x-direction). On the other hand, similar to as described above with respect to FIG. 19, the component of the incident light beam 2116 that has a polarization handedness, e.g., right-handedness, that matches the rotation direction of the chiral structures in the CLCG 1604, is substantially directly reflected by the CLCG 1604 and subsequently coupled into and travels through the waveguide 1150 in a second lateral direction opposite the first lateral direction (e.g., negative x-direction).

Figure 21B:
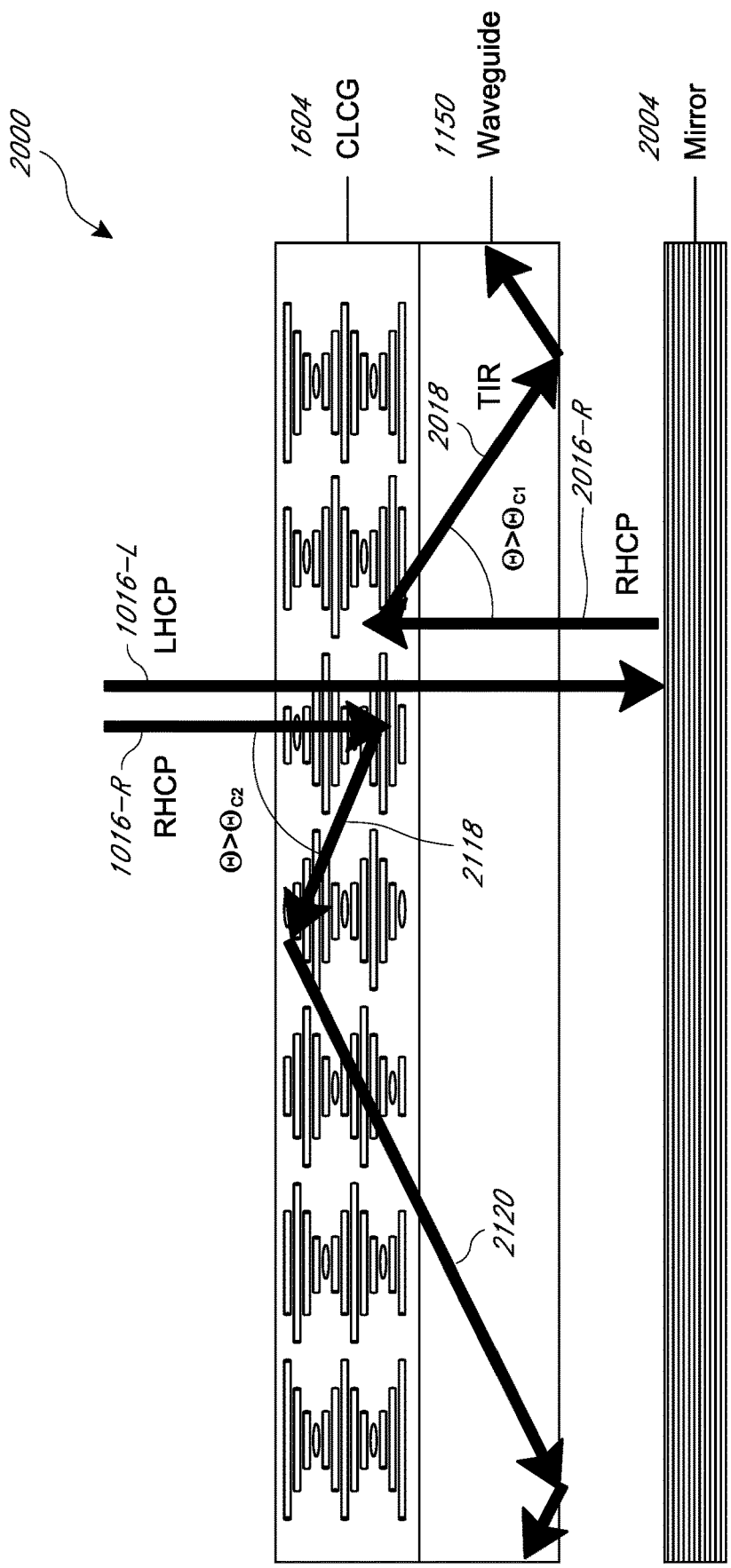
FIG. 21B illustrates the optical wave-guiding device of FIG. 20, where the CLCG configured to receive incident light that is polarized into orthogonal elliptical or circular polarized light beams, and where the waveguide is configured to propagate light Bragg-reflected from the CLCG and light reflected by the reflector by total internal reflection (TIR).

FIG. 21B illustrates the optical wave-guiding device 2000 described above with respect to FIG. 21A under a condition in which the incident light is polarized into two orthogonal elliptical or circular polarized light beams, e.g., light beams 1016-L having left-handed circular polarization and light beams 1016-R having right-handed circular polarization. Under such conditions, the incident light beams 1016-L, 1016-R can be coupled into a waveguide by TIR to propagate in opposing lateral directions, in a similar manner as described with respect to FIG. 21A, supra. For example, the light beams 1016-L that has a polarization handedness, e.g., left-handedness, that does not match the rotation direction of the chiral structures in the CLCG 1604 is substantially transmitted through the CLCG 1604 and subsequently reflected by the polarization converting reflector 2004, to be flipped in polarization handedness, e.g., flipped to right-handedness, and coupled into and travels through the waveguide 1150 in a first lateral direction (e.g., positive x-direction). On the other hand, the incident light beam 1016-R that has a polarization handedness, e.g., right-handedness, that matches the rotation direction of the chiral structures in the CLCG 1604, is substantially directly reflected by the CLCG 1604 and subsequently coupled into and travels through the waveguide 1150 in a second lateral direction opposite the first lateral direction (e.g., negative x-direction).

Figure 22A:
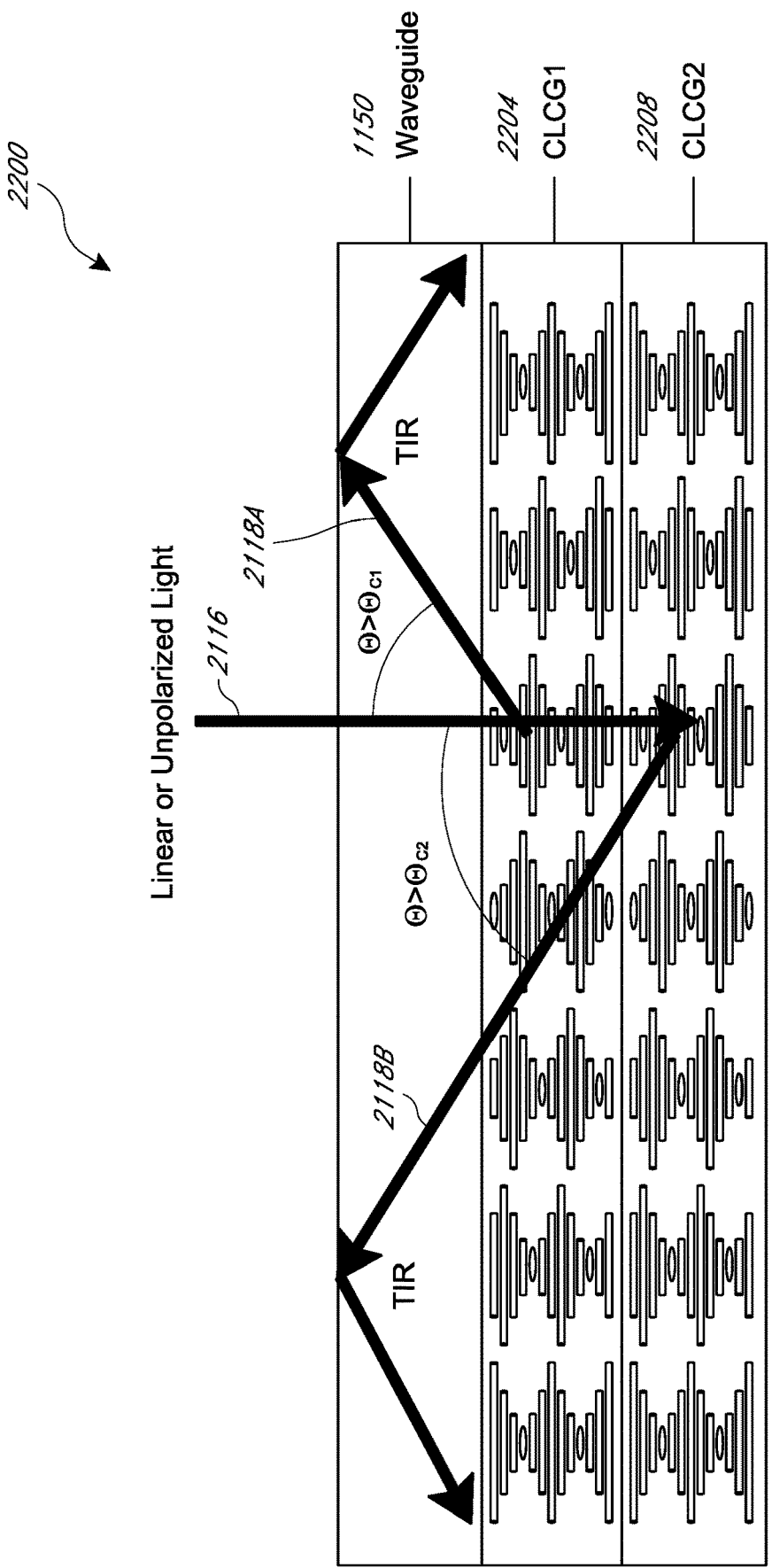
FIG. 22A illustrates an example of an optical wave-guiding device comprising a plurality of CLC layers coupled to a common waveguide, including a first CLC layer having chiral structures having a first rotation direction and a second CLC layer having chiral structures having a second rotation direction opposite to the first rotation direction, under a condition in which the incident light beam is linearly polarized or unpolarized.

FIG. 22A illustrates an optical wave-guiding device 2200 comprising a common waveguide 2204 coupled to a plurality of CLCGs that are, e.g., arranged as a stack, including a first CLCG 2204 having chiral structures having a first rotation direction and a second CLCG 2208 having chiral structures having a second rotation direction opposite to the first rotation direction. As described supra with respect to various embodiments, in operation, when the direction of polarization direction of an incident light beam is matched to the direction of rotation of the liquid crystal molecules of chiral structures of a CLCG, the incident light is reflected. The illustrated optical wave-guiding device 2200 is under a condition in which the incident light beam 2116 is linearly polarized or unpolarized. Under such conditions, the incident light beam 2116 can be coupled into a waveguide by TIR in both of opposing lateral directions (positive and negative x directions). In the illustrated embodiment, when viewing in the direction in which incident light 2116 travels, i.e., the negative z-direction, the liquid crystal molecules of the chiral structures of the first CLCG 2204 are successively rotated in a clockwise direction, while the liquid crystal molecules of the chiral structures of the second CLCG 2204 are successively rotated in the opposite counterclockwise direction.

Still referring to FIG. 22A, the component of the elliptical or circular incident light beam 2116 that has a first polarization handedness, e.g., right-handed polarized component, that matches the rotation direction of the chiral structures of the first CLCG 2204, e.g., clockwise direction, is substantially reflected by the first CLCG 2204, thereby resulting in a first reflected beam 2118A at an angle $\theta > \theta_{c1}$ relative to the layer normal direction (z-axis), and couples to and travels through the common waveguide 2204 in a first lateral direction (e.g., positive x-direction).

Still referring to FIG. 22A, on the other hand, the component of the elliptical or circular incident light beam 2116 that has a second polarization handedness, e.g., left-handed polarized component, that does not match the rotation direction of the chiral structures of the first CLCG 2204, is substantially transmitted through the first CLCG 2204. After being transmitted through the first CLCG 2204, the elliptical or circular incident light beam 2116 that has the second polarization handedness 2116 that does match the rotation direction of the chiral structures of the second CLCG 2208, e.g., counter-clockwise direction, is substantially reflected by the second CLCG 2208, thereby resulting in a second reflected beam 2118B at an angle $\theta > \theta_{c2}$ relative to the layer normal direction (z-axis), and couples to and travels through the common waveguide 2204 in a second lateral direction (e.g., negative x-direction).

Figure 22B:
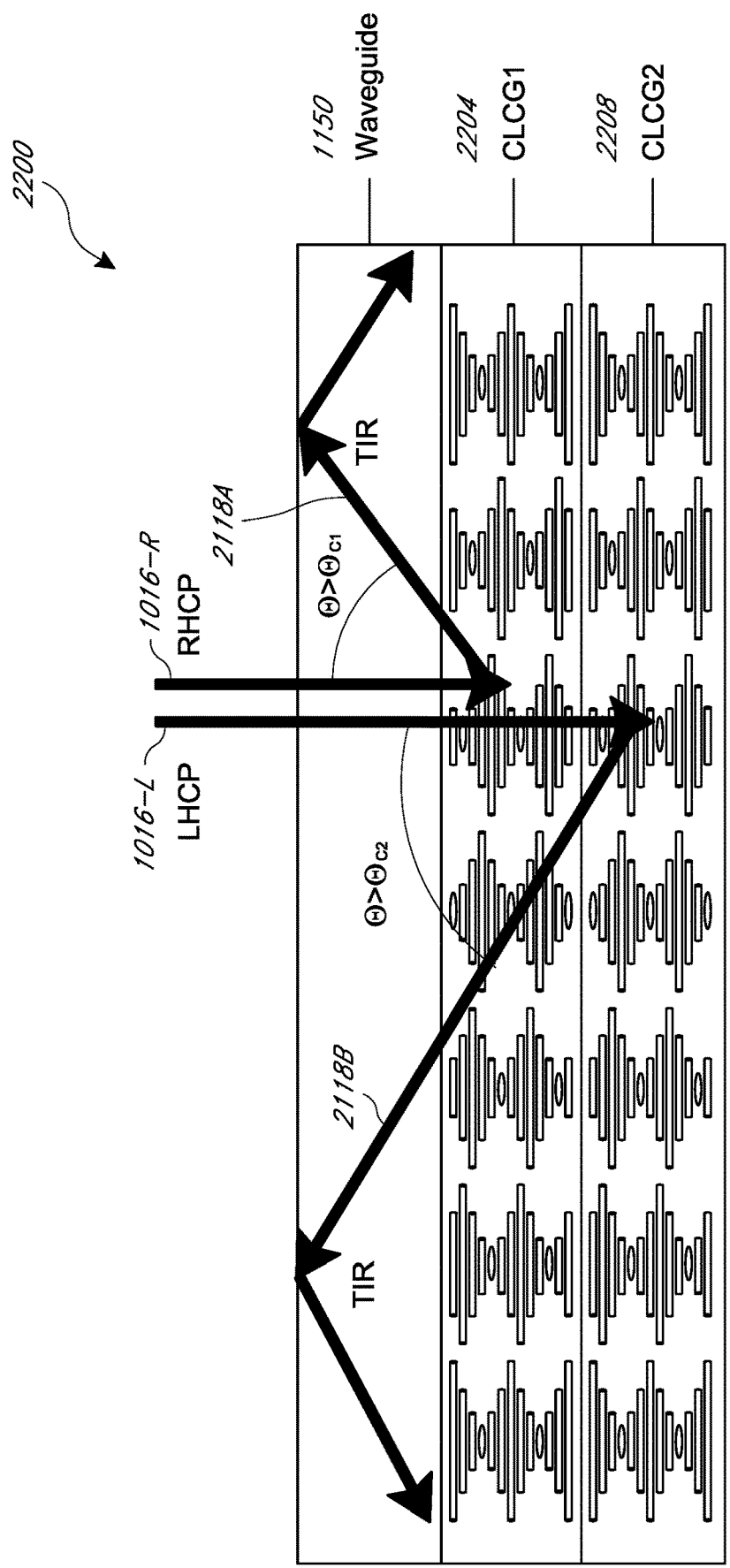
FIG. 22B illustrates the optical wave-guiding device of FIG. 22A, under a condition in which the incident light is polarized into orthogonal elliptical or circular polarized light beams.

FIG. 22B illustrates the optical wave-guiding device 2000 described above with respect to FIG. 22A under a different condition in which the incident light is polarized into two orthogonal elliptical or circular polarized light beams, e.g., light beams 1016-L having, e.g., a left-handed elliptical/circular polarization and light beams 1016-R having, e.g., a right-handed elliptical/circular polarization. Under such condition, the incident light beams 1016-L, 1016-R can be coupled into the common waveguide 2204 by TIR in opposing lateral directions, in a similar manner as described with respect to FIG. 22A, supra, for coupling the incident light beams 1016-L, 1016-R having first and second polarization handedness, e.g., left-handedness and right-handedness.

The embodiments described above with respect to FIGS. 21B and 22B can be particularly advantageous in certain applications, e.g., where different light signals (e.g., images) are encoded in orthogonal circular polarizations. Under such circumstances, light can be coupled into the opposite directions (e.g., positive and negative x-directions) depending on the polarization handedness.

Figure 22C:
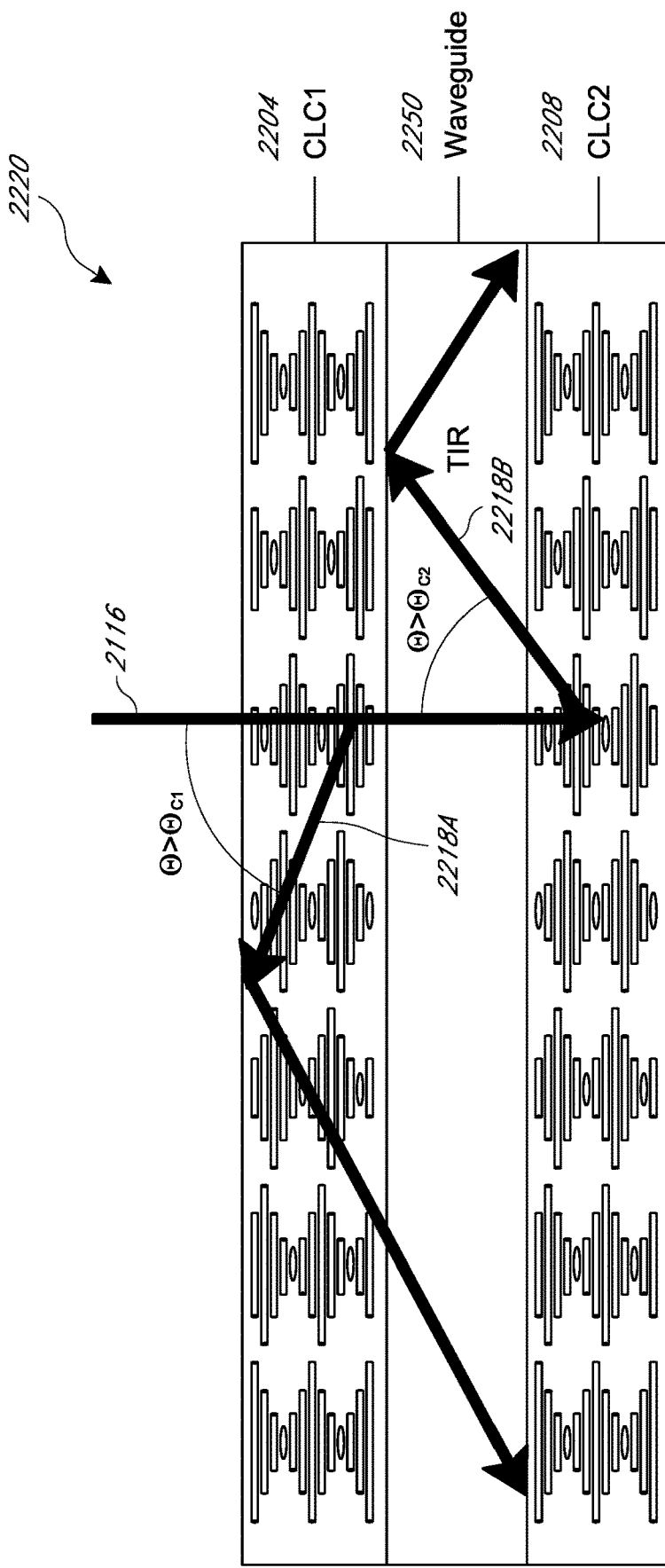
FIG. 22C illustrates an example of an optical wave-guiding device comprising a plurality of CLC layers coupled to a common waveguide interposed between two CLC layers, including a first CLC layer having chiral structures having a first rotation direction and a second CLC layer having chiral structures having a second rotation direction opposite to the first rotation direction, under a condition in which the incident light beam is linearly polarized or unpolarized.

FIG. 22C illustrates an optical wave-guiding device 2220 comprising a common waveguide 2250 coupled to a plurality of CLCGs, e.g., arranged as a stack, including a first CLCG 2204 having chiral structures having a first rotation direction and a second CLCG 2208 having chiral structures having a second rotation direction opposite to the first rotation direction. Unlike the embodiments described with respect to FIGS. 22A and 22B, in the wave-guiding device 2220, the common waveguide 2250 is interposed between the first and second CLCG layers 2204, 2208. For illustrative purposes, the illustrated optical wave-guiding device 2220 is under a condition in which the incident light beam 2116 is linearly polarized or unpolarized. Under such conditions, the incident light beam 2116 can be coupled into a waveguide by TIR in opposing lateral directions. In the illustrated embodiment, when viewing the direction in which incident light 2116 travels, i.e., the negative z-direction, the liquid crystal molecules of the chiral structures of the first CLCG 2204 are successively rotated in a clockwise direction, while the liquid crystal molecules of the chiral structures of the second CLCG 2204 are successively rotated in the opposite counterclockwise direction. Of course, opposite arrangement is possible.

Still referring to FIG. 22C, the component of the elliptical or circular incident light beam 2116 that has a first polarization handedness, e.g., right-handed polarized component, that matches the rotation direction of the chiral structures of the first CLCG 2204, e.g., clockwise direction, is substantially reflected by the first CLCG 2204, thereby resulting in a first reflected beam 2118A at an angle $\theta > \theta_{c1}$ relative to the layer normal direction (z-axis), which in turn reflects off of the outer surface of the first CLCG 2204, before coupling into and traveling through the common waveguide 2250 in a first lateral direction (e.g., negative x-direction) by TIR.

Still referring to FIG. 22C, on the other hand, the component of the elliptical or circular incident light beam 2116 that has a second polarization handedness, e.g., left-handed polarized component, that does not match the rotation direction of the chiral structures of the first CLCG 2204, e.g., clockwise direction, is substantially transmitted through the first CLCG 2204 and further through the common waveguide 2204, and thereafter substantially reflected by the second CLCG 2208, thereby resulting in a second reflected beam 2218B at an angle $\theta > \theta_{c2}$ relative to the layer normal direction (z-axis), and couples to and travels through the common waveguide 2250 in a second lateral direction (e.g., positive x-direction) by TIR.

Cholesteric Liquid Crystal Off-Axis Mirror

As described supra with respect to various embodiments, by matching the handedness of polarization of incident elliptically or circularly polarized light with the direction of rotation as the liquid crystal molecules of the chiral structures of a CLC layer, the CLC layer can be configured as a Bragg reflector. Furthermore, one or more CLC layers having different helical pitches can be configured as a wave-length selective Bragg reflector with high bandwidth. Based on the concepts described herein with respect to various embodiments, the CLC layers can be configured as an off-axis mirror configured to selectively reflect a first range of wavelengths, for example, infrared wavelengths (e.g., the near infrared), while transmitting another range of wavelengths, e.g., visible wavelengths. In the following, applications of various embodiments of CLC off-axis mirrors implemented in eye-tracking systems are disclosed.

Figure 23:
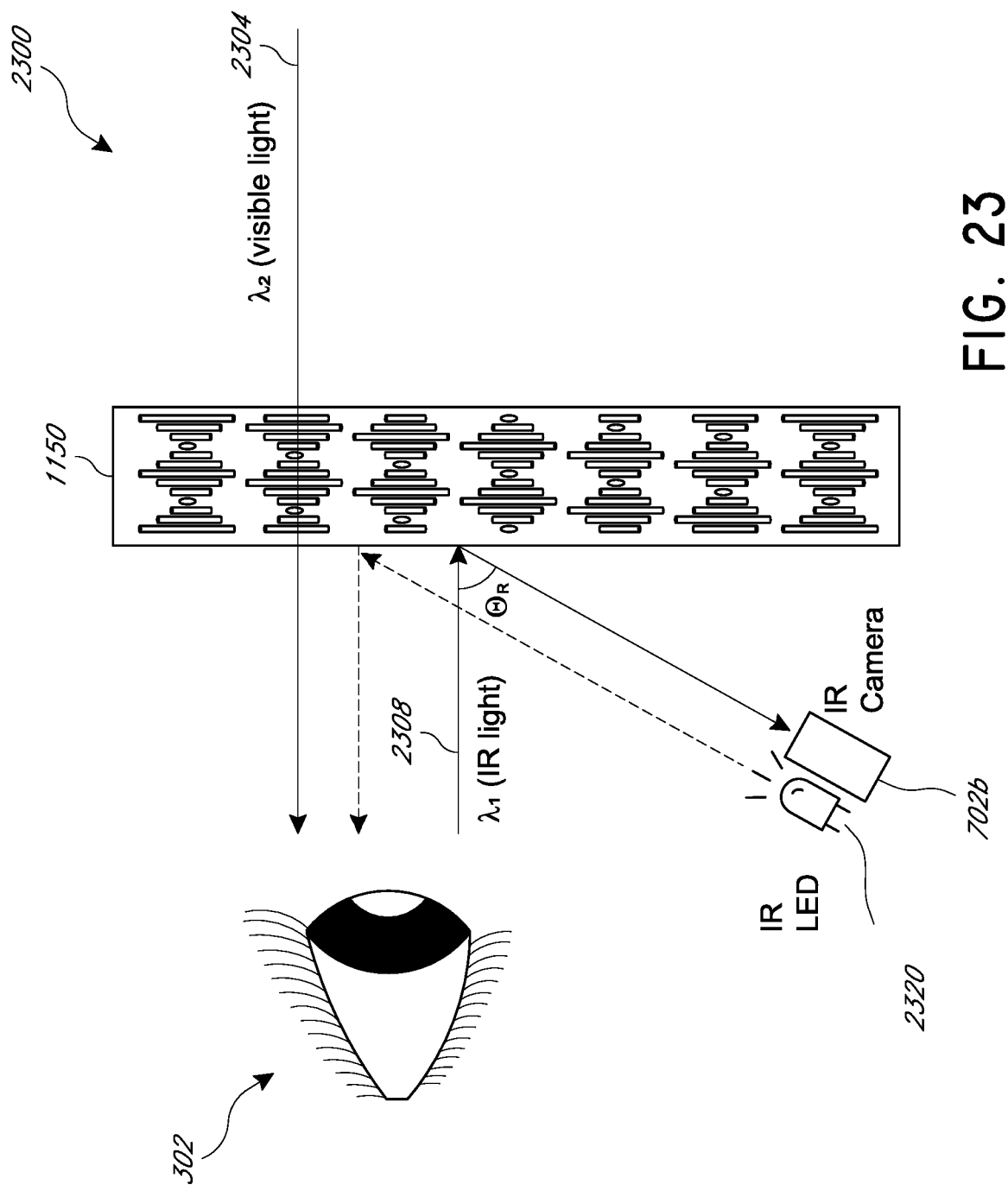
FIG. 23 illustrates an example of an imaging system comprising a forward-facing camera configured to images a wearer's eye using a cholesteric liquid crystal (CLC) off-axis mirror.

FIG. 23 illustrates an example of an eye-tracking system 2300 employing a cholesteric liquid crystal reflector (CLCR), e.g., a wavelength-selective CLCR 1150 configured to image an eye 302 of a viewer, according to various embodiments. Eye tracking can be a key feature in interactive vision or control systems including wearable displays, e.g., the wearable display system 200 in FIG. 2 or the systems 700 described in FIGS. 24A-24H, for virtual/augmented/mixed reality display applications, among other applications. To achieve good eye tracking, it may be desirable to obtain images of the eye 302 at low perspective angles, for which it may in turn be desirable to dispose an eye-tracking camera 702b near a central position of viewer's eyes. However, such position of the camera 702b may interfere with user's view. Alternatively, the eye-tracking camera 702b may be disposed to a lower position or a side. However, such position of the camera may increase the difficulty of obtaining robust and accurate eye tracking since the eye images are captured at a steeper angle. By configuring the CLCR 1150 to selectively reflect infrared (IR) light 2308 (e.g., having a wavelength of 850 nm) from the eye 302 while transmitting visible light 2304 from the world as shown in FIG. 4, the camera 702b can be placed away from the user's view while capturing eye images at normal or low perspective angles. Such configuration does not interfere with user's view since visible light is not reflected. The same CLCR 1150 can also be configured as an IR illumination source 2320, as illustrated. A low perspective angle of IR illuminator can results in less occlusions, e.g., from eye lashes, which configuration allows more robust detection of specular reflections, which can be key feature in modern eye-tracking systems.

Still referring to FIG. 23, according to various embodiments, the CLCR 1150 comprises one or more cholesteric liquid crystal (CLC) layers each comprising a plurality of chiral structures, wherein each chiral structure comprises a plurality of liquid crystal molecules that extend in a layer depth direction (e.g., z-direction) and are successively rotated in a first rotation direction, as described supra. The arrangements of the liquid crystal molecules of the chiral structures vary periodically in a lateral direction perpendicular to the layer depth direction such that the one or more CLC layers are configured to substantially Bragg-reflect a first incident light having a first wavelength ($\lambda_1$) while substantially transmitting a second incident light having a second wavelength ($\lambda_2$). As described elsewhere in the specification, each of the one or more CLC layers are configured to substantially Bragg-reflect elliptically or circularly polarized first and second incident light having a handedness of polarization that is matched to the first rotation direction, when viewed in the layer depth direction, while being configured to substantially transmit elliptically or circularly polarized first and second incident light having a handedness of polarization that is opposite to the first rotation direction, when viewed in the layer depth direction. According embodiments, the arrangements of the liquid crystal molecules varying periodically in the lateral direction are arranged to have a period in the lateral direction such that a ratio between the first wavelength and the period is between about 0.5 and about 2.0. According to embodiments, the first wavelength is in the near infrared range between about 600 nm and about 1.4 µm, for instance about 850 nm and the second wavelength in is in the visible range having one or more colors as described elsewhere in the specification. According to embodiments, the liquid crystal molecules of the chiral structures are pre-tilted relative to a direction normal to the layer depth direction. As configured, the one or more CLC layers are configured such that the first incident light is reflected at an angle ($\theta_R$) relative to the layer depth direction (z-direction) exceeding about 50°, about 60°, about 70° or about 80° degrees relative to the layer depth direction based on, e.g., Eq. [3] described supra.

Referring back to FIG. 2, the eyes of the wearer of a head mounted display (HMD) (e.g., the wearable display system 200 in FIG. 2) can be imaged using a reflective off-axis Diffractive Optical Element (DOE), which may be for example, a Holographic Optical Element (HOE). The resulting images can be used to track an eye or eyes, image the retina, reconstruct the eye shape in three dimensions, extract biometric information from the eye (e.g., iris identification), etc.

There are a variety of reasons why a head mounted display (HMD) might use information about the state of the eyes of the wearer. For example, this information can be used for estimating the gaze direction of the wearer or for biometric identification. This problem is challenging, however, because of the short distance between the HMD and the wearer's eyes. It is further complicated by the fact that gaze tracking requires a larger field of view, while biometric identification requires a relatively high number of pixels on target on the iris. For an imaging system which will attempt to accomplish both of these objectives, the requirements of the two tasks are largely at odds. Finally, both problems are further complicated by occlusion by the eyelids and eyelashes. Embodiments of the imaging systems described herein address some or all of these problems. The various embodiments of the imaging systems 700 described herein with reference to FIGS. 24A-24F can be used with HMD including the display devices described herein (e.g., the wearable display system 200 shown in FIG. 2 and/or the display system 1000 shown in FIG. 6).

Figure 24A:
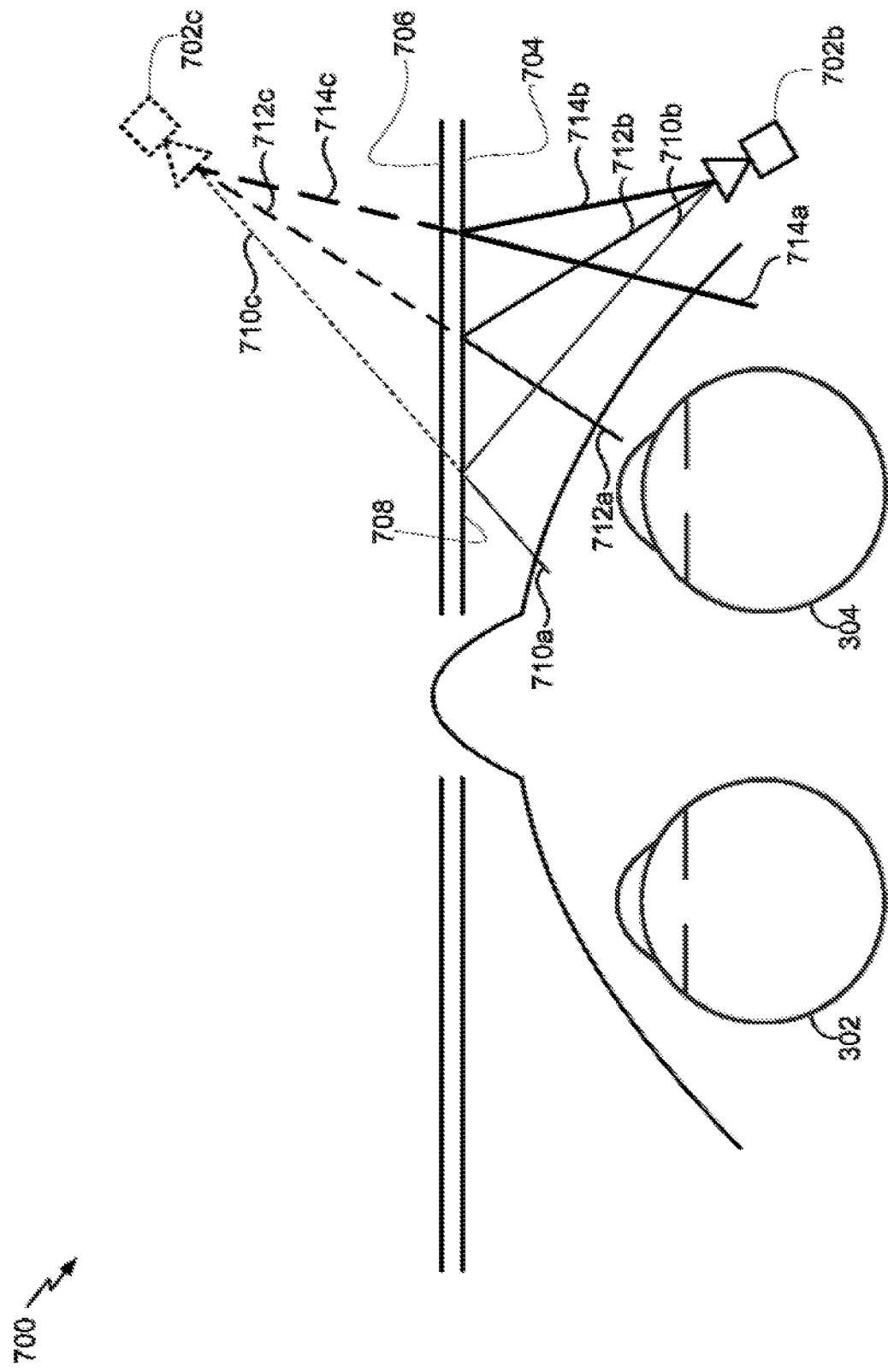
FIGS. 24A-24F illustrate examples of imaging systems comprising a forward-facing camera configured to images a wearer's eye using a CLC off-axis mirror.

FIG. 24A schematically illustrates an example of an imaging system 700 that comprises an imager 702b which is used to view the eye 304, and which is mounted in proximity to the wearer's temple (e.g., on a frame 64 of the wearable display system 200, FIG. 2, for example, an ear stem). In other embodiments, a second imager is used for the wearer's other eye 302 so that each eye is separately imaged. The imager 702b can include an infrared digital camera that is sensitive to infrared radiation. The imager \702b is mounted so that it is facing forward (in the direction of the wearer's vision), rather than facing backward and directed at the eye 304 (as with the camera 500 shown in FIG. 6). By disposing the imager 702b nearer the ear of the wearer, the weight of the imager 702b is also nearer the ear, and the HMD may be easier to wear as compared to an HMD where the imager is backward facing and disposed nearer to the front of the HMD (e.g., close to the display 62, FIG. 2). Additionally, by placing the forward-facing imager 702b near the wearer's temple, the distance from the wearer's eye 304 to the imager is roughly twice as large as compared to a backward-facing imager disposed near the front of the HMD (e.g., compare with the camera 500 shown in FIG. 4). Since the depth of field of an image is roughly proportional to this distance, the depth of field for the forward-facing imager 702b is roughly twice as large as compared to a backward-facing imager. A larger depth of field for the imager 702b can be advantageous for imaging the eye region of wearers having large or protruding noses, brow ridges, etc.

The imager 702b is positioned to view an inside surface 704 of an otherwise transparent optical element 706. The optical element 706 can be a portion of the display 708 of an HMD (or a lens in a pair of eyeglasses). The optical element 706 can be transmissive to at least 10%, 20%, 30%, 40%, 50%, or more of visible light incident on the optical element. In other embodiments, the optical element 706 need not be transparent (e.g., in a virtual reality display). The optical element 706 can comprise a CLC off-axis mirror 708. The CLC off-axis mirror 708 can be a surface reflecting a first range of wavelengths while being substantially transmissive to a second range of wavelengths (that is different from the first range of wavelengths). The first range of wavelengths can be in the infrared, and the second range of wavelengths can be in the visible. For example, the CLC off-axis mirror 708 can comprise a hot mirror, which reflects infrared light while transmitting visible light. In such embodiments, infrared light 710a, 712a, 714a from the wearer propagates to and reflects from the optical element 706, resulting in reflected infrared light 710b, 712b, 714b which can be imaged by the imager 702b. In some embodiments, the imager 702b can be sensitive to or able to capture at least a subset (such as a non-empty subset and/or a subset of less than all) of the first range of wavelengths reflected by the CLC off-axis mirror 708. For example, the CLC off-axis mirror 708 may reflect infrared light in the a range of 700 nm to 1.5 µm, and the imager 702b may be sensitive to or able to capture near infrared light at wavelengths from 700 nm to 900 nm. As another example, the CLC off-axis mirror 708 may reflect infrared light in the a range of 700 nm to 1.5 µm, and the imager 702b may include a filter that filters out infrared light in the range of 900 nm to 1.5 µm such that the imager 702b can capture near infrared light at wavelengths from 700 nm to 900 nm.

Visible light from the outside world (1144, FIG. 6) is transmitted through the optical element 706 and can be perceived by the wearer. In effect, the imaging system 700 shown in FIG. 24A acts as if there were a virtual imager 702c directed back toward the wearer's eye 304. The virtual imager 702c can image virtual infrared light 710c, 712c, 714c (shown as dotted lines) propagated from the wearer's eye 704 through the optical element 706. Although the hot mirror (or other DOE described herein) can be disposed on the inside surface 704 of the optical element 706, this is not a limitation. In other embodiments, the hot mirror or DOE can be disposed on an outside surface of the optical element 706 or within the optical element 706 (e.g., a volume HOE).

Figure 24B:
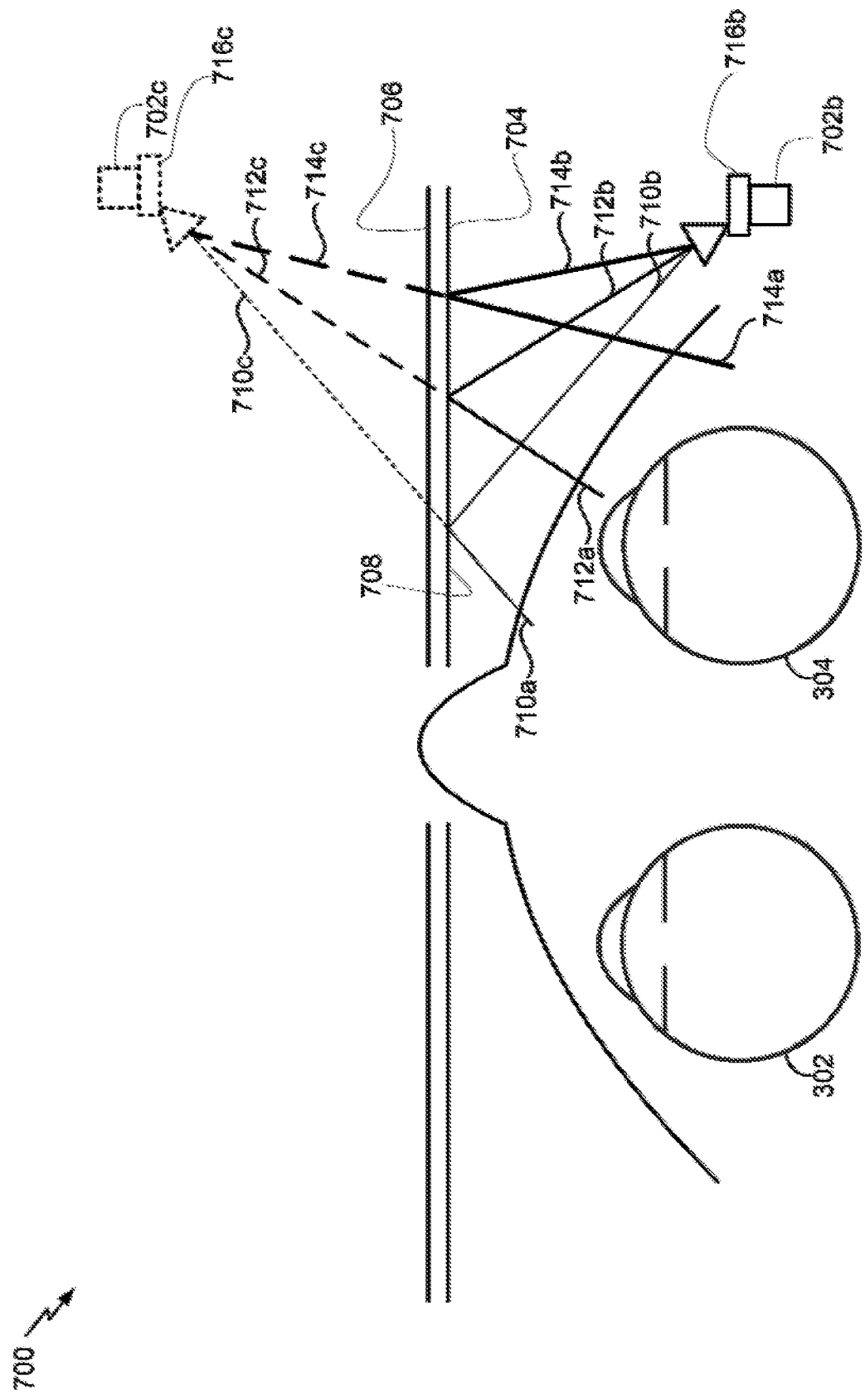

FIG. 24B schematically illustrates another example of the imaging system 700. In this embodiment, perspective distortions may be reduced or eliminated by the use of a perspective control lens assembly 716b (e.g., a shift lens assembly, a tilt lens assembly, or a tilt-shift lens assembly) with the imager 702b. In some embodiments, the perspective control lens assembly 716b may be part of the lens of the imager 702b. The perspective control lens 716b can be configured such that a normal to the imager 702b is substantially parallel to a normal to the region of the surface 704 that includes the DOE (or HOE) or hot mirror. In effect, the imaging system 700 shown in FIG. 24B acts as if there were a virtual imager 702c with a virtual perspective control lens assembly 716c directed back toward the wearer's eye 304.

Figure 24C:
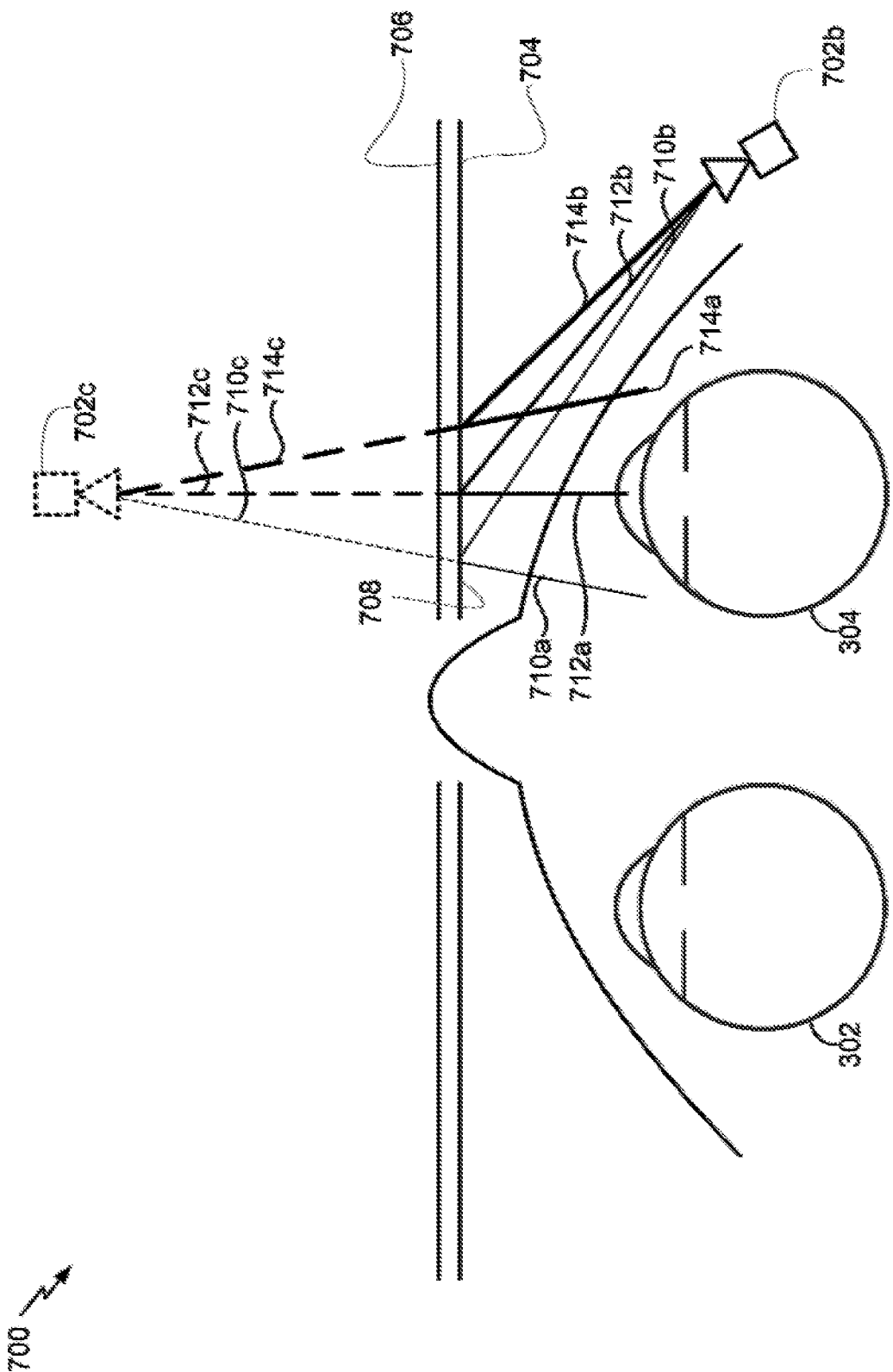
Figure 24D:
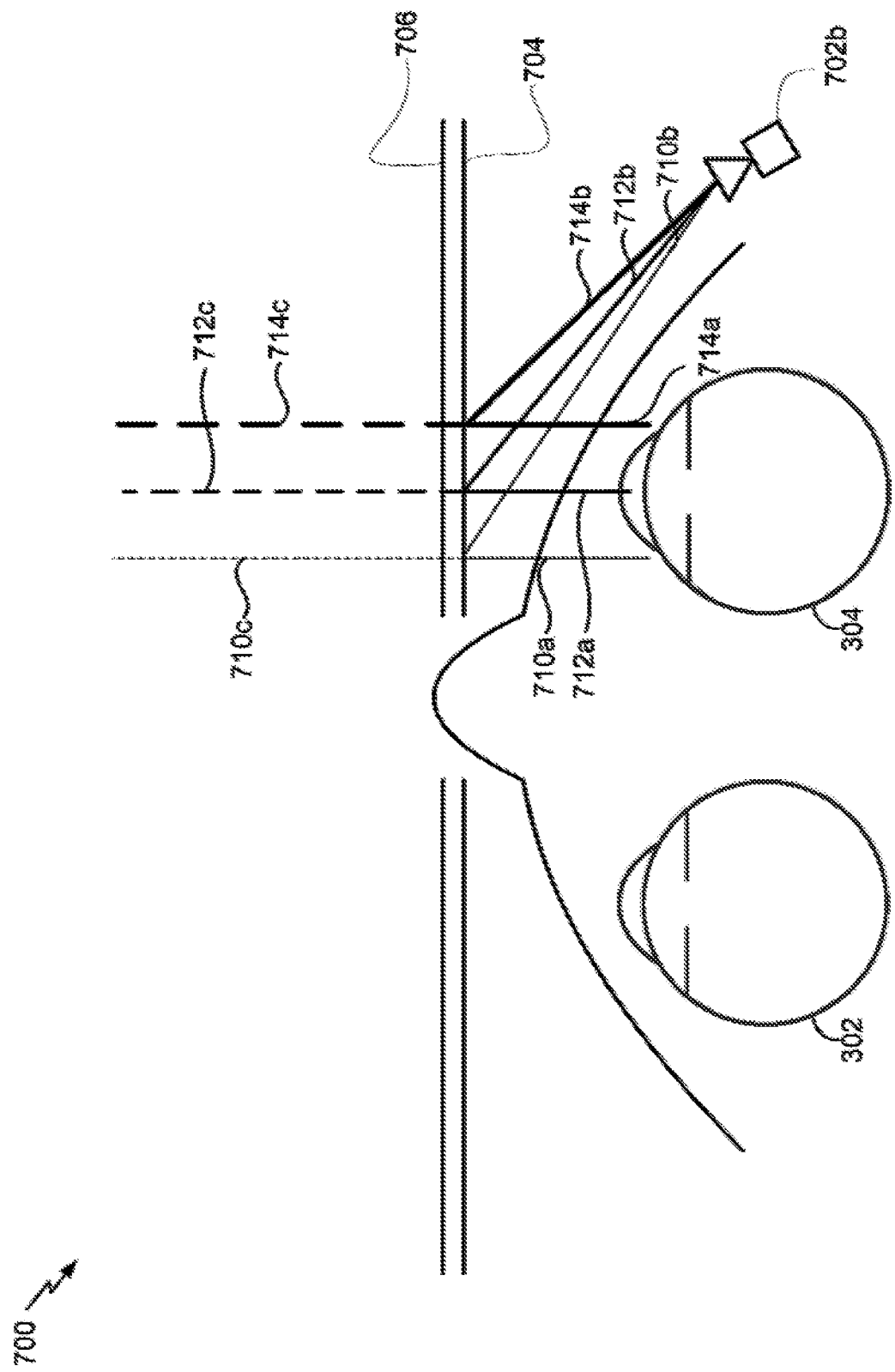

Additionally or alternatively, as schematically shown in FIG. 24C, the CLC off-axis mirror 708 of the optical element 706 may have, on its surface 704, an off axis holographic mirror (OAHM), which is used to reflect light 710a, 712a, 714a to facilitate viewing of the eye 304 by the camera imager 702b which captures reflected light 710b, 712b, 714b. The OAHM 708 may have optical power as well, in which case it can be an off-axis volumetric diffractive optical element (OAVDOE), as schematically shown in FIG. 24D. In the example shown in FIG. 24D, the effective location of the virtual camera 702c is at infinity (and is not shown in FIG. 24D).

Figure 24E:
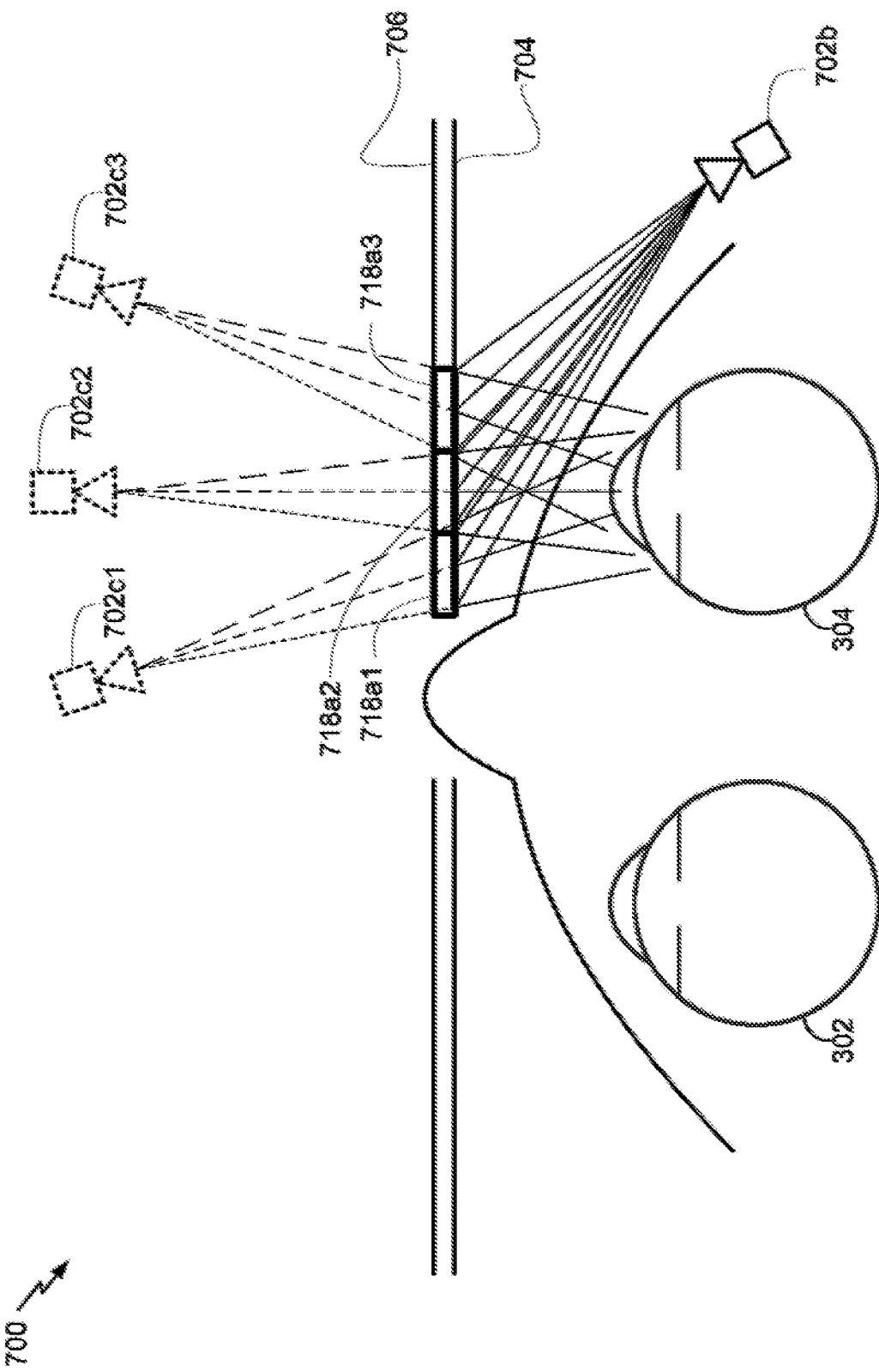

In some embodiments, the HOE (e.g., the OAHM or OAVDOE) can be divided into a plurality of segments. Each of these segments can have different optical properties or characteristics, including, for example, reflection angles at which the segments reflect the incoming (infrared) light or optical power. The segments can be configured so that light is reflected from each segment toward the imager 702b. As a result, the image acquired by the imager 702b will also be divided into a corresponding number of segments, each effectively viewing the eye from a different angle. FIG. 24E schematically illustrates an example of the display system 700 having an OAHM with three segments 718a1, 718a2, 718a3, each of which acts as a respective virtual camera 702c1, 702c2, 702c3 imaging the eye 304 at a different angular location.

Figure 24F:
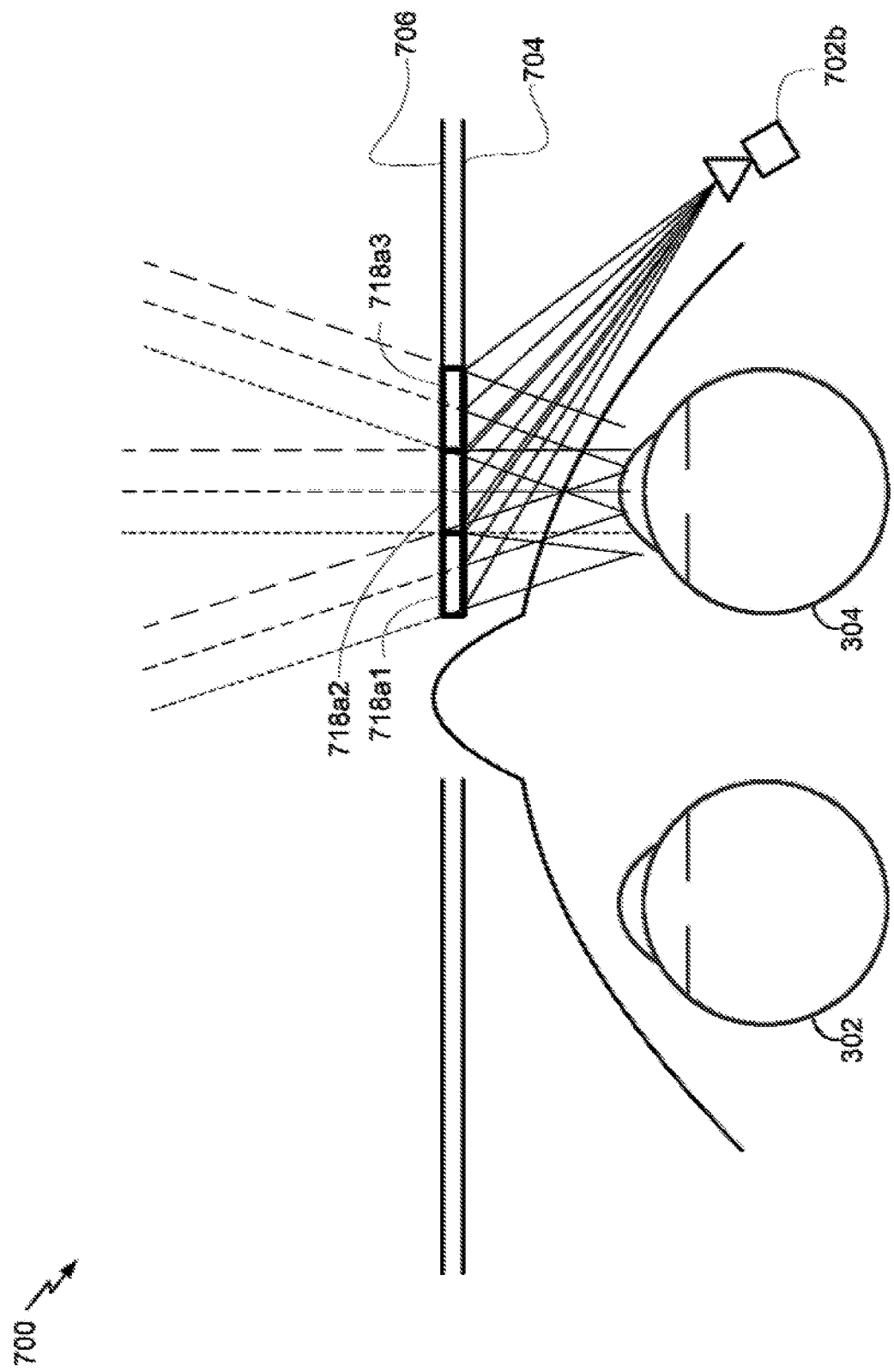

FIG. 24F schematically illustrates another example of the display system 700 having an OAHM with three segments 718a1, 718a2, 718a3, each having optical power (e.g., a segmented OAVDOE), with each segment generating a virtual camera at infinity imaging the eye 304 at a different angular location. Although three segments are schematically illustrated in FIGS. 24E and 24F, this is for illustration and not limitation. In other embodiments, two, four, five, six, seven, eight, nine, or more segments can be utilized. None, some, or all of these segments of the HOE can have optical power.

Figure 24G:
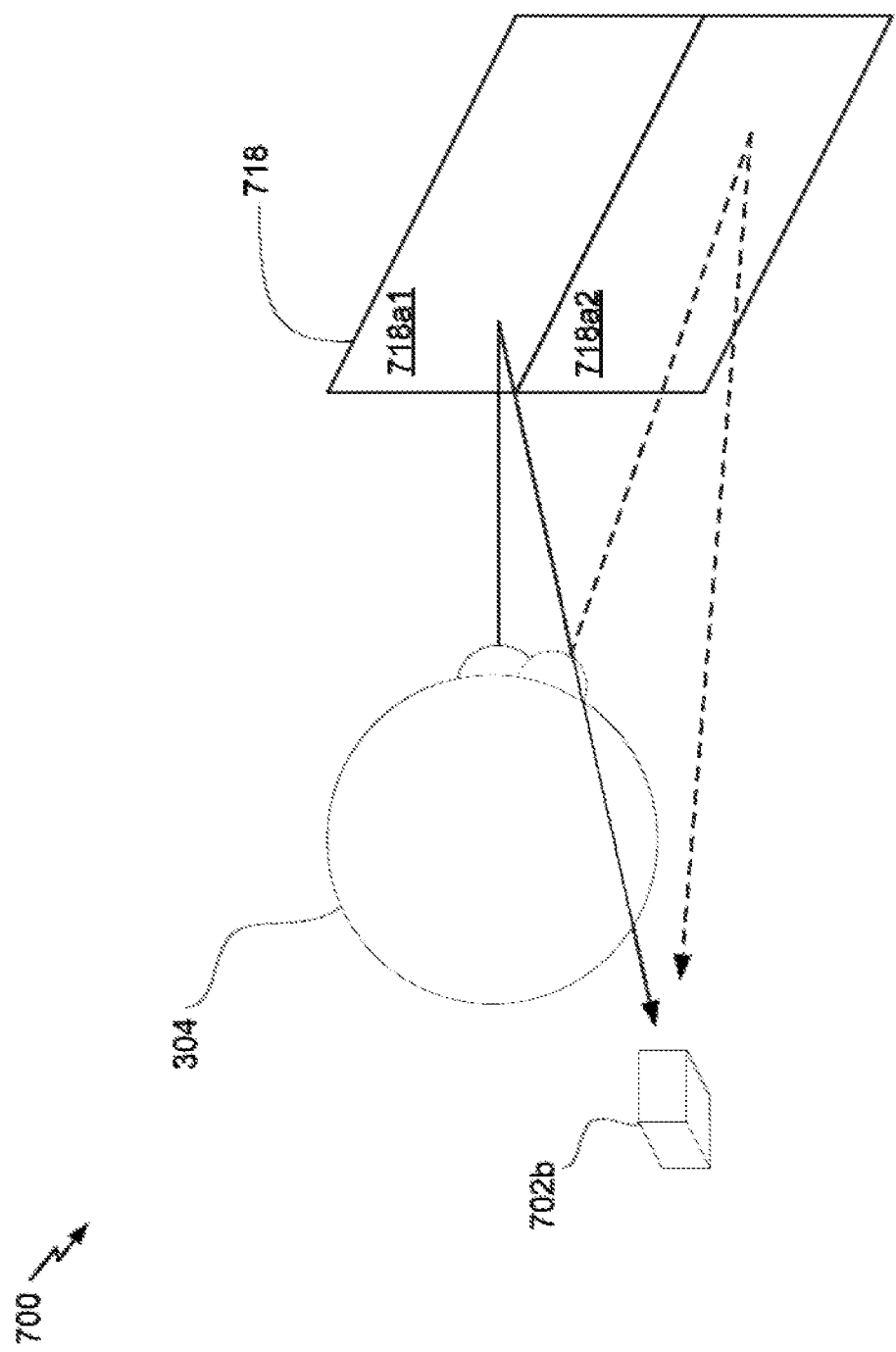
FIGS. 24G and 24H illustrate examples of imaging systems comprising a forward-facing camera configured to images a wearer's eye using a diffractive optical element comprising a plurality of segments including one more CLC off-axis mirrors, where each of the segments can have different optical properties.

The three segments 718a1, 718a2, 718a3 are shown as spaced horizontally across the optical element 706 in FIGS. 24E and 24F. In other embodiments, the segments can be spaced vertically on the optical element 706. For example, FIG. 24G schematically shows a DOE 718 having two vertically spaced segments 718a1 and 718a2, with the segment 718a1 comprising a CLC off-axis mirror configured to reflect light back toward the imager 702b (which may be in the same general horizontal plane as the segment 718a1), and the segment 718a2 configured to reflect light upwards toward the imager 702b. Similar to bifocal lenses, the arrangement shown in FIG. 24G can be advantageous in allowing the imaging system 700 to use reflection imagery acquired by the imager 702b from the upper segment 718a1 when the wearer is looking forward through the upper portion of the HMD (schematically shown via the solid arrowed line) and to use reflection imagery from the lower segment 718a2 when the wearer is looking downward through the lower portion of the HMD (schematically shown via the dashed arrowed line).

Figure 24H:
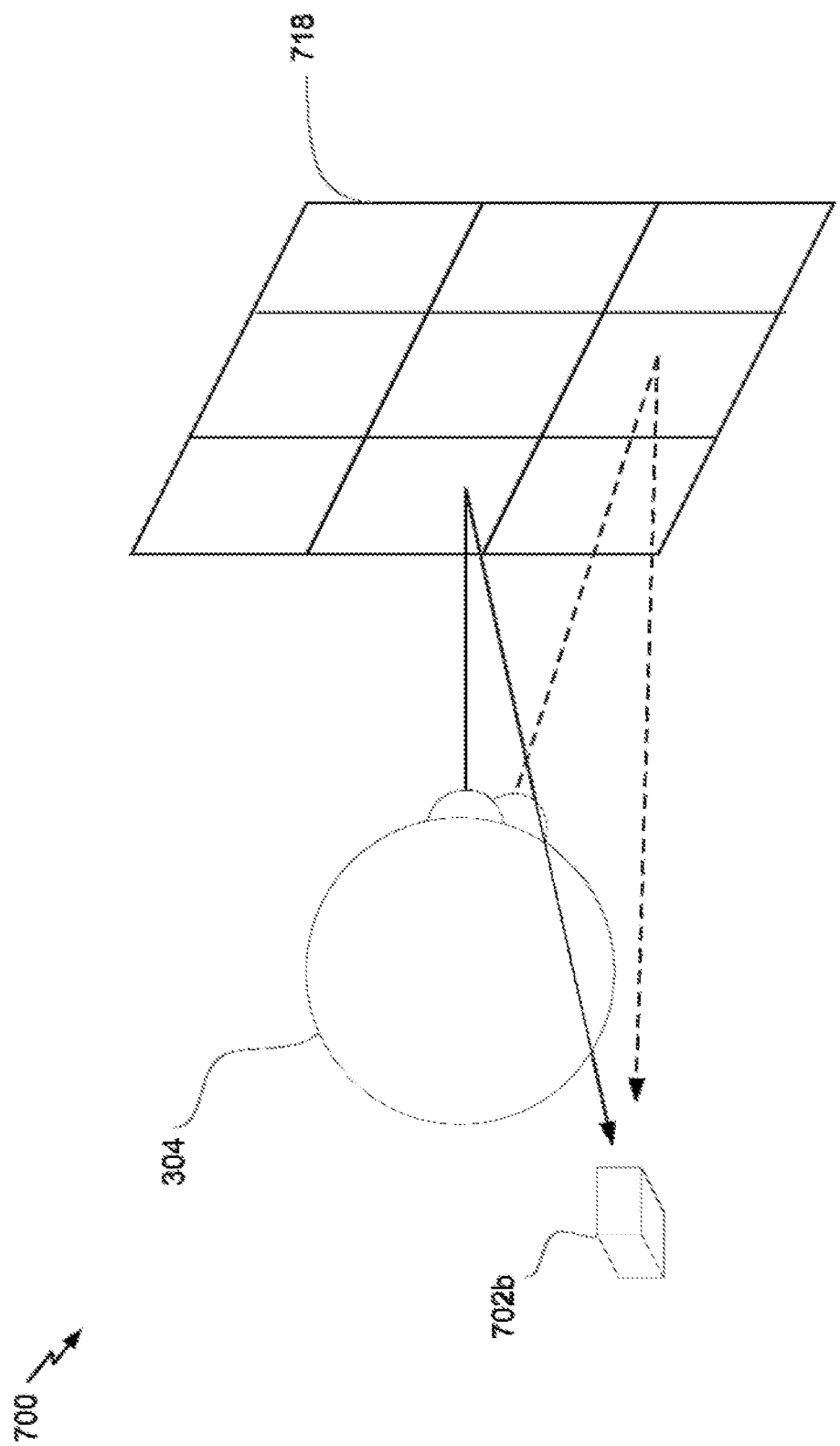

A mix of horizontally spaced and vertically spaced segments can be used in other embodiments. For example, FIG. 24H shows another example of the HOE 718 with a 3×3 array of segments each comprising a CLC off-axis mirror. The imager 702b can acquire reflection data from each of these nine segments, which represent light rays coming from different areas of and angular directions from the eye region. Two example light rays propagating from the eye region to the HOE 718 and reflecting back to the imager 702b are shown as solid and dashed lines. The imaging system 700 (or processing module 224 or 228) can analyze the reflection data from the plurality of segments to multiscopically calculate the three-dimensional shape of the eye or the gaze direction (e.g., eye pose) of the eye.

Embodiments of the optical system 700 utilizing segments may have multiple benefits. For example, the segments can be used individually, by selecting the particular segments which best suit a particular task, or they can be used collectively to multiscopically estimate the three-dimensional shape or pose of the eye. In the former case, this selectivity can be used to, for example, select the image of the wearer's iris which has the least occlusion by eyelids or eyelashes. In the latter case, the three dimensional reconstruction of the eye can be used to estimate orientation (by estimation of, for example, the location of the bulge of the cornea) or accommodation state (by estimation of, for example, the lens induced distortion on the apparent location of the pupil).

Polarization Converters Based on Notch Reflectors

To realize light-field displays, focus of virtual images should be adjusted to resolve vergence-accommodation conflicts. Variable focus lenses can be placed to change the focus of virtual images between the display and user's eyes. However, most of variable/switchable focus lenses are polarization sensitive while projected virtual images may not be well polarized. Such displays may require polarization insensitive lenses (often a pair of lens sets) or a polarizer (reducing >50% in brightness due to the loss of light in the non-transmitted polarization). Efficient conversion of virtual image polarization is desired to make compact/light-efficient variable focus light-field displays.

For generating virtual images in augmented reality displays, a number of narrow-band sources (e.g., red, green, blue (RBG) LEDs or lasers) are often used. A waveguide-based display system can be constructed with diffractive optical elements to project images into user's eyes. The projected image often does not preserve polarization purity even when a well-defined polarization of the image is injected into the waveguide.

As described herein, a notch reflector generally refers to a light reflector that transmits most wavelengths of light substantially unaltered, but reflects light in a specific range of wavelengths with relatively high efficiency. The specific range of wavelengths where light is reflected is termed the "notch." A notch reflector is sometimes also referred to as a narrow band reflector. The wavelength range in the notch may be, e.g., <10 nm, <50 nm, <100 nm, <250 nm, or a different range including a range defined by any two of these values. Notch reflectors can be formed from multiple dielectric layers (a multi-layer), liquid crystals, metamaterials, metastructures, etc. Notch reflectors can include diffractive optical elements, surface or volumetric holograms, etc. Notch reflectors can be laminated onto a substrate material (e.g., polymer or glass). In many of the implementations described herein, to reflect RGB light, the reflector comprises multiple notch reflectors, with the notch in each reflector tuned to one of the specific RGB colors (e.g., a reflector comprising an R-notch reflector, a G-notch reflector, and a B-notch reflector). Accordingly, the wavelength range of each notch can match the wavelength range of the light injected into the display (e.g., the R-notch is matched to the wavelength range of the red light injected by a red LED or laser, and similarly for the G and B notches).

Various embodiments described herein comprise a notch reflector that includes a transmissive substrate, e.g., a polished glass or polymer substrate, having formed thereon one or more active layers. As described herein, an active layer comprises a layer or a coating configured to provide one or more of notch reflecting characteristics describe herein. The one or more active layers are configured to notch-reflect light having a wavelength range $\Delta\lambda$ of about 50 nm, about 70 nm, about 100 nm about 150 nm, or in a range less than any of these values or in a range defined by any two of these values, where the range is centered around a red light including light of one or more wavelengths in the range of about 620-780 nm, a green light including light of one or more wavelengths in the range of about 492-577 nm, or blue light including light of one or more wavelengths in the range of about 435-493 nm. In some embodiments, the wavelength range 42 may substantially cover the red light range of about 620-780 nm, the green light range of about 492-577 nm, or blue light range of about 435-493 nm.

Various embodiments described herein comprise a notch reflector configured as a polarizing notch reflector. Within the notch-reflective range, a polarizing notch reflector allows light having one polarity to substantially pass therethrough, while substantially reflecting light having the opposite polarity. For example, when light having both left-hand circular polarization (LHCP) and right-hand circular polarization (RHCP) within the notch-reflective range is incident on a polarizing notch reflector, the notch reflector can substantially reflect light having one of the RHCP and LHCP, while substantially passing light having the opposite one of the RHCP and LHCP. Similarly, when light having both linear vertical polarization (LVP) and linear horizontal polarization (LHP) is incident on a polarizing notch reflector, the notch reflector can substantially reflect light having one of the LVP and LHP, while substantially passing light having the opposite one of the LVP and LHP.

Various embodiments described herein comprise a notch reflector configured as a non-polarizing notch reflector. Within the notch-reflective range, a non-polarizing notch reflector substantially reflects light incident thereon regardless of its polarization. For example, when light having both LHCP and RHCP within the notch-reflective range is incident on a non-polarizing notch reflector, the notch reflector can substantially reflect light having both the RHCP and LHCP, Similarly, when light having both LVP and LHP is incident on a polarizing notch filter, the notch filter can substantially reflect light having both the LVP and LHP.

In various embodiments described herein, a notch reflector configured as a polarizing or non-polarizing notch reflector can also be configured independently as a polarization-converting notch reflector. Within the notch-reflective range, upon reflecting light having a polarization, the polarization-converting notch reflector converts the polarization of the reflected light to an opposite polarity. For example, when light having one of LHCP and RHCP within the notch-reflective range is incident on a polarization-converting notch reflector, the notch reflector converts the one of the RHCP and LHCP into an opposite one of the RHCP and LHCP. Similarly, when light having one of LVP and LHP is incident on a polarization converting notch reflector, the notch reflector converts the one of the LVP and LHP into an opposite one of the LVP and LHP.

As described herein, within the notch-reflective range (AA), a notch reflector configured to reflect light having one or more polarizations can be configured to reflect substantially all of the light having the one or more polarizations the incident thereon. For example, when a notch reflector is configured to reflect light having one or both of the RHCP and LHCP, the notch reflector may reflect, e.g., greater than 80%, greater than 90%, greater than 95%, greater than 99%, greater than 99.99%, greater than 99.999%, or greater than 99.9999% of the light having the one or both of the RHCP and LHCP incident thereon. On the other hand, when a notch reflector is configured to reflect light having one but not the other of the RHCP and LHCP, the notch reflector may reflect, e.g., greater than 80%, greater than 90%, greater than 95%, greater than 99%, greater than 99.99%, greater than 99.999%, or greater than 99.9999% of the light having the one but not the other of the RHCP and LHCP incident thereon. Conversely, the notch reflector is configured such that light that is not reflected, e.g., light having a wavelength outside the notch-reflective range (AA) or a polarization that the notch reflector is not configured to reflect, is substantially entirely transmitted, e.g., greater than 80%, greater than 90%, greater than 95%, greater than 99%, greater than 99.99%, greater than 99.999%, or greater than 99.9999% of the light incident thereon may be transmitted.

In some display devices described herein, it may be desirable to recycle some light that is outcoupled from a waveguide. For example, while the waveguide may out-couple light having more than one polarization, an optical element such as a lens, e.g., a transmissive or reflective lens, that is configured to exert an optical function, e.g., optical power, to the outcoupled light prior to being viewed by the user, may be polarization-selective. Under some circumstances, light having a polarization that the optical element is not configured to exert the optical function may be transmitted without being viewed by the user. For example, a lens coupled to the waveguide might be configured to exert optical power to light having a polarization, e.g., one of RHCP or LHCP, while transmitting therethrough light having another polarization, e.g., the other of RHCP or LHCP, due to a lack of match between the polarization handedness of the incident elliptical or circular polarized light and the rotation direction of the chiral structures in the CLCG. In these circumstances, it may be desirable to recycle light having the other of RHCP or LHCP to deliver a viewing experience to the user with higher brightness. To address these and other needs, in the following, various embodiments of wave-guiding devices employing one or more polarization converting reflector to address these needs are disclosed.

Example Circular Polarization Converting Display Devices

Figure 25A:
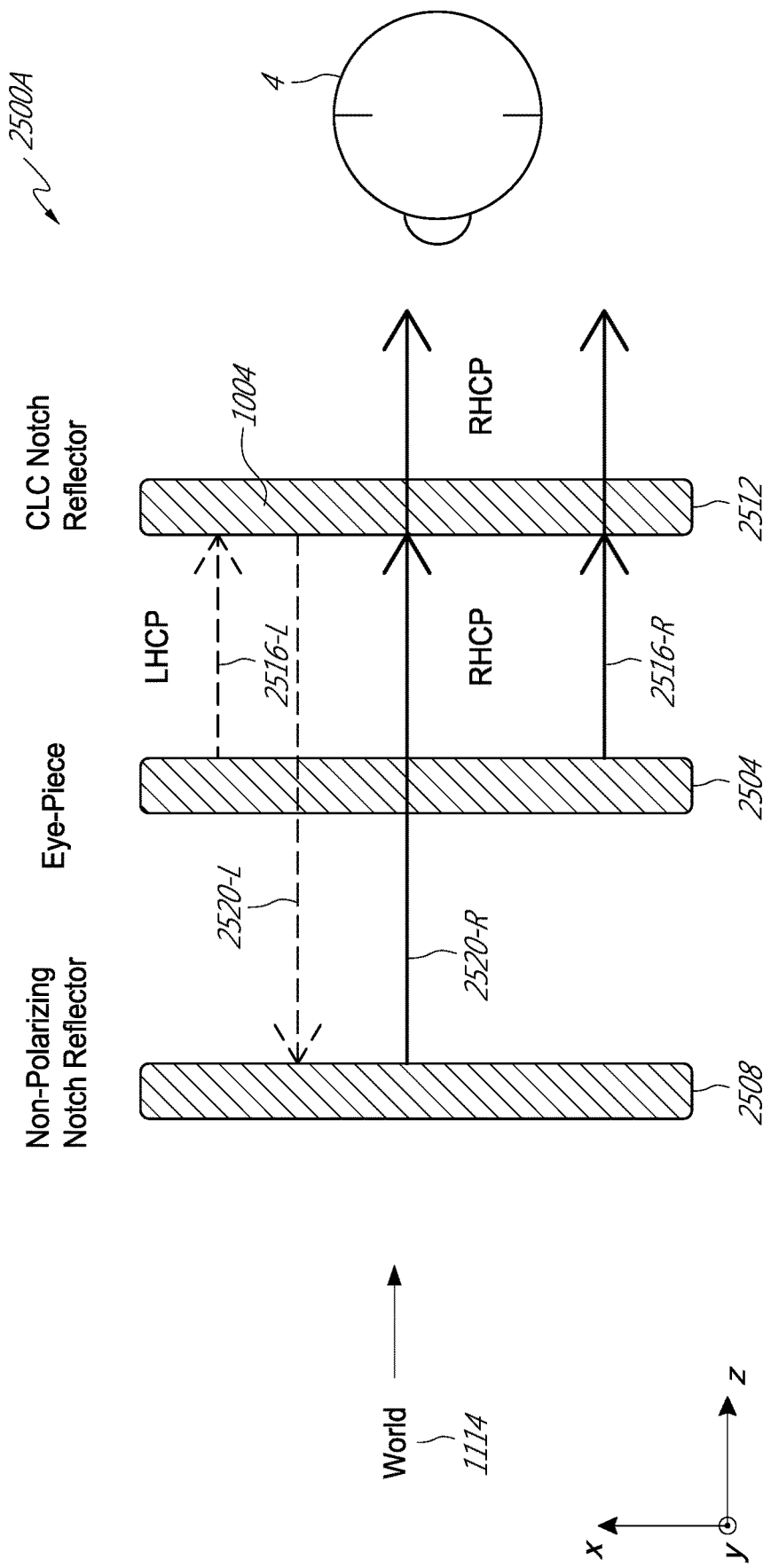
FIG. 25A illustrates an example display device comprising a polarization converter and configured to output an image to a user.

FIG. 25A illustrates a display device 2500A configured to output image information to a user. The display device 2500A comprises a waveguide assembly 2504, also referred to as an eye-piece, interposed between a non-polarizing notch reflector 2508 and a polarizing notch reflector 2512. In various embodiments, the waveguide assembly 2504 can be configured in a similar manner as the waveguide assembly 1178 described above with respect to FIG. 6. Similar to the configuration described above with respect to FIG. 6, in operation, the display device 2500A would be disposed between the world 1114 and the eye 4, such that the eye 4 receives light from both the display device 2500A as well as from the world 1114.

In particular, in various embodiments described herein, the waveguide assembly 2504 of the display device 2500A comprises one or more waveguides (e.g., 1182, 1184, 1186, 1188, 1190 in FIG. 6) each configured to propagate light within each respective waveguide by total internal reflection (TIR) in the x-direction. The light propagating generally in the x-direction, may be output, e.g., using out-coupling optical elements or light extracting optical elements (e.g., 1282, 1284, 1286, 1288, 1290 in FIG. 6) that are configured to extract light out of a waveguide by redirecting the light, propagating within each respective waveguide, out of the waveguide, to output image information to the eye 4 in the z-direction. In various embodiments, while not shown for clarity, the waveguide assembly 2504 may include any of CLCGs formed of one or more CLC layers configured as out-coupling optical elements, as described above. Various other details of the waveguide assembly 2504 described above are omitted herein.

Still referring to FIG. 25A, the non-polarizing notch reflector 2508 according to various embodiments described herein is configured such that, within the notch-reflective range, the non-polarizing notch reflector 2508 substantially reflects light incident thereon regardless of its polarization. Furthermore, in the illustrated embodiment, the non-polarizing reflector is configured as a polarization-converting notch reflector such that, within the notch-reflective range, upon reflecting light having a polarization, the polarization-converting notch reflector converts the polarization of the reflected light to an opposite polarity. The non-polarizing notch reflector 2508 includes a transmissive substrate, e.g., a polished glass or polymer substrate, having formed thereon one or more active layers. In some embodiments of the notch reflectors described herein, the one or more active layers formed on a substrate can include one or more dielectric coatings, whose combination gives rise to the various notch-reflective characteristics described above.

Still referring to FIG. 25A, the polarizing notch reflector 2512 according to various embodiments described herein is configured such that, within the notch-reflective range, the polarizing notch reflector 2512 substantially reflects light incident thereon in a polarization-selective manner. Furthermore, in the illustrated embodiment, the polarizing reflector 2512 is configured such that, unlike the non-polarizing notch reflector 2508, the polarizing notch reflector 2512 is not configured as a polarization converting notch reflector such that, upon reflecting light having a polarization the polarizing notch reflector 2512 does not convert the polarization of the reflected light to an opposite polarity. The polarizing notch reflector 2512 includes a transmissive substrate, e.g., a polished glass or polymer substrate, having formed thereon one or more active layers. In some embodiments of the notch reflectors described herein, the one or more active layers formed on a substrate can include one or more cholesteric liquid crystal (CLC) layers. The one or more active layers formed on a substrate can include one or more cholesteric liquid crystal (CLC) layers described according to various embodiments described above.

Still referring to FIG. 25A, in the following, the display device 2500A is further described in operation. As described above, some of the light propagating in the x-direction within one or more waveguides within the waveguide assembly 2504 may be redirected, or out-coupled, in the z-direction. In the illustrated embodiment, the light out-coupled from the waveguide assembly 2504 includes a circularly polarized light beams 2516-L having LHCP and 2516-R having RHCP. The light beams 2516-L having LHCP and 2516-R having RHCP travel, e.g., in a positive z-direction, until the beams impinge on a surface of the polarizing notch reflector 2512.

The polarizing notch reflector 2512 comprises a CLC layer 1004 having chiral structures similar to those described above, e.g., chiral structures 1012-1, 1012-2, . . . 1012-i described above with respect to FIG. 10. In operation, when incident light having a combination of light beams having left-handed circular polarization and light beams having right-handed circular polarization are incident on the surface of the polarizing notch reflector 2512, by Bragg-reflection, light with one of the circular polarization handedness is reflected by the CLC layer 1004, while light with the opposite polarization handedness is transmitted through the CLC layer 1008 without substantial interference. As described herein and throughout the disclosure, the handed-ness is defined as viewed in the direction of propagation. According to embodiments, when the direction of polarization, or handedness of the polarization, of the light beams 2516-L, 2516-R is matched such that it and has the same direction of rotation as the liquid crystal molecules of the chiral structures 1012-1, 1012-2, . . . 1012-i, the incident light is reflected. As illustrated, incident on the surface of the CLC layer 1004 are light beams 2516-L having left-handed circular polarization and light beams 2516-R having a right-handed circular polarization. In the illustrated embodiment, the liquid crystal molecules of the chiral structures 1012-1, 1012-2, . . . 1012-i are rotated in a clockwise direction successively in the direction in which incident light beams 2516-L, 2516-R travel, e.g., positive x-direction, which is the same rotation direction as the light teams 1016-L having left-handed circular polarization. As a result, the light beam 2516-L having right-handed circular polarization is substantially reflected off the polarizing notch reflector 2512, whereas the light beam 2516-R having right-handed circular polarization is substantially transmitted through the polarizing notch reflector 2512.

The light beam 2516-L out-coupled from the CLC layer 1004 and having LHCP is reflected by the polarizing notch reflector 2512 as a light beam 2520-L, which retains the same polarization as the light beam 2516-L. The resulting light beam 2520-L propagates toward the non-polarizing notch reflector 2508 until the light beam 2520-L, which has LHCP, is substantially reflected by the non-polarizing notch reflector 2508 into a light beam 2520-R having the opposite polarization handedness, e.g., RHCP, due to the polarization-converting characteristics of the non-polarizing notch reflector 2508. The resulting light beam 2520-R having RHCP is substantially transmitted through the CLC layer 1004 and further through the polarizing notch reflector 2512 to enter the eye 4. Still referring to FIG. 25A in summary, by disposing the polarizing notch reflector 2512 (e.g., a cholesteric liquid crystal (CLC) notch reflector) between the waveguide assembly 2504 and the user's eye 4, light beam 2516-R having one polarization (e.g., right-handed circular polarization (RHCP)) is transmitted through the polarizing notch reflector 2512 while light 2516-L having an orthogonal polarization (e.g., left-handed circular polarization (LHCP)) is reflected toward the world 1114 as the light beam 2520-L. Another notch reflector, the non-polarizing notch reflector 2508 (e.g., multi-layer notch reflector), is disposed between the world 1114 and the waveguide assembly 2504 and configured to reflect the light beam 2520-L back to the user's eye as the light beam 2520-R. Since the polarizing notch reflector 2512, e.g., a CLC notch reflector, does not convert the polarization of light reflected therefrom, whereas the non-polarizing notch reflector, e.g., a multi-layer reflector, does convert the polarization of light reflected therefrom, the light beam 2516-R can also be transmitted through the polarizing notch reflector 2512 as shown. It will be appreciated that both notch reflectors 2512, 2508 (e.g., CLC and multi-layer) can be designed to reflect only light sources for virtual images to minimize effects on images of the world 1114.

Example Linear Polarization Converting Display Devices

Figure 25B:
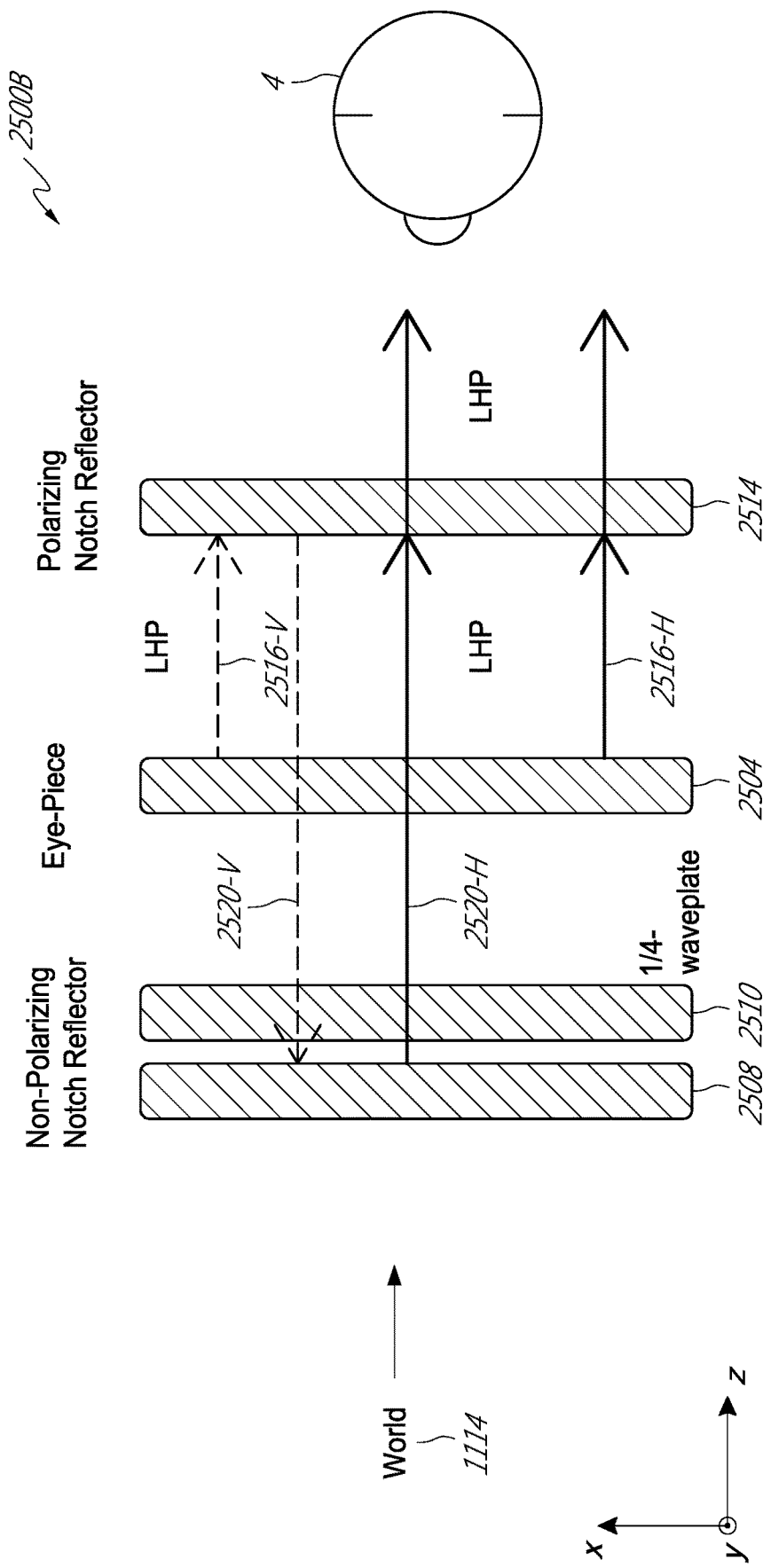
FIG. 25B illustrates an example display device comprising a polarization converter and configured to output image to a user.

FIG. 25B illustrates a display device 2500B configured to output image information to a user. Similar to the display device 2500A illustrated above with respect to FIG. 25A, the display device 2500B comprises a waveguide assembly 2504 interposed between a non-polarizing notch reflector 2508 and a polarizing notch reflector 2514, e.g., a linear polarizing notch reflector. The waveguide assembly 2504 and the non-polarizing notch reflector 2508 are configured in a similar manner as described above with respect to FIG. 25A, and therefore are not described in detail herein.

Still referring to FIG. 25B, similar to the polarizing notch reflector 2512 described above with respect to FIG. 25A, the polarizing notch reflector 2514 in the illustrated embodiment is configured such that, within the notch-reflective range, the notch reflector 2514 substantially reflects light incident thereon in a polarization-selective manner. Furthermore, in the illustrated embodiment, the polarizing reflector 2514 is configured such that, unlike the non-polarizing notch reflector 2508, the polarizing reflector 2514 does not convert the polarization of the reflected light to an opposite polarity.

However, unlike the polarizing notch reflector 2512 described above with respect to FIG. 25A the polarizing notch reflector 2514 in the illustrated embodiment is configured such that the polarizing notch reflector 2514 does not include a CLC layer. Instead, the polarizing notch reflector 2514 includes a transmissive substrate, e.g., a polished glass or polymer substrate, having formed thereon one or more active layers. In some embodiments of the notch reflectors described herein, the one or more active layers formed on a substrate can include one or more dielectric coatings, whose combination gives rise to the various notch-reflective characteristics described above.

Still referring to FIG. 25B, the display device 2500B further comprises a quarter-wave plate 2510 interposed between the non-polarizing notch reflector 2508 and the waveguide assembly 2504.

Still referring to FIG. 25B, in the following, the display device 2500B is further described in operation. As described above, some of the light propagating in the x-direction within one or more waveguides within the waveguide assembly 2504 may be redirected, or out-coupled, in the z-direction. In the illustrated embodiment, the light out-coupled from the waveguide assembly 2504 includes linearly polarized light beams 2516-V having LVP and 2516-H having LHP. The light beams 2516-V having LVP and 2516-H having LHP travel, e.g., in a positive z-direction, until the beams impinge on a surface of the polarizing notch reflector 2514. Thereupon, the light beam 2516-V having LVP is substantially reflected off the polarizing notch reflector 2514, whereas the light beam 2516-H having LHP is substantially transmitted through the polarizing notch reflector 2514.

The light beam 2516-V out-coupled from the waveguide assembly 2504 and having LVP is reflected by the polarizing notch reflector 2514 as a light beam 2520-V, which retains the same polarization as the light beam 2516-V. The resulting light beam 2520-V, which has LVP, propagates toward and is transmitted through the quarter-wave plate 2510, to be reflected off of the non-polarizing notch reflector 2508 and further transmitted through the quarter-wave plate 2510 as a light beam 2520-H having the opposite polarization handedness, e.g., LHP, due to the polarization-converting characteristics of the non-polarizing notch reflector 2508. The resulting light beam 2520-H having LHP is substantially transmitted through the polarizing notch reflector 2514.

Still referring to FIG. 25B in summary, by disposing the polarizing notch reflector 2514, which reflects one linear polarization (e.g., linear vertical polarization (LVP)) for specific wavelengths, instead of a CLC-containing polarizing notch reflector 2512 (FIG. 25A), and further disposing a quarter-wave plate 2510 interposed between the non-polarizing notch reflector 2508 and the waveguide assembly 2504, the polarization of the light reflected off the non-polarizing notch reflector 2508 becomes orthogonal (e.g., linear horizontal polarization (LHP)) as shown. Similar to the CLC-containing notch reflector described above with respect to FIG. 25A, the polarization of the projected virtual image is converted into one linear polarization in an efficient manner (e.g., close to 100% efficiency).

Variable-Focus Virtual Imaging Systems Based on Polarization Converters

Example Linear Polarization Variable-Focus Lenses

Figure 26A:
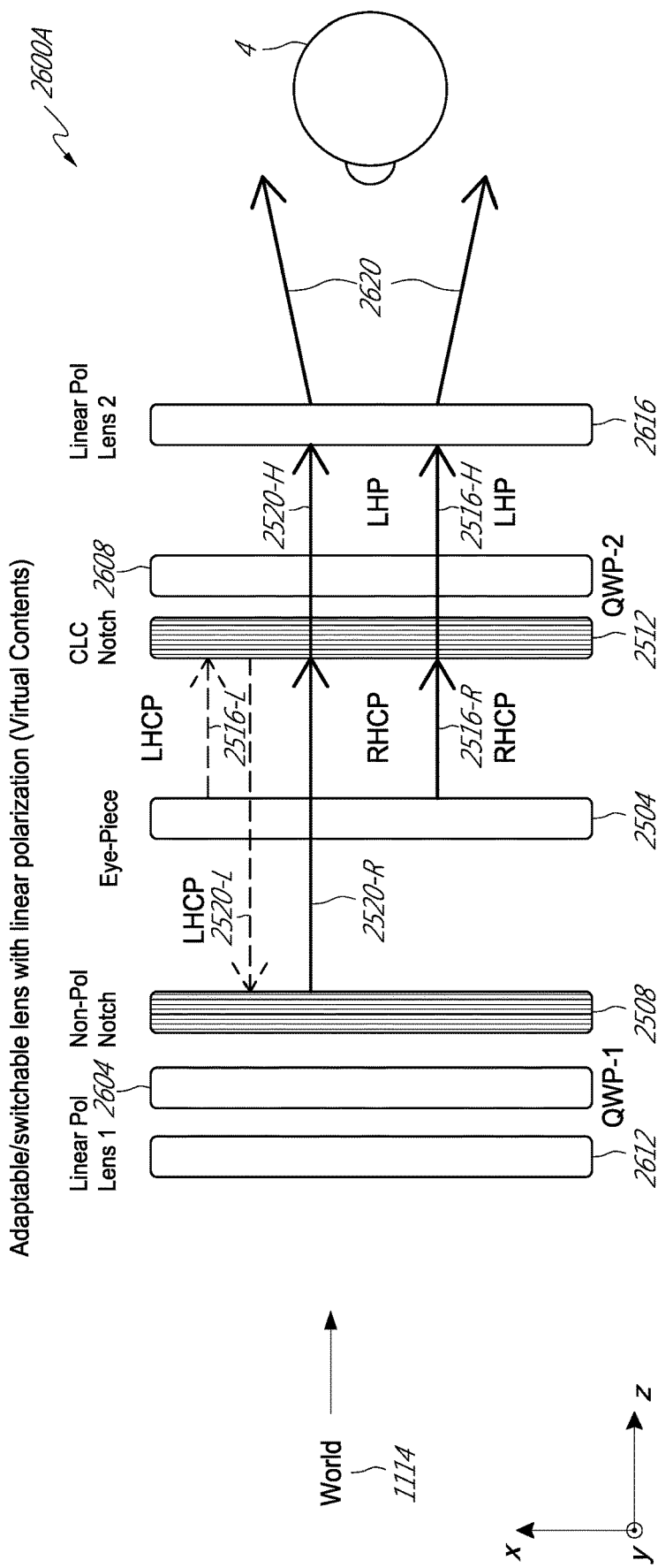
FIG. 26A illustrates an example display device comprising a polarization converter and a switchable lens, and configured to output virtual image to a user.
Figure 26B:
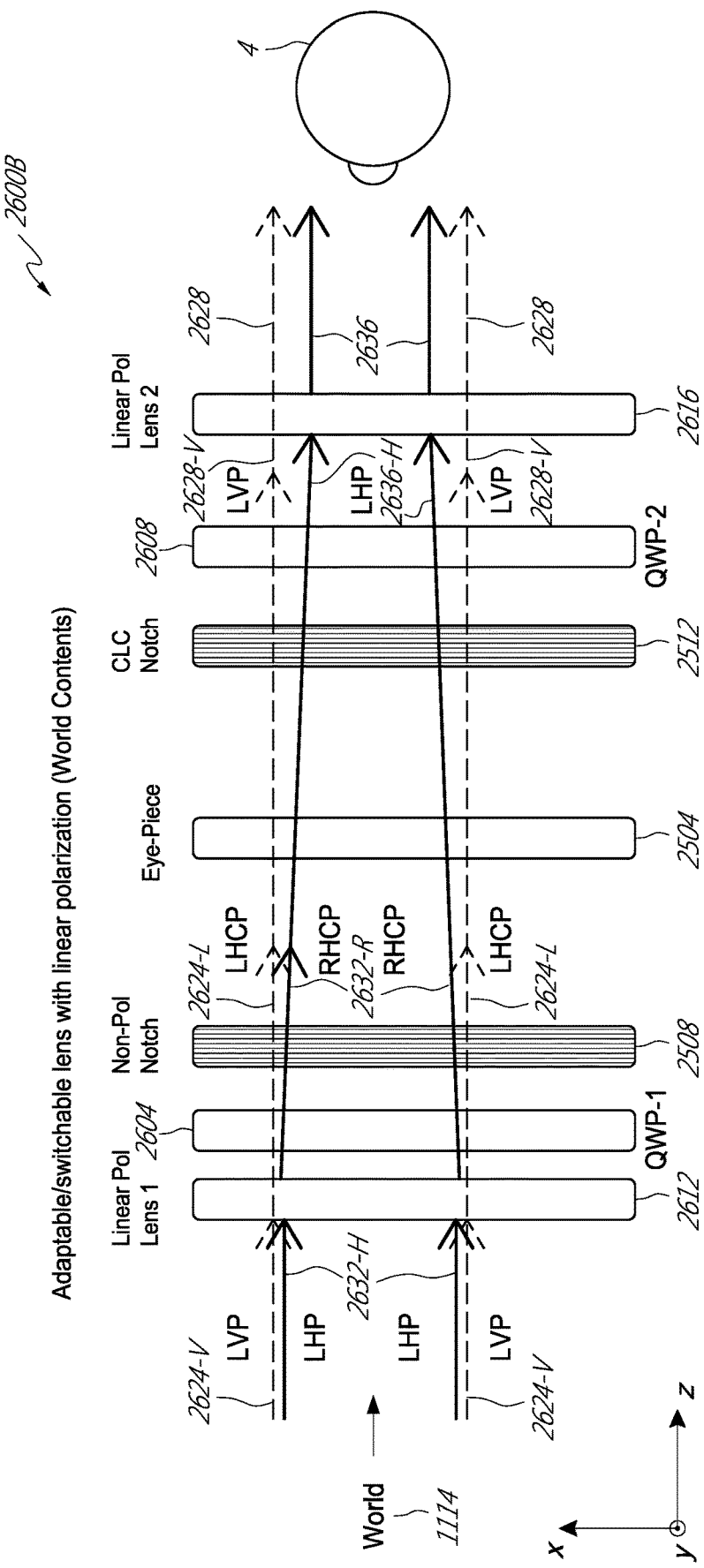
FIG. 26B illustrates an example display device comprising a polarization converter and a switchable lens, and configured to output a real image to a user.

FIGS. 26A and 26B illustrate display devices 2600A, 2600B configured to output image information to a user. The display devices 2600A and 2600B are structurally identical. The display device 2600A is used herein to describe outputting virtual image to the user, while the display device 2600B is used herein to describe outputting real world image to the user.

The display device 2600A/2600B comprises various components of the display device 2500A described above with respect to FIG. 25A, and further includes additional optical components for focusing and converting the light output therefrom. Similar to the display device 2500A illustrated above with respect to FIG. 25A, the display device 2600A/2600B comprises a waveguide assembly 2504 interposed between a non-polarizing notch reflector 2508 and a polarizing notch reflector 2512. The waveguide assembly 2504, the non-polarizing notch reflector 2508 and the polarizing notch reflector 2512 are configured in a similar manner as described above with respect to FIG. 25A, and therefore are not described in further detail herein.

The display device 2600A/2600B additionally includes a first quarter-wave plate (QWP 1) 2604 and a second quarter-wave plate (QWP 2) 2608 formed on outer sides of the non-polarizing notch reflector 2508, e.g., a multilayer notch reflector, and the polarizing notch reflector 2512, e.g., a CLC notch reflector, and further includes a first linear polarizing lens (L1) 2612 and a second linear polarizing lens (L2) 2616 formed on outer sides of the QWP 1 2504 and QWP 2 2608. In various embodiments, one or both of the L1 and L2 can be switchable lenses, which can be switchable by e.g., application of an electric field, a voltage or a current. Further, one or both of the L1 and L2 can have variable focal strengths or focal depths, whose focal strengths and focal depths can be controlled, e.g., by application of application an electric field, a voltage or a current.

Referring to FIG. 26A, the display device 2600A is used herein to describe outputting virtual image to the user. As described above with respect to FIG. 25A, some of the light propagating in the x-direction within one or more waveguides within the waveguide assembly 2504 may be redirected, or out-coupled, in the z-direction. In the illustrated embodiment, the light out-coupled from the waveguide assembly 2504 includes a circularly polarized light beams 2516-L having LHCP and 2516-R having RHCP. The light beams 2516-L having LHCP and 2516-R having RHCP travel, e.g., in a positive z-direction, until the beams impinge on a surface of the polarizing notch reflector 2512. Because of the CLC layer 1004 included in the polarizing notch reflector 2512, the light beam 2516-L having right-handed circular polarization is substantially reflected off the polarizing notch reflector 2512, whereas the light beam 2516-R having right-handed circular polarization is substantially transmitted through the polarizing notch reflector 2512.

The light beam 2516-L out-coupled from the CLC layer 1004 and having LHCP is reflected by the polarizing notch reflector 2512 as a light beam 2520-L, which retains the same polarization as the light beam 2516-L. The resulting light beam 2520-L propagates toward the non-polarizing notch reflector 2508 until the light beam 2520-L, which has LHCP, is substantially reflected by the non-polarizing notch reflector 2508 into a light beam 2520-R having the opposite polarization handedness, e.g., RHCP, due to the polarization-converting characteristics of the non-polarizing notch reflector 2508. The resulting light beam 2520-R having RHCP is substantially transmitted through the polarizing notch reflector 2512 having the CLC layer 1004.

Upon exiting the polarizing notch reflector 2512, the light beams 2516-R and 2520-R having RHCP are further transmitted through the QWP2 2608, which converts the circularly polarized light beams 2516-R and 2520-R into linearly polarized light beams 2520-H and 2516-H, respectively. Thereafter, upon exiting the QWP2 2608, the light beams 2520-H and 2516-H are further transmitted through the L2 2616. When activated, the L2 2616 focuses or defocuses the light beams 2520-H and 2516-H into focused output light beams 2620, prior to being viewed by the eye 4.

In summary, the illustrated embodiment of FIG. 26A shows one example of a waveguide-based projection display having with variable focus/switchable lenses, which are configured to operate on light having linear polarization (e.g., LHP in the illustrated embodiment). Thus the polarization of light of the virtual images is converted to have one of circular polarizations (e.g., RHCP in FIG. 26A) as the light passes through the polarizing notch reflector 2512, e.g., a CLC notch reflector, and further converted to have one of linear polarizations (e.g., LHP in FIG. 26A) by the QWP2 2608. The focus of the virtual image is controlled by the L2 2616, as shown in FIG. 26A.

Referring to FIG. 26B, the display device 2600B is used herein to describe outputting an image of the world 1114 to the user. As illustrated, incident light beams 2632-H and 2624-V having LHP and LVP, respectively, enter and are transmitted through L1 2612. Upon exiting L1 2612, the light beams 2632-H and 2624-V pass through the QWP1 2604, which converts the respective light beams into light beams 2632-R and 2624-L having RHCP and LHCP, respectively. The light beams 2632-R and 2624-L are subsequently transmitted through nonpolarizing notch reflector 2508, the waveguide assembly 2504, the polarizing notch reflector 2512 and QWP2 2608, thereby re-converting the respective light beams into light beams 2636-H and 2628-V having LHP and LVP, respectively. Thereafter, the light beams 2636-H and 2628-V are transmitted through the L2 2616, thereby outputting the respective light beams 2636 and 2628, respectively.

For outputting a real-world image, the lenses L1 2612 and L2 2616 are configured to operate on light having one of the linear polarization but not the other. As a result, in the illustrated embodiment, one of the incident light beams 2632-H and 2624-V, e.g., the light beam 2632-H having the LHP, is not affected by lenses L1 2612 and L2 2616.

The L1 2612 and the L2 2616 can be configured to have opposite lensing effects or optical powers on light passing therethrough. For example, if the L1 2612 is configured to have a focusing lensing effect, the L2 2616 can be configured to have a defocusing effect such that the opposite lensing effects negate each other. Thus, the other of the incident light beams 2632-H and 2624-V, e.g., the light beam 2632-V having LVP, undergoes a lensing effect, e.g., focusing or defocusing, by the L1 2612 upon passing therethrough. However, after being converted to the light beam 2624-L having LHCP and back converted to the light beam 2628-V having LVP, the lensing effect of the L1 2612 is negated by the L2 2616 having the opposite lensing effect. Thus, because there are the two quarter-wave plates QWP1 2604, QWP2 2608 whose light retardation effects negate each other, and because there are two lenses L1 2612 and the L2 2616 whose lensing effects negate each other, the image of the world 1114 as viewed by the eye 4 can be substantially unaffected, while the virtual image is affected by the L2 2616, as described above with respect to FIG. 26B.

Figure 26C:
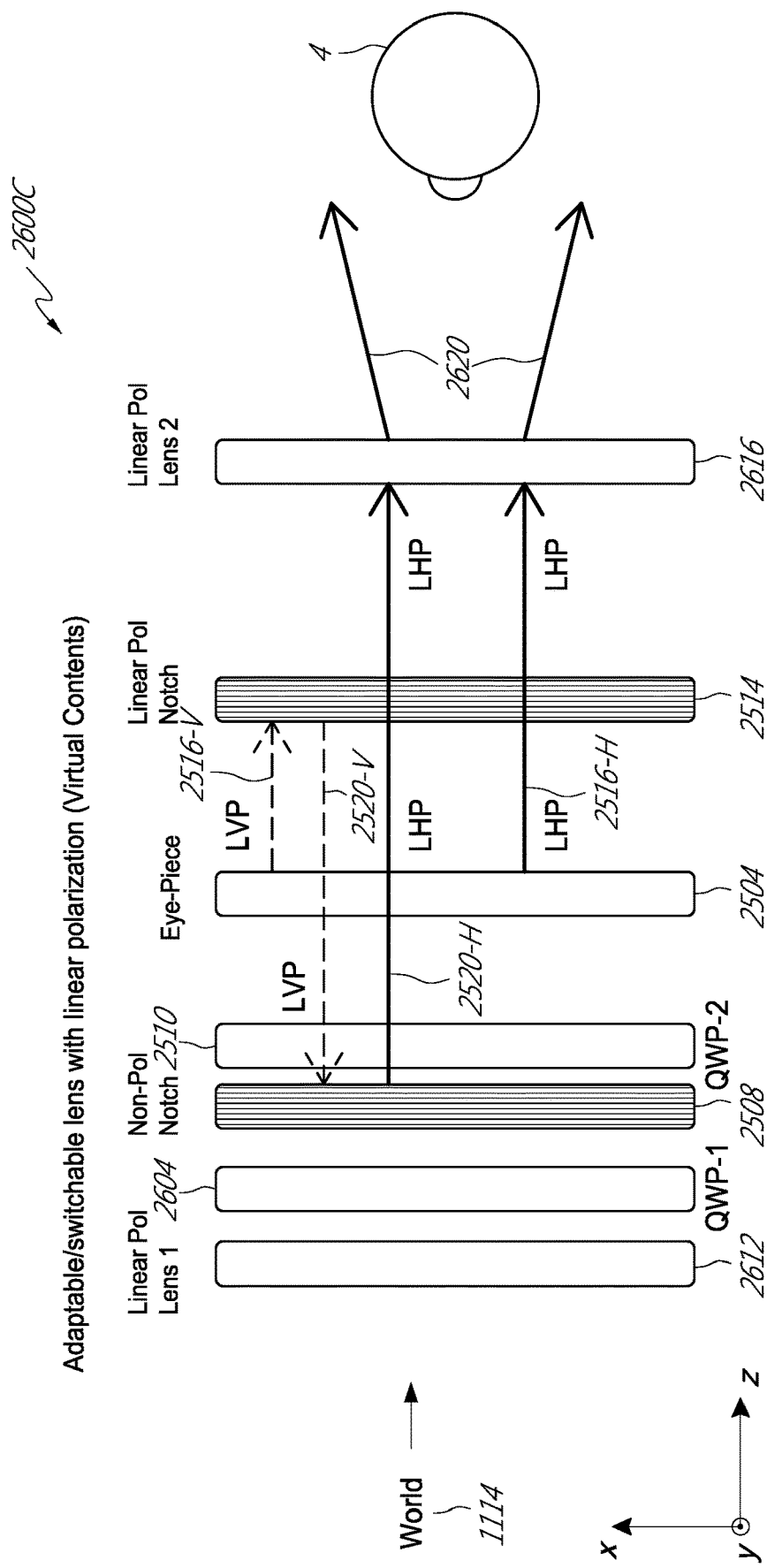
FIG. 26C illustrates an example display device comprising a polarization converter and a switchable lens, and configured to output virtual image to a user.
Figure 26D:
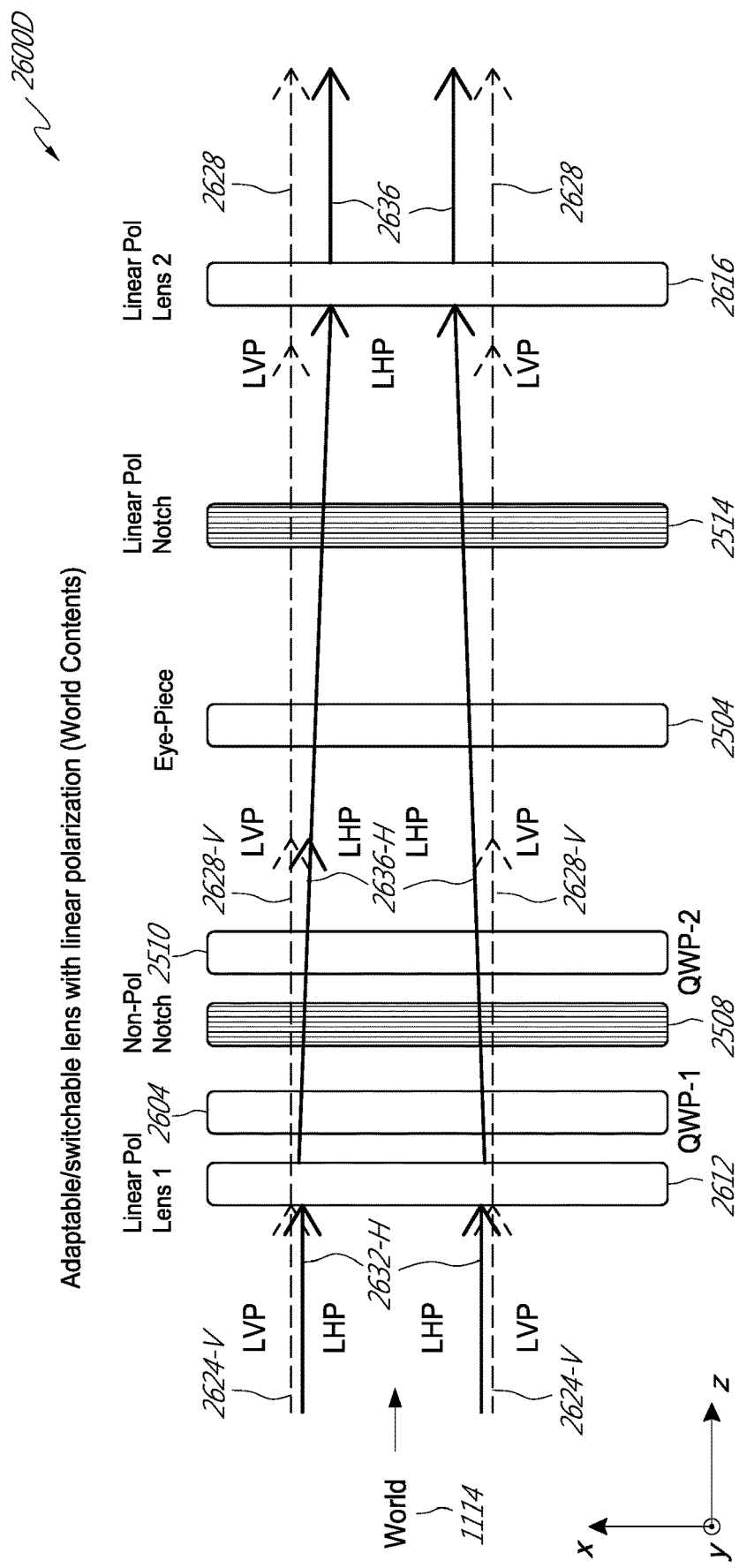
FIG. 26D illustrates an example display device comprising a polarization converter and a switchable lens, and configured to output a real image to a user.

As described above, polarization conversion similar to that performed using the display device 2500A (FIG. 25A) having a polarizing notch reflector 2512, which includes a CLC layer 1004, can also be performed using the display device 2500B (FIG. 25B) having a polarizing notch reflector 2514 that does not include a CLC layer. Accordingly, FIGS. 26C and 26D illustrate display devices 2600C, 2600D configured to output image information to a user, where the display devices 2600C, 2600D have a polarizing notch reflector 2514 that does not include a CLC layer. The display devices 2600C and 2600D are structurally identical. The display device 2600C is used herein to describe outputting virtual image to the user, while the display device 2600D is used herein to describe outputting real world image to the user.

Similar to the display device 2500B illustrated above with respect to FIG. 25B, the display device 2600C/2600D comprises a waveguide assembly 2504 interposed between a non-polarizing notch reflector 2508 and a polarizing notch reflector 2514. The waveguide assembly 2504 and the non-polarizing notch reflector 2508 are configured in a similar manner as described above with respect to FIG. 25A, and therefore are not described in further detail herein.

Still referring to FIG. 26C, in a similar manner as described above with respect to FIG. 25B, the polarizing notch reflector 2514 in the illustrated embodiment is configured such that, within the notch-reflective range, the notch reflector 2514 substantially reflects light incident thereon in a polarization-selective manner. Furthermore, in the illustrated embodiment, the polarizing reflector 2514 is configured such that, unlike the non-polarizing notch reflector 2508, polarizing reflector 2514 does not convert the polarization of the reflected light to an opposite polarity.

Still similar to the description above with respect to FIG. 25B, the polarizing notch reflector 2514 of the display device 2600C/2600D in the illustrated embodiment is configured such that the polarizing notch reflector 2514 does not include a CLC layer. In addition, the display device 2600C/2600D further comprises a second quarter-wave plate QWP1 2510 interposed between the non-polarizing notch reflector 2508 and the waveguide assembly 2504.

The display device 2600C/2600D additionally includes a first quarter-wave plate (QWP 1) 2604 formed on the left side (the side of the world 1114) of the non-polarizing notch reflector 2508, e.g., a multilayer notch reflector, and further includes a first linear polarizing lens (L1) 2612 and a second linear polarizing lens (L2) 2616 formed on outer sides of the QWP 1 2504 and the polarizing notch reflector 2514, respectively. In various embodiments, one or both of the L1 and L2 can be switchable lenses, which can be switchable by e.g., application of an electric field, a voltage or a current. Further, one or both of the L1 and L2 can have variable focal strengths or focal depths, whose focal strengths and focal depths can be controlled, e.g., by application of application an electric field, a voltage or a current.

Referring to FIG. 26C, the display device 2600C is used herein to describe outputting virtual image to the user. As described above with respect to FIG. 25B, some of the light propagating in the x-direction within one or more waveguides within the waveguide assembly 2504 may be redirected, or out-coupled, in the z-direction. In the illustrated embodiment, the light out-coupled from the waveguide assembly 2504 includes linearly polarized light beams 2516-V having LVP and 2516-H having LHP. The light beams 2516-V having LVP and 2516-H having LHP travel, e.g., in a positive z-direction, until the beams impinge on a surface of the polarizing notch reflector 2514. Thereupon, the light beam 2516-V having LVP is substantially reflected off the polarizing notch reflector 2514, whereas the light beam 2516-H having LHP is substantially transmitted through the polarizing notch reflector 2514.

The light beam 2516-V out-coupled from the waveguide assembly 2504 and having LVP is reflected by the polarizing notch reflector 2514 as a light beam 2520-V, which retains the same polarization as the light beam 2516-V. The resulting light beam 2520-V, which has LVP, propagates toward and is transmitted through the QWP2 2510, to be reflected off of the non-polarizing notch reflector 2508 and further transmitted through the QWP2 2510 as a light beam 2520-H having the opposite polarization handedness, e.g., LHP, due to the polarization-converting characteristics of the non-polarizing notch reflector 2508. The resulting light beam 2520-H having LHP is substantially transmitted through the polarizing notch reflector 2514.

Upon exiting the polarizing notch reflector 2514, the light beams 2516-V and 2516-H having LHP are further transmitted through the L2 2616. When activated, the L2 focuses or defocuses the light beams 2520-H and 2516-H into focused output light beams 2620, prior to being viewed by the eye 4.

Referring to FIG. 26D, the display device 2600D is used herein to describe outputting an image of the world 1114 to the user. As illustrated, incident light beams 2632-H and 2624-V having LHP and LVP, respectively, enter and are transmitted through L1 2612. Upon exiting L1 2612, the light beams 2632-H and 2624-V pass through the QWP1 2604, which converts the respective light beams into light beams having RHCP and LHCP, respectively. The light beams 2632-R and 2624-L are subsequently transmitted through nonpolarizing notch reflector 2508, followed by the QWP2 2510, which back-converts the light beams having RHCP and LHCP into light beams 2636-H and 2628-V having LHP and LVP, respectively. Thereafter, the light beams 2636-H and 2628-V are transmitted through the waveguide assembly 2504, followed by the polarizing notch reflector 2514, followed by L2 2616, thereby outputting the respective light beams 2636 and 2628, respectively.

Similar to the display device described above with respect to FIGS. 26A/26B, the lenses L1 2612 and L2 2616 are configured to operate on light having one of the linear polarization but not the other. As a result, in the illustrated embodiment, one of the incident light beams 2632-H and 2624-V, e.g., the light beam 2632-H having LHP, is not affected by lenses L1 2612 and L2 2616.

Also similar to the display device described above with respect to FIGS. 26A/26B, because there are the two quarter-wave plates QWP1 2604, QWP2 2608 whose light retardation effects negate each other, and because there are two lenses L1 2612 and the L2 2616 whose lensing effects negate each other, the image of the world 1114 as viewed by the eye 4 is substantially unaffected, while the virtual image is affected by the L2 2616, as described above with respect to FIG. 26C.

In summary, the embodiment illustrated in FIGS. 26C and 26D, polarization conversion similar to that achieved using the display device 2600A/2600B having polarizing notch reflectors comprising CLC layers therein can be achieved using a polarizing notch reflector 2514, e.g., a linear polarizing notch reflector, in lieu of a polarizing notch reflector 2514 (FIGS. 26A/26B) having CLC layers therein, as shown in FIGS. 26C and 26D. To convert the polarization of virtual images, the QWP2 2510 is disposed between the non-polarizing notch reflector 2508 and the waveguide assembly 2504. Since the polarizing notch reflector 2514, e.g., a linear polarizing notch reflector, converts virtual image polarization to a linear polarization (e.g., LHP), another quarter-wave plate QWP1 2604 is disposed between the L1 2612 and the non-polarizing notch reflector 2508 to compensate.

Example Circular Polarization Variable-Focus Lenses

Without being bound to any theory, when a light beam is taken along a closed cycle in the space of polarization states of light, it may acquire a dynamic phase from the accumulated path lengths as well as from a geometric phase. The dynamic phase acquired from a geometric phase is due to local changes in polarization. In contrast, some optical elements based on a geometric phase to form a desired phase front may be referred to as Pancharatnam-Berry phase optical elements (PBOEs). PBOEs may be constructed from wave plate elements for which the orientation of the fast axes depends on the spatial position of the waveplate elements. Applications of the PBOEs include diffraction gratings, e.g., blazed gratings, focusing lenses, and axicons, among various other applications.

In the following, with respect to FIGS. 27A-27D, display devices employing switchable lens elements or a switchable lens assembly including, e.g., Pancharatnam-Barry phase (PB) lens elements, which can be dynamically switched by direct modulation of a PB lens or by modulation of LC waveplates coupled to a static PB lens, are described. When multiple PB lens elements with different focal distances are stacked, the overall focus of the lens stack can be switched among them by modulating the PB lens or LC waveplates placed between them. Advantageously, PB lenses can be configured to focus or defocus light having circular polarization. As a result, quarter-wave plate(s) included as part of display devices, e.g., display devices 2600A, 2600B, can be omitted as the virtual image polarization is converted to a circular polarization (e.g., RHCP) through the CLC reflector.

Figure 27A:
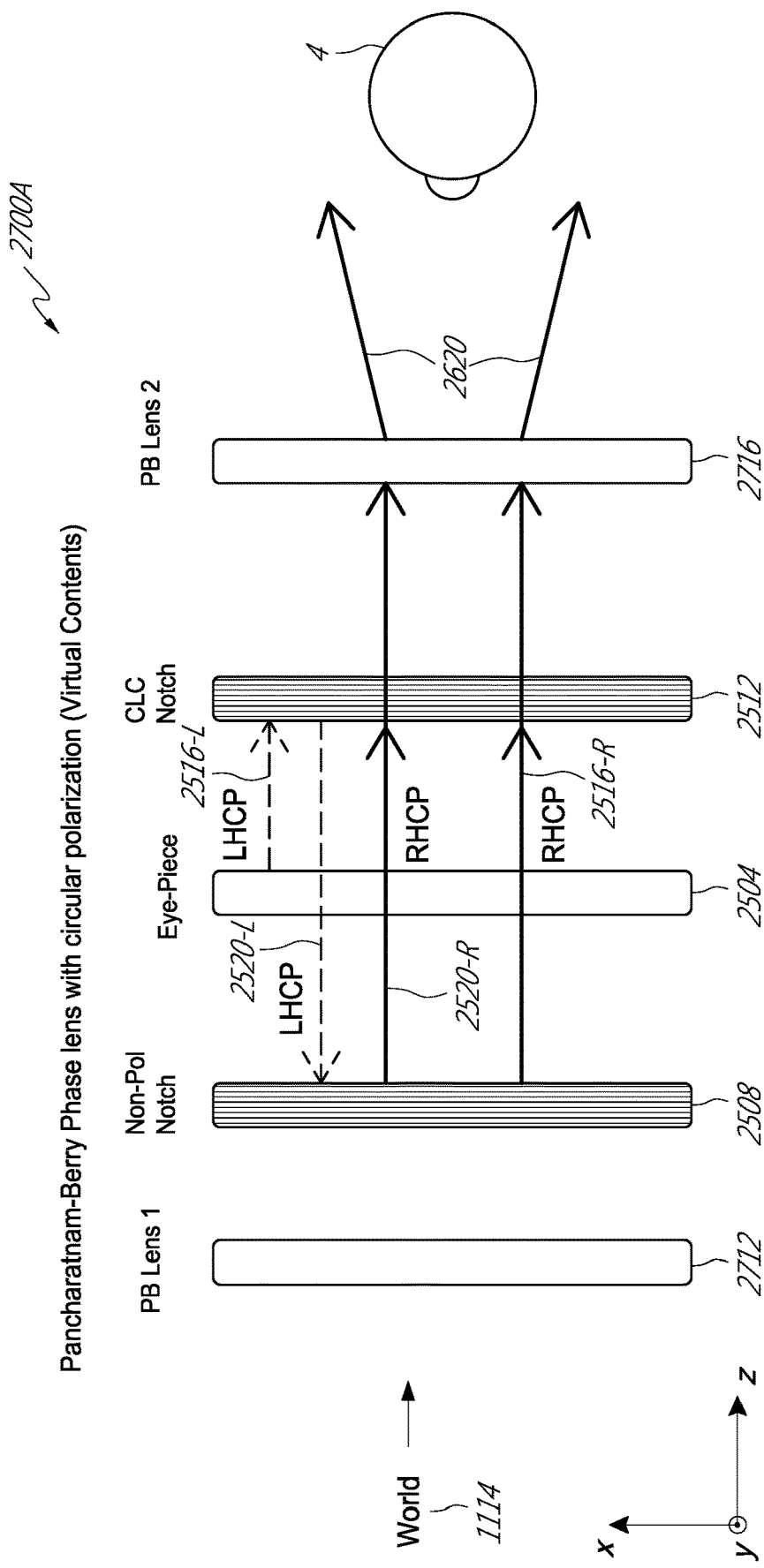
FIG. 27A illustrates an example display device comprising a polarization converter and a Pancharatnam-Barry (PB) lens, and configured to output virtual image to a user.
Figure 27B:
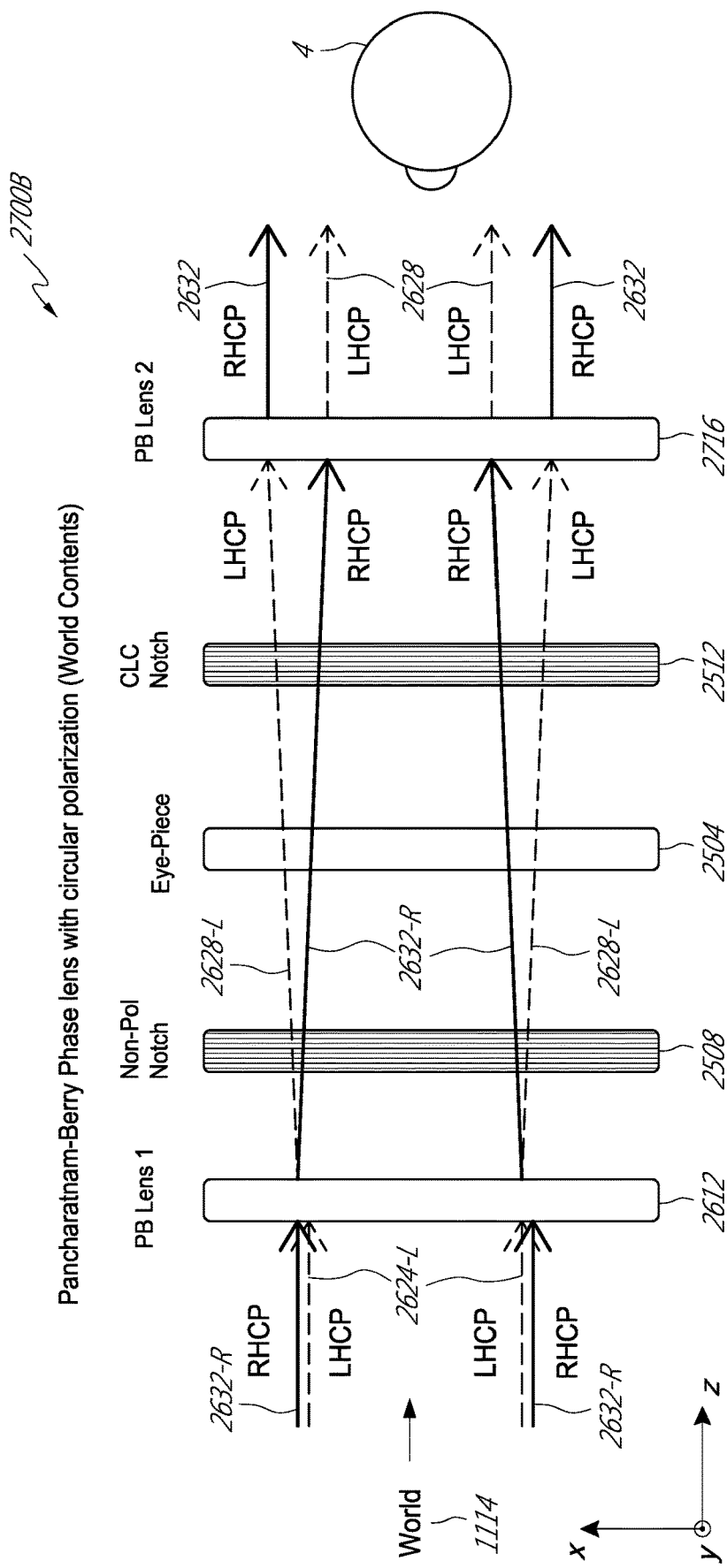
FIG. 27B illustrates an example display device comprising a polarization converter and a PB lens, and configured to output a real image to a user.

FIGS. 27A and 27B illustrate display devices 2700A, 2700B configured to output image information to a user. The display devices 2700A and 2700B are structurally identical. The display device 2700A is used herein to describe outputting virtual image to the user, while the display device 2700B is used herein to describe outputting real world image to the user.

The display device 2700A/2700B comprises various components of the display device 2600A/2600B described above with respect to FIGS. 26A and 26B, and further includes additional optical components for focusing and converting the light output therefrom. Similar to the display device 2600A/2600B illustrated above with respect to FIGS. 26A and 26B, the display device 2700A/2700B comprises a waveguide assembly 2504 interposed between a non-polarizing notch reflector 2508 and a polarizing notch reflector 2512. The waveguide assembly 2504, the non-polarizing notch reflector 2508 and the polarizing notch reflector 2512 are configured in a similar manner as described above with respect to FIGS. 26A and 26B, and therefore are not described in further detail herein.

Unlike the display device 2600A/2600B, however, in the display device 2700A/2700B, quarter-wave plates formed on outer sides of the non-polarizing notch reflector 2508, e.g., a multilayer notch reflector, and the polarizing notch reflector 2512, e.g., a CLC notch reflector, are omitted. Further unlike the display device 2600A/2600B, instead of linear polarization lenses, the display device 2700A/2700B includes a first PB lens (PB L1) 2712 and a second PB lens (PB L2) 2716 formed on outer sides of the non-polarizing notch reflector 2508 and the polarizing notch reflector 2512, respectively. In various embodiments, one or both of the PB L1 2712 and PB L2 2716 can be switchable lenses, which can be switchable by e.g., application of an electric field, a voltage or a current. Further, one or both of the PB L1 2712 and PB L2 2716 can have variable focal strengths, optical power or focal depths, which can be controlled, e.g., by application of an electric field, a voltage or a current.

Referring to FIG. 27A, the display device 2700A is used herein to describe outputting virtual image to the user. In operation, the as described above with respect to FIG. 25A, some of the light propagating in the x-direction within one or more waveguides within the waveguide assembly 2504 may be redirected, or out-coupled, in the z-direction. The paths of light beams out-coupled from the waveguide assembly 2504, which includes a circularly polarized light beams 2516-L having LHCP and 2516-R having RHCP, are the same as those described above with respect to FIG. 26A until the light beams 2516-R and 2520-R having RHCP are transmitted through the polarizing notch reflector 2512 having the CLC layer 1004. Upon exiting the polarizing notch reflector 2512, the light beams 2516-R and 2520-R having RHCP are further transmitted through the PB L2 2716. When activated, the PB L2 focuses or defocuses the light beams 2520-H and 2516-H into focused output light beams 2620, prior to being viewed by the eye 4.

Referring to FIG. 27B, the display device 2700B is used herein to describe outputting an image of the world 1114 to the user. As illustrated, incident light beams 2632-R and 2624-L having RHCP and LHCP, respectively, are transmitted through the PB L1 2712 as light beams 2636-R and 2628-L that are subsequently transmitted through the non-polarizing notch reflector 2508, the waveguide assembly 2504, the polarizing notch reflector 2512 and PB L2 2716. Unlike the display device 2600B illustrated above with respect to FIG. 26B, because there are no quarter-wave plates in the display device 2700, the light beams remain as circularly polarized light beams throughout the phase conversion and focusing. Thereafter, the light beams 2636-R and 2628-L are transmitted through the PB L2 2716, thereby outputting the respective light beams 2632 and 2628, respectively.

For outputting a real-world image, the lenses PB L1 2712 and PB L2 2716 are configured to operate on light having one of the circular polarization but not the other. As a result, in the illustrated embodiment, one of the incident light beams 2632-R and 2624-L, e.g., the light beam 2624-L having the LHCP, is not affected by lenses PB L1 2712 and PB L2 2716.

The PB L1 2712 and the PB L2 2716 can be configured to have opposite lensing effects on light passing therethrough. For example, if the PB L1 2712 is configured to have a focusing lensing effect, the PB L2 2716 can be configured to have a defocusing effect such that the opposite lensing effects negate each other. As a result, the image of the world 1114 as viewed by the eye 4 is substantially unaffected, while the virtual image is affected by the PB L2 2716, as described above with respect to FIG. 27A.

Figure 27C:
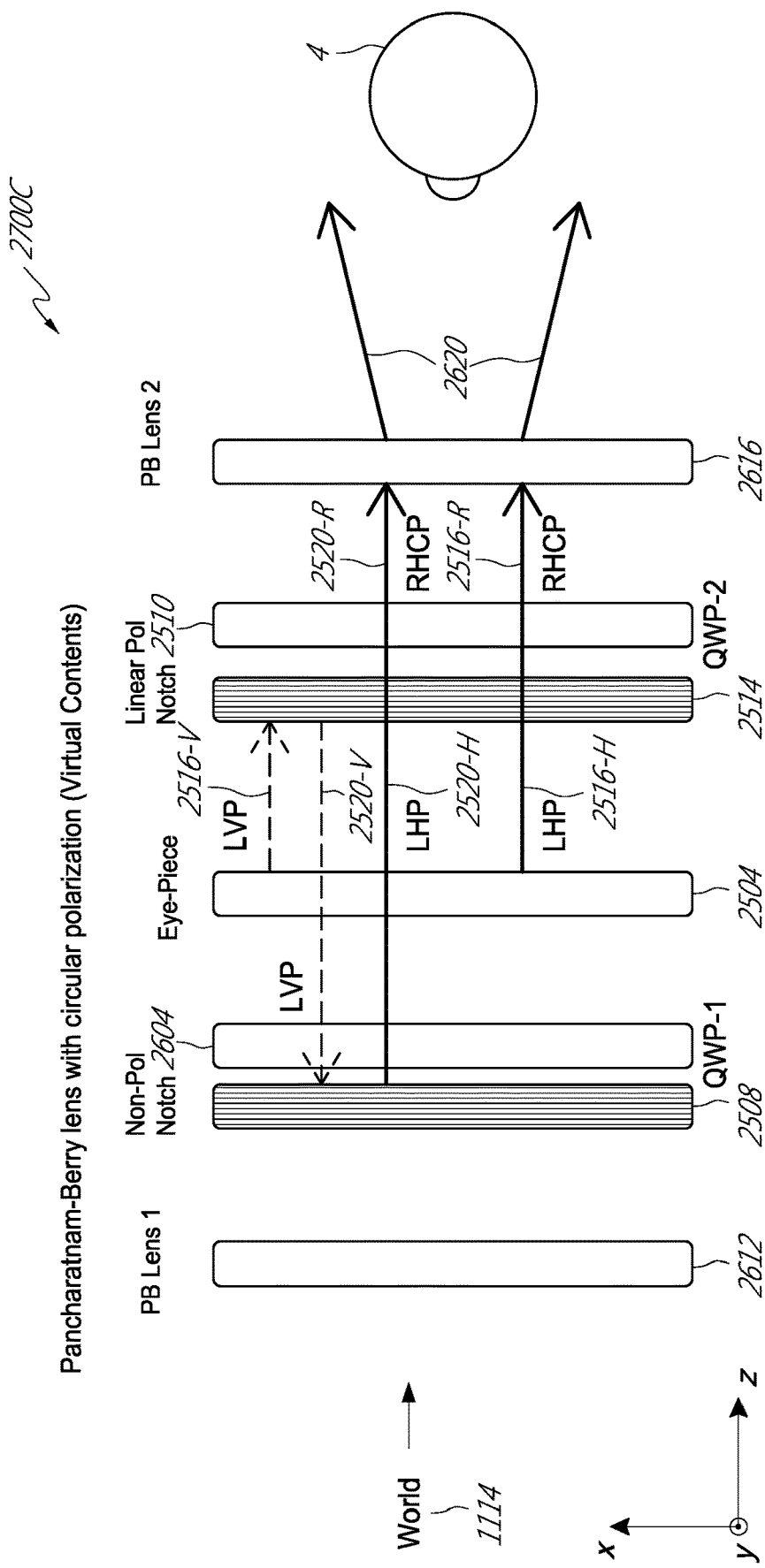
FIG. 27C illustrates an example display device comprising a polarization converter and a PB lens, and configured to output virtual image to a user.
Figure 27D:
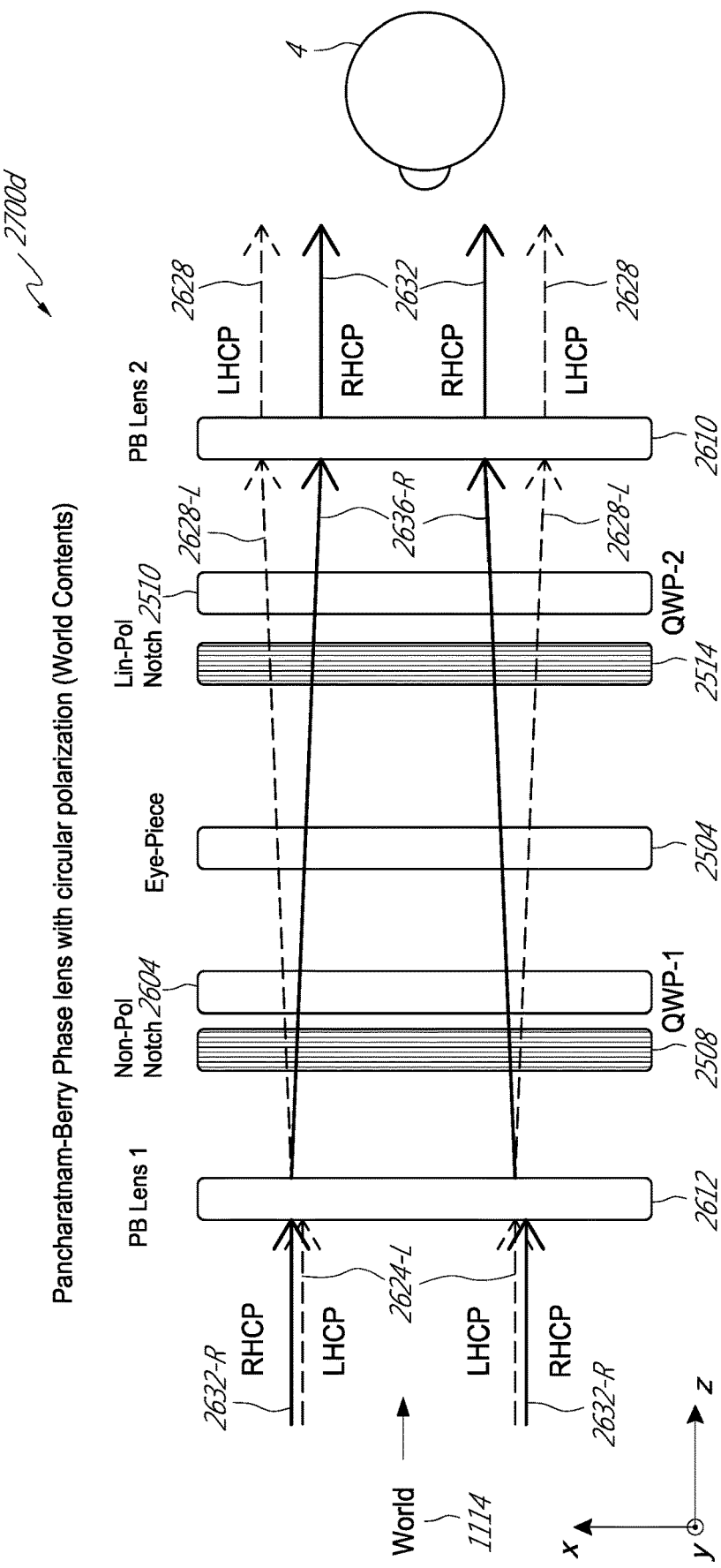
FIG. 27D illustrates an example display device comprising a polarization converter and a PB lens, and configured to output a real image to a user.

As described above, polarization conversion similar to that performed using the display device 2500A (FIG. 25A) having a polarizing notch reflector 2512, which includes a CLC layer 1004, can also be performed using the display device 2500B (FIG. 25B) having a polarizing notch reflector 2514 that does not include a CLC layer. Accordingly, FIGS. 27C and 27D illustrate display devices 2700C, 2700D configured to output image information to a user, where the display devices 2700C, 2700D have a polarizing notch reflector 2514 that does not include a CLC layer. The display devices 2600C and 2600D are structurally identical. The display device 2700C is used herein to describe outputting virtual image to the user, while the display device 2700D is used herein to describe outputting real world image to the user.

Similar to the display device 2500B illustrated above with respect to FIG. 25B, the display device 2700C/2700D comprises a waveguide assembly 2504 interposed between a non-polarizing notch reflector 2508 and a polarizing notch reflector 2514. The waveguide assembly 2504 and the non-polarizing notch reflector 2508 are configured in a similar manner as described above with respect to FIG. 25A, and therefore are not described in further detail herein.

The display device 2700C/2700D additionally includes a first quarter-wave plate (QWP 1) 2604 formed between the non-polarizing notch reflector 2508, e.g., a multilayer notch reflector, and the waveguide assembly 2504, and a second quarter-wave plate (QWP2) 2510 formed between the polarizing notch reflector 2514 and a second PB lens (PB L2) 2616. The display device 2700C/2700D further includes a first PB lens (PB L1) 2612 on an outer sides of the non-polarizing notch reflector 2508. Thus, the display device 2700C/2700D is similar to the display device 2600C/2600D described with respect to FIGS. 26C and 27D except for the relative positions of the QWP1 2604 and QWP2 2510 and the type of lenses.

In various embodiments, one or both of the PB L1 2612 and PB L2 2616 can be switchable lenses, which can be switchable by e.g., application of an electric field, a voltage or a current. Further, one or both of the PB L1 2612 and PB L2 2616 can have variable focal strengths or focal depths, whose focal strengths and focal depths can be controlled, e.g., by application of application an electric field, a voltage or a current.

Referring to FIG. 27C, the display device 2700C is used herein to describe outputting virtual image to the user. As described above with respect to FIG. 25B, some of the light propagating in the x-direction within one or more waveguides within the waveguide assembly 2504 may be redirected, or out-coupled, in the z-direction. The paths of light beams out-coupled from the waveguide assembly 2504, which includes linearly polarized light beams 2516-V having LVP and 2516-H having LHP, are the same as those described above with respect to FIG. 26C until the light beams 2516-V and 2520-V having LVP are transmitted through the polarizing notch reflector 2514, e.g., a linear polarizing notch reflector. Upon exiting the polarizing notch reflector 2514, the light beams 2516-V and 2520-V are transmitted through the QWP2 2510, thereby being converted to light beams 2516-R and 2520-R having RHCP. Thereafter, the light beams 2516-R and 2520-R having RHCP are further transmitted through the PB L2 2716. When activated, the PB L2 focuses or defocuses the light beams 2520-R and 2516-R into focused output light beams 2620, prior to being viewed by the eye 4.

Referring to FIG. 27D, the display device 2700D is used herein to describe outputting an image of the world 1114 to the user. As illustrated, incident light beams 2632-R and 2624-L having RHCP and LHCP, respectively, are transmitted through the PB L1 2712, through the nonpolarizing notch reflector 2508, and through the QWP1 2604, whereupon the light beams are converted to linear polarized light beams. The circular polarized light beams are further transmitted though the waveguide assembly 2504, the polarizing notch reflector 2514, e.g., a linear polarizing notch reflector, and through the QWP2 2510, whereupon the light beams are back-converted to circular polarized light beams 2636-R and 2628-L having RHCP and LHCP, respectively. Thereafter, the light beams 2636-R and 2628-L are transmitted through the PB L2 2716, thereby outputting the respective light beams 2632 and 2628, respectively.

For outputting a real-world image, the lenses PB L1 2712 and PB L2 2716 are configured to operate on light having one of the circular polarization but not the other. As a result, in the illustrated embodiment, one of the incident light beams 2632-R and 2624-L, e.g., the light beam 2624-L having the LHCP, is not affected by lenses PB L1 2712 and PB L2 2716.

The PB L1 2712 and the PB L2 2716 can be configured to have opposite lensing effects on light passing therethrough. For example, if the PB L1 2712 is configured to have a focusing lensing effect, the PB L2 2716 can be configured to have a defocusing effect such that the opposite lensing effects negate each other. As a result, the image of the world 1114 as viewed by the eye 4 is substantially unaffected, while the virtual image is affected by the PB L2 2716, as described above with respect to FIG. 27C.

Figure 28A:
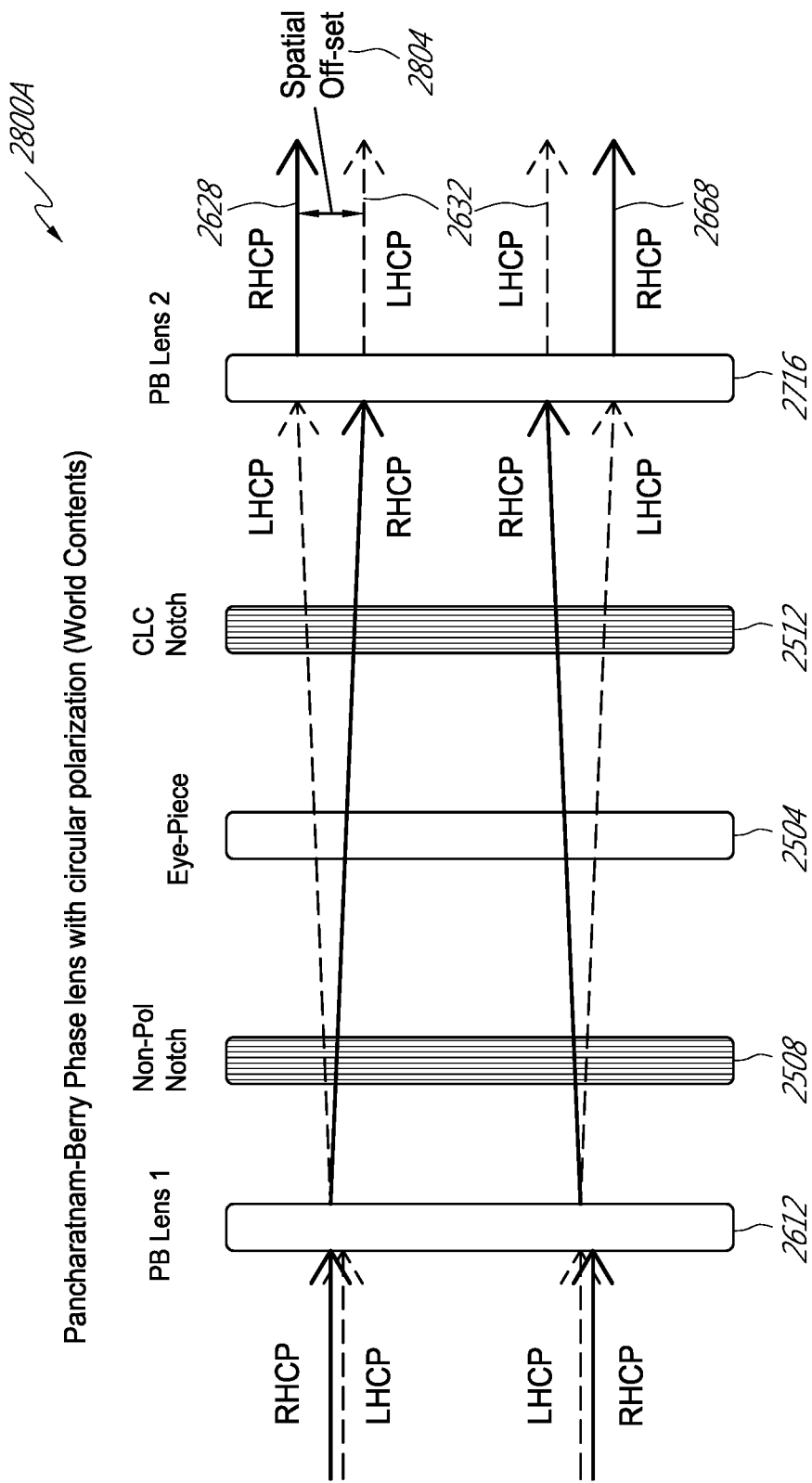
FIG. 28A illustrates a spatial off-set created by two orthogonal polarization images formed by an example display device comprising a polarization converter and a PB lens.

Example Spatial Offset Compensators for Polarization-Sensitive Variable-Focus Lenses When a polarization-sensitive lens such as a PB lens is used, two orthogonal polarization images undergo different optical passes through lenses. For example, a PB lens can split the world-image into two polarization images having different magnifications (which can lead to double images with a spatial offset between them). This effect is illustrated in FIG. 28A, which illustrates a display device 2800A configured similarly as the display device 2700A/2700B of FIGS. 27A and 27B. As described above, while two PB lenses can be configured to negates the lens effect of each other, an offset 2804 in the sizes of two polarization images formed by the light beam 2632 having LHCP and by the light beam 2628 having RHCP may remain, as illustrated in FIG. 28A. For example, in FIG. 28A, the PB L1 exerts a negative optical power on the light beam 2624-L having LHCP, while exerting a positive optical power on the light beam 2632-R having RHCP. In the following, various arrangements configured to compensate the offset 2804 are disclosed.

Figures 28B, 28C:
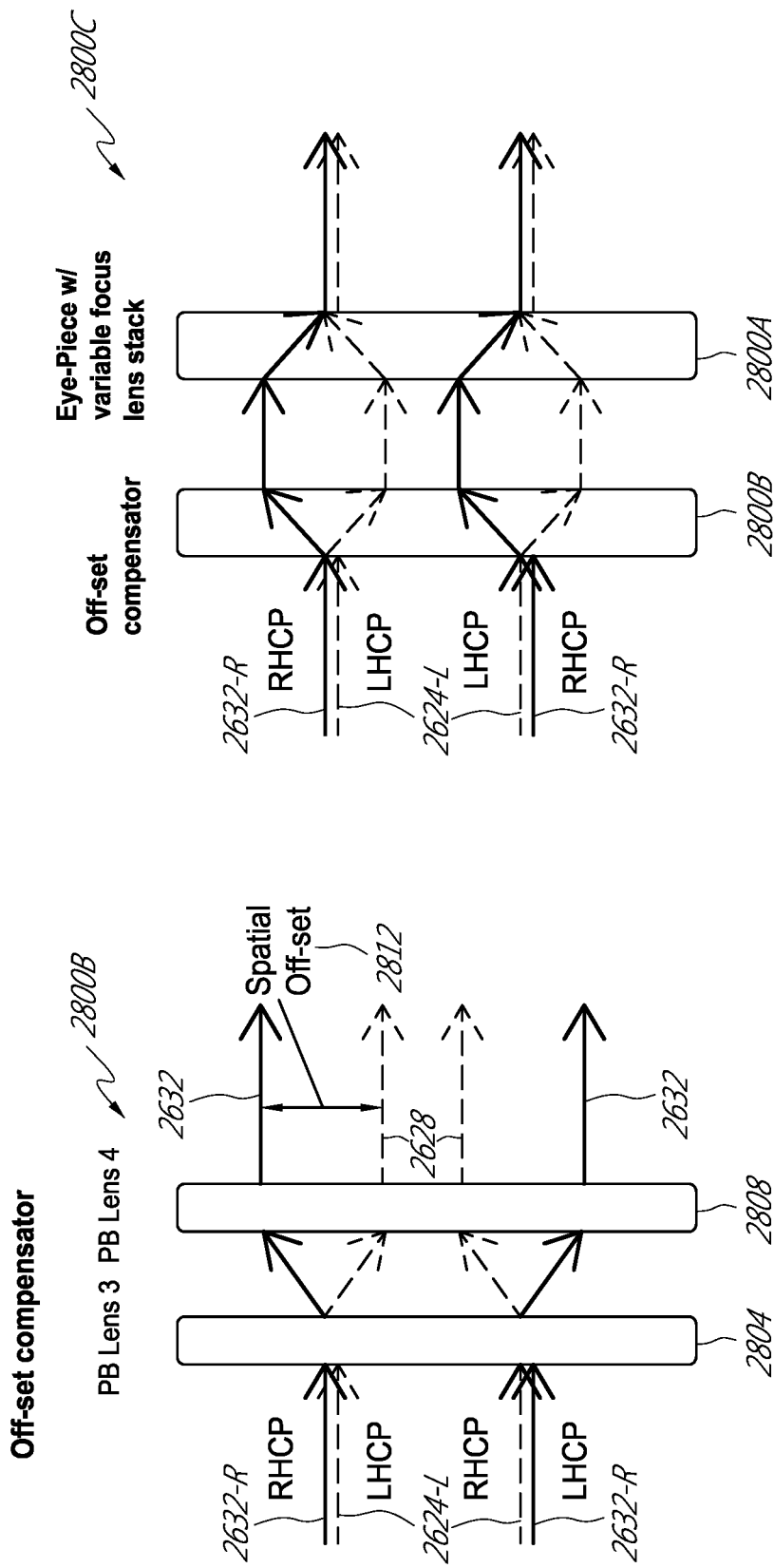
FIG. 28B illustrates an example offset compensator comprising a pair of lenses for compensating the spatial off-set illustrated in FIG. 28A.
FIG. 28C illustrates a negation effect of the spatial off-set illustrated in FIG. 28A using an embodiment of the offset compensator illustrated in FIG. 28B.

FIG. 28B illustrates an offset compensator 2800B comprising a pair of lenses 2804, 2808, e.g., a pair of PB lenses. The pair of lenses PB L3 2804 and PB L4 2808 are configured such that, when incident light beams having RHCP and LHCP are incident on the PB L3, the PB L3 exerts a positive optical power on the light beam having LHCP, while exerting a negative optical power on the light beam having RHCP. Thus, the optical powers of PB L3 2804 and P L4 2808 are opposite to those of PB L1 2612 and PB L2 2716, respectively, such that a spatial offset 2812 is present between the output light beams 2632 and 2628 output from the display device 2800A (FIG. 28A), which is opposite in direction and substantially the same in magnitude compared to output light beams 2632 and 2628 output from the offset compensator 2800B. Thus, the spatial offset 2804 illustrated in FIG. 28A can be compensated by placing a pair of lenses that produce an offset 2812 having the same magnitude in the opposite direction, as illustrated in FIG. 28B.

FIG. 28C illustrates a combination of the display device 2800A (FIG. 28A) stacked with the offset compensator 2800B (FIG. 28B). Same types of variable focus lenses as used in the optics of FIG. 28A can be used to construct the offset compensator. Static lenses can be used when a partial compensation is acceptable. As illustrated, the offset can be avoided by placing a polarizer in the front of the notch filter (e.g., linear polarizer for linear LC lenses or circular polarizer for PB lenses) while sacrificing brightness of the world image. Still, the virtual image is not affected. The offset compensator 2800B can be disposed world-ward of the eyepiece (e.g., as shown in FIG. 28C) or can be disposed eye-ward of the eyepiece (e.g., toward the right, where the user's eye is located). Multiple offset compensators can be used.

As described above with respect to various display devices, light propagating generally in a propagation direction, e.g., the x-direction, within one or more waveguides (e.g., 1182, 1184, 1186, 1188, 1190 in FIG. 6) in a waveguide assembly 2504 may be output, e.g., using out-coupling optical elements or light extracting optical elements (e.g., 1282, 1284, 1286, 1288, 1290 in FIG. 6), out of the waveguides, to output image information in an orthogonal direction, e.g., the z-direction. As described above, various embodiments of the out-coupling optical elements may comprise cholesteric liquid crystal gratings (CLCGs). As the light propagate within the one or more waveguides (e.g., 1182, 1184, 1186, 1188, 1190 in FIG. 6) the CLCGs (e.g., 1282, 1284, 1286, 1288, 1290 in FIG. 6) couple light out of the one or more waveguides. Under some configurations of the CLC layers of the CLCGs, the out-coupled light can have uniform polarization state in substantially a single direction, e.g., the z-direction. For example, the CLC layer(s) of CLCGs having chiral structures (e.g., 1012-1, 1012-2, . . . 1012-i in FIG. 10), in which the liquid crystal molecules are rotated in the same direction, e.g., clockwise or counter-clockwise direction, may out-couple light having substantially uniform polarization, e.g., LHCP or RHCP. In these embodiments, because the waveguide assembly 2504 out-couples light having substantially uniform polarization, a display device incorporating a waveguide assembly 2504 comprising CLCGs may omit some of the optical elements described above for converting the polarization of the output light.

Example Polarization Eyepieces with Variable-Focus Lenses

Figure 29:
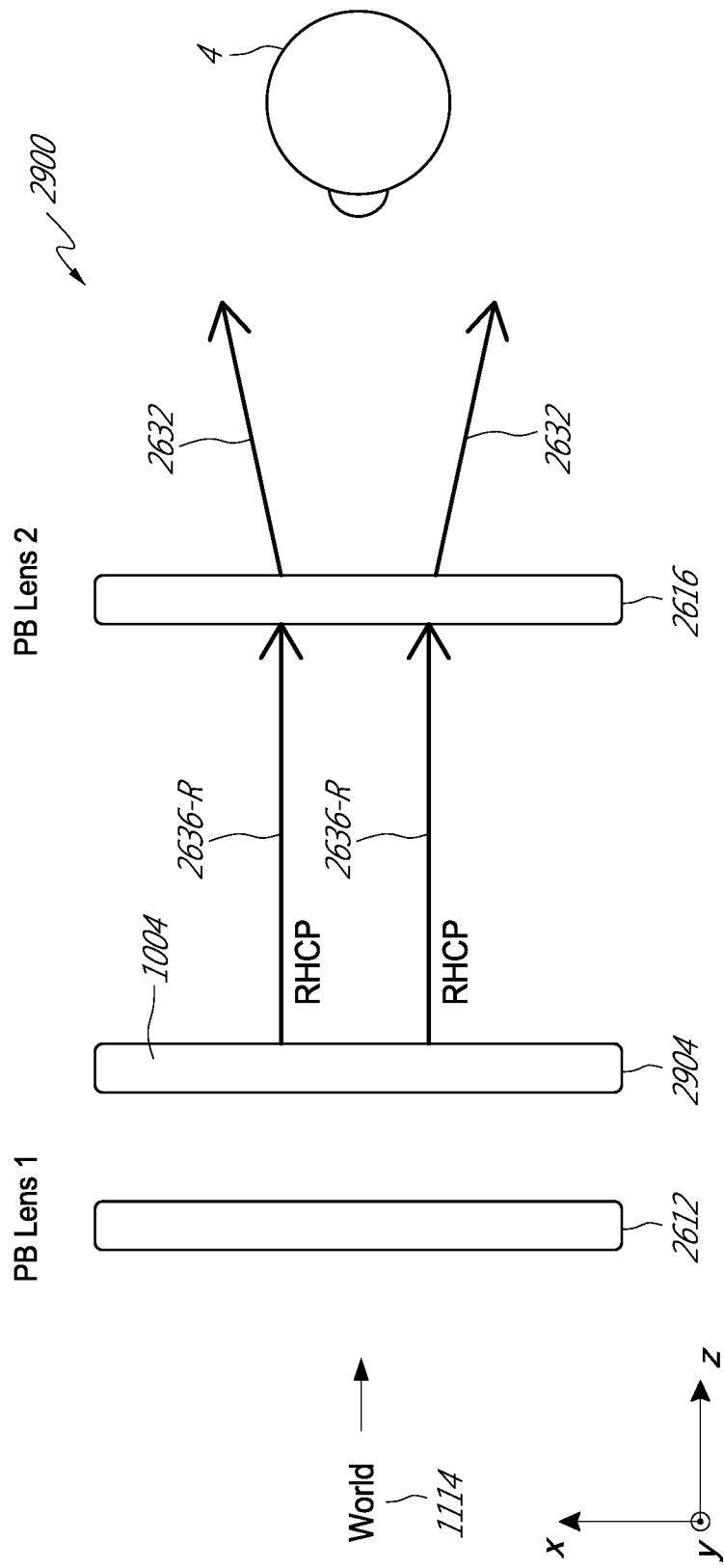
FIG. 29 illustrates an example display device comprising a waveguide assembly configured to asymmetrically project light and PB lenses, and configured to output image to a user.

In the following, the eye-piece 1004 may preferentially project light in a particular direction (e.g., to the right, eye-ward, in FIG. 29) as compared to other directions (e.g., to the left, world-ward, in FIG. 29). Referring to FIG. 29, a display device 2900 comprises the waveguide assembly 2904, where the waveguide assembly 2904 is interposed between first and second PB lenses 2612 and 2616, respectively. Advantageously, in this example, since the light beam 2636-R of the image output from the waveguide assembly 2904 is already polarized (e.g., right-handed circular polarization or RHCP), additional polarizer or polarization conversion may be omitted, because the light projected from the eyepiece 1004 is already preferentially in the polarization state (RHCP in this example) that is acted on by the lens 2616. Thus, some of the light propagating under TIR in the waveguide assembly 2904 may be out-coupled by DOEs formed therein as, for example, circularly polarized light beam 2636-R (or linearly polarized light beams in other implementations). The light beams 2636-R having RHCP travel, e.g., in a positive z-direction, until the beams impinge on the PB L2 2616 without passing through a polarizing notch reflector before being viewed by the eye 4. The eyepiece 1004 may include DOEs, metamaterials, holograms that are designed to asymmetrically project light in the desired direction and (optionally) with the desired polarization state (e.g., in FIG. 29, to the right with RHCP).

Example Deformable Mirror Variable-Focus Displays

Figure 30:
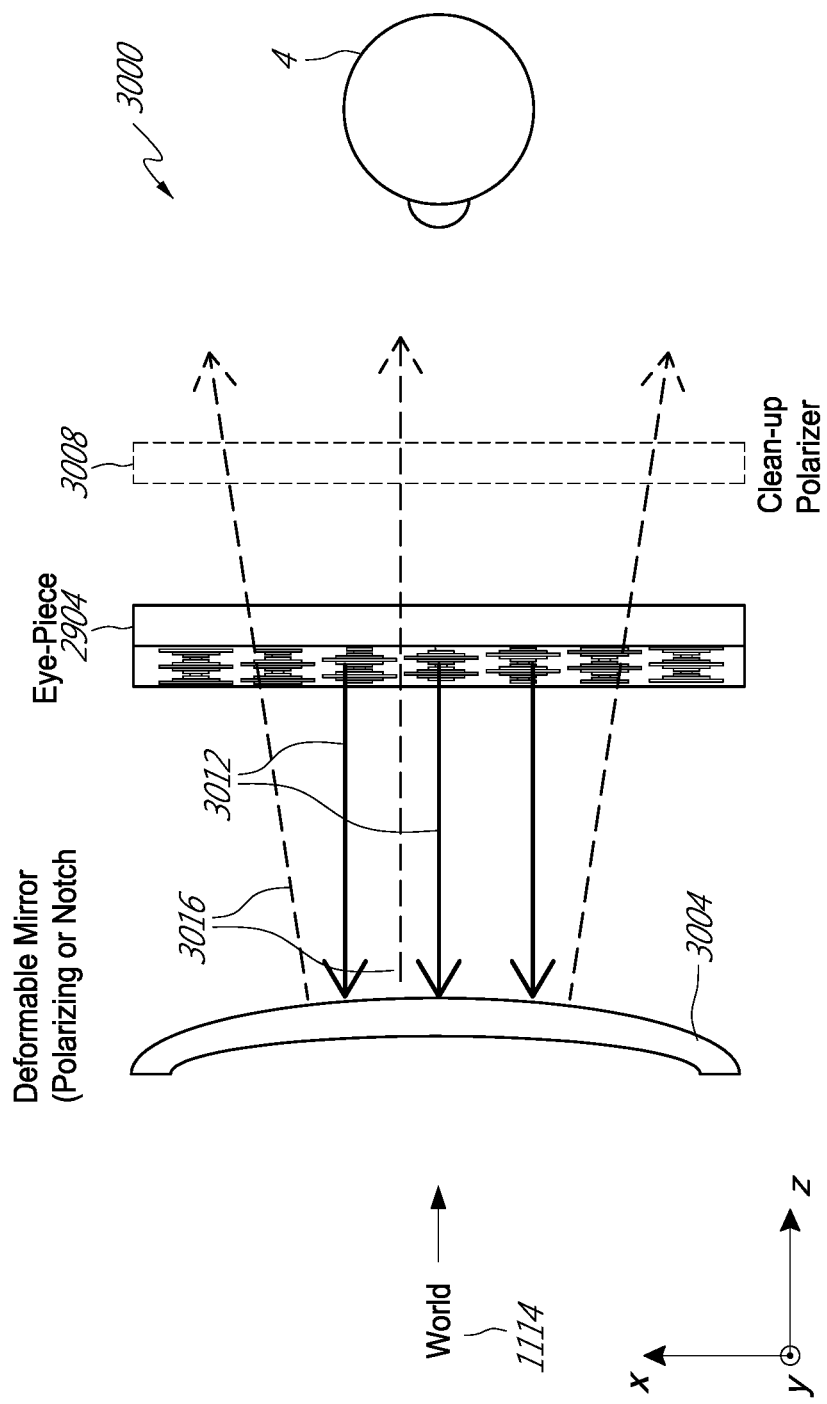
FIG. 30 illustrates an example display device comprising a waveguide assembly having a CLCG and a deformable mirror, and configured to output image to a user.
Figure 34:
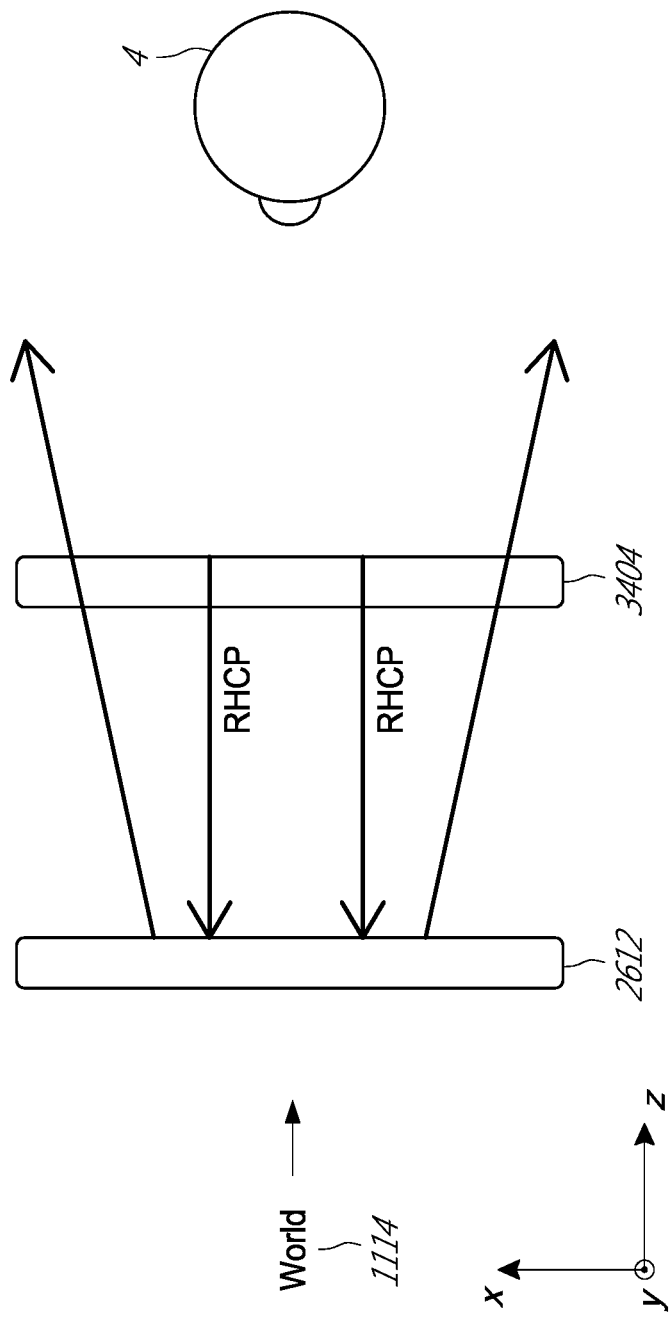
FIG. 34 illustrates an example combination of waveguide assembly comprising an eyepiece configured to direct light world-ward and a CLC lens configured to re-direct the light eye-ward.

In some embodiments, a deformable mirror can be used to make variable focus effects on virtual images when it is reflected from a mirror. FIG. 30 illustrates a display device 3000 configured to output image information to a user using a waveguide assembly 2904 and a deformable mirror 3004. The display device 3000 comprises a waveguide assembly 2904, where the waveguide assembly 2904 is interposed between a curved or deformable mirror 3004 (so that it has optical power) and an optional clean-polarizer 3008. As described with reference to FIG. 29, the eyepiece 2904 may be configured to asymmetrically project light, in this example, toward the left (world-ward) rather than to the right (eye-ward). The eyepiece 2904 may comprise DOEs, metamaterials, holograms, etc. that can preferentially project light in the desired, asymmetric direction and/or desired polarization state (e.g., linear or circular). For example, as shown in FIG. 34, the eyepiece 2904 may comprise a CLC layer or CLCG.

In operation, as described above with respect to FIG. 29, some of the light propagating in the x-direction within one or more waveguides within the waveguide assembly 2904 may be redirected, or out-coupled, in the z-direction as a light beam 3012 having a uniform circular polarization (e.g., RHCP). The waveguide assembly 2904 projects the light beam 3012 of a virtual image toward the curved or deformable mirror 3004 (in the opposite to side of the user's eye 4). In some embodiments, the deformable mirror 3004 is coated with a polarizing reflection layer (e.g., multi-layer linear polarization reflectors or broadband cholesteric liquid crystal circular polarization reflectors) to reflect light having a designated polarization, e.g., light having the same polarization as the out-coupling polarization of the CLCGs, and to allow light from the real world 1114 transmitted toward the eye 4. In some other embodiments, instead of a polarizing reflection layer, the deformable mirror 3004 is coated with a notch reflection layer or CLC reflection layer, which is designed to reflect light within a narrow bandwidth Δλ that matches the virtual image bandwidth of the out-coupled light from the waveguide assembly 2904. In some embodiments, a clean-up polarizer 3008 can optionally be placed as shown in FIG. 30 to eliminate any ghost images without going through the deformable mirror.

Cholesteric Liquid Crystal Lenses

As described elsewhere herein (see, e.g., FIGS. 30 and 34), some display devices comprise an eyepiece configured to asymmetrically project light world-ward (e.g., away from the user's eye 4 toward the world 1114) and then an optical structure (e.g., the deformable mirror 3004 of FIG. 30 or the CLC lens of FIG. 34) that reverses (e.g., by reflection or diffraction) the direction of the light back toward the user's eye 4.

Figure 31C:
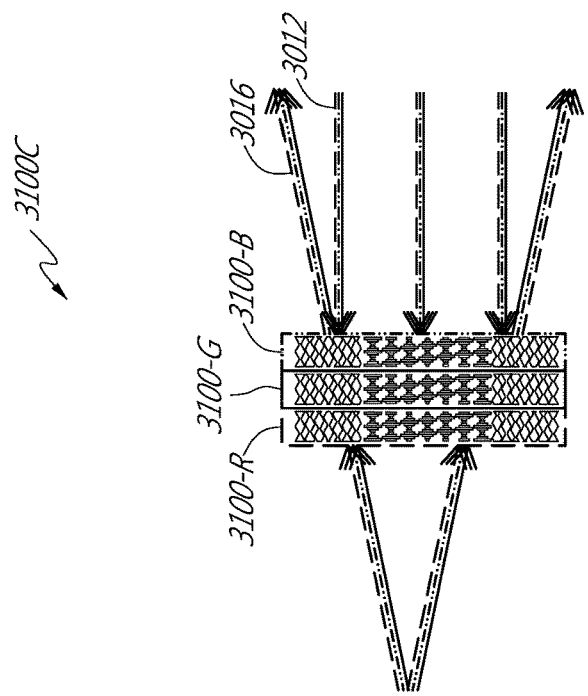
FIGS. 31A-31C illustrate example reflective diffraction lenses that can be implemented as part of a display device, where the reflective diffraction lenses are formed of patterned CLC materials serving as a reflective polarizing mirror.
Figure 31B:
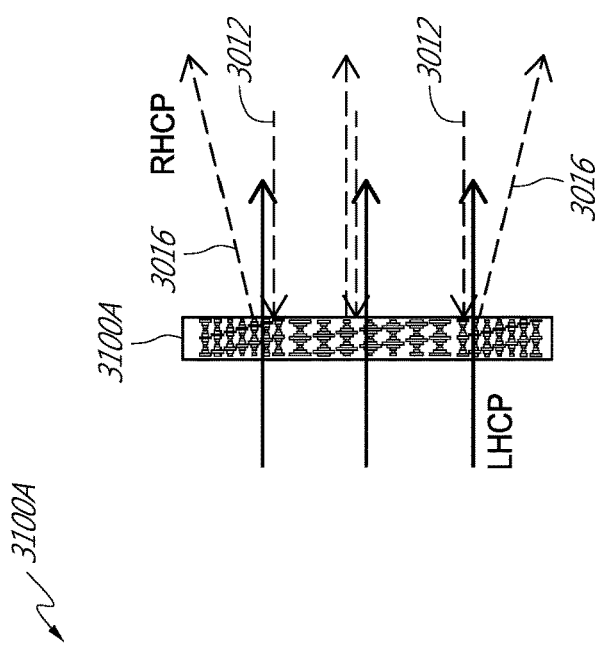
Figure 31A:
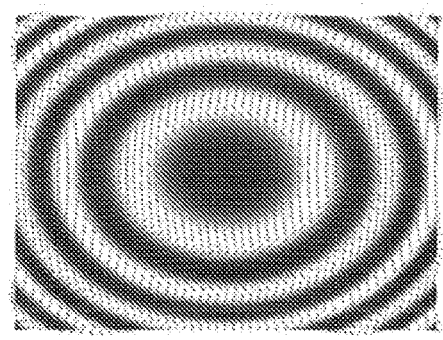

FIGS. 31A and 31B illustrate a reflective diffraction lens 3100A that can be implemented as part of a display device, where the reflective diffraction lens 3100A is formed of patterned CLC materials serving as a reflective polarizing mirror, in a similar manner to transmissive PB LC lenses. FIG. 31A illustrates local orientations of liquid crystal directors (arrows) on top of a binary Fresnel lens pattern. Accordingly, the CLC lens 3100A can be configured to have optical power (which may be adjustable such as by an applied electric field). Embodiments of the CLC lens 3100A can be used as an alternative to the deformable mirror 3004 in the display of FIG. 30 or can be used to provide additional reflectivity or optical power in the display of FIG. 30 (e.g., by combining the CLC lens 3100A and the mirror 3004, e.g., via coating or laminating the CLC lens onto a surface of the mirror 3004).

Referring to FIG. 31B, when the lens 3100A is illuminated with circularly polarized incident light 3012 having a circular polarization that corresponds to (e.g., having the same handedness as) the handedness of the CLC chirality (e.g., RHCP), the reflected light 3016 exhibits lens effects similar to transmissive PB lenses. On the other hand, light with the orthogonal polarization (e.g., LHCP) is transmitted without interference. The lens 3100A can be configured to have a bandwidth in a range of less than about 10 nm, less than about 25 nm, less than about 50 nm, less than about 100 nm, or some other range.

FIG. 31C illustrates a reflective diffraction lens 3100C comprising a plurality of reflective diffraction lenses 3100-R, 3100-G and 3100-B. In the illustrated embodiment, the reflective diffraction lenses 3100-R, 3100-G and 3100-B are in a stacked configuration and are configured to reflect light within a range of wavelengths Ax within the red, green and blue spectra, respectively. When the lens 3100C is illuminated with circularly polarized incident light 3012 having a circular polarization that corresponds to the handedness of the CLC chirality (e.g., RHCP) and a wavelength within a range of wavelengths 42 within the red, green and blue spectra, the reflected light 3016 exhibits lens effects similar to transmissive PB lenses. On the other hand, light with the orthogonal polarization (e.g., LHCP) is transmitted without interference.

Figure 32B:
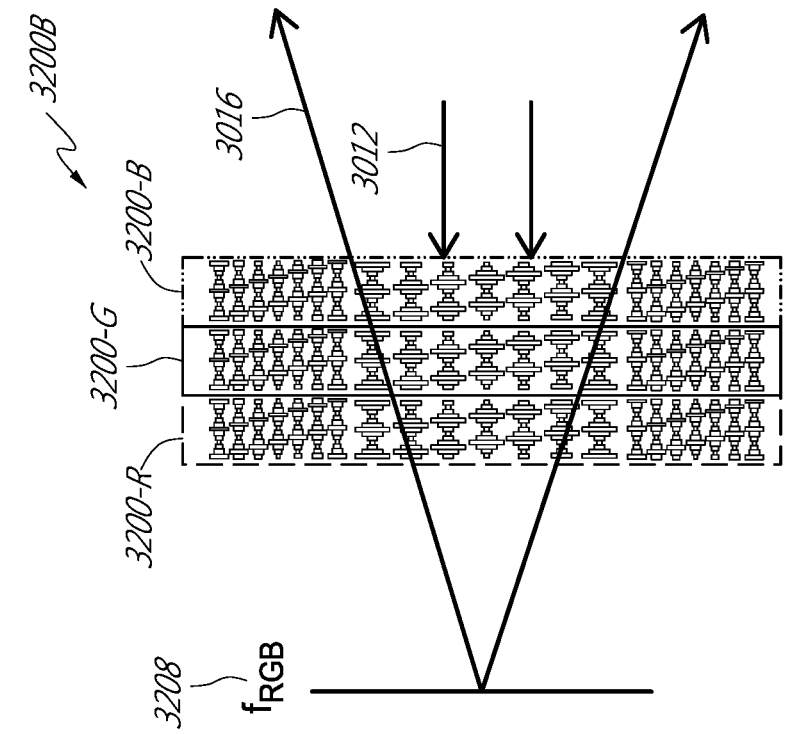
FIG. 32B illustrates an example reflective diffraction lens comprising a plurality of reflective diffraction lenses in a stacked configuration.
Figure 32A:
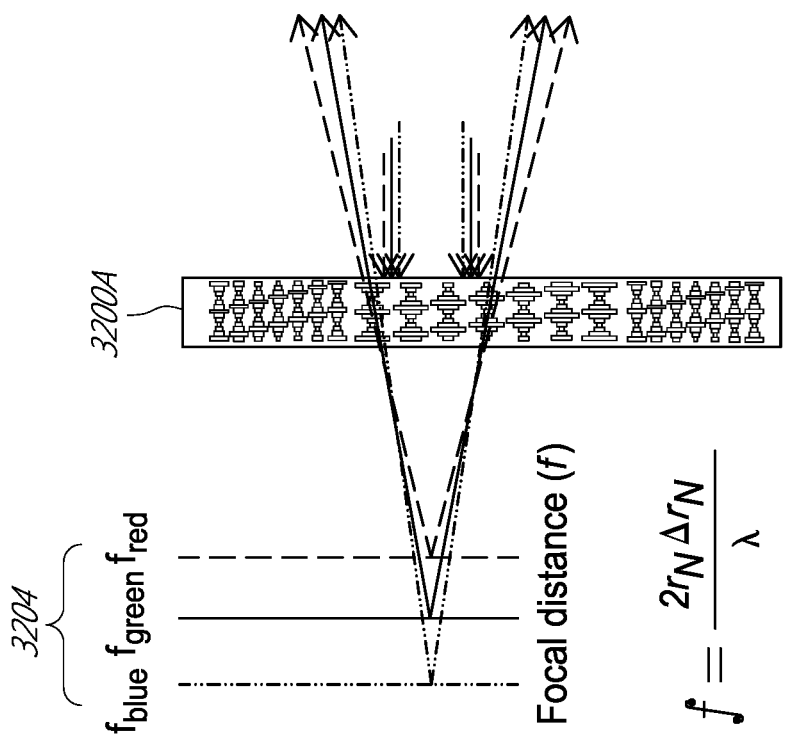
FIG. 32A illustrates an example of chromatic aberration observed in diffractive lenses.

Diffractive lenses (e.g., Fresnel lenses) often suffer from severe chromatic aberration as the focal distances 3204 vary depending on the wavelength of light. This is illustrated in FIG. 32A with respect to a diffractive lens 3200A, which shows incident red, green, and blue light being focused at different distances from the lens 3200A.

With benefit of moderate bandwidth of CLC materials, a stack of lenses can be implemented to have substantially the same focal distance for different colors. FIG. 32B illustrates a reflective diffraction lens 3200B comprising a plurality of reflective diffraction lenses 3200-R, 3200-G and 3200-B in a stacked configuration similar to the reflective diffraction lens 3100C illustrated with respect to FIG. 31C. As shown in FIG. 32B, the three individual lenses 3200-R, 3200-G and 3200-B are designed to have substantially the same focal distance or optical power for red, green, and blue wavelengths, respectively. Since the bandwidth of CLC materials is in many implementations around 50 nm to 100 nm, cross-talk between the three wavelengths can be reduced or minimized. Although 3 CLC layers are shown, fewer or greater numbers of layers can be used corresponding to the colors of light incident on the lens 3200B.

Example Dynamic Switching Among CLC Lenses

Figure 33A:
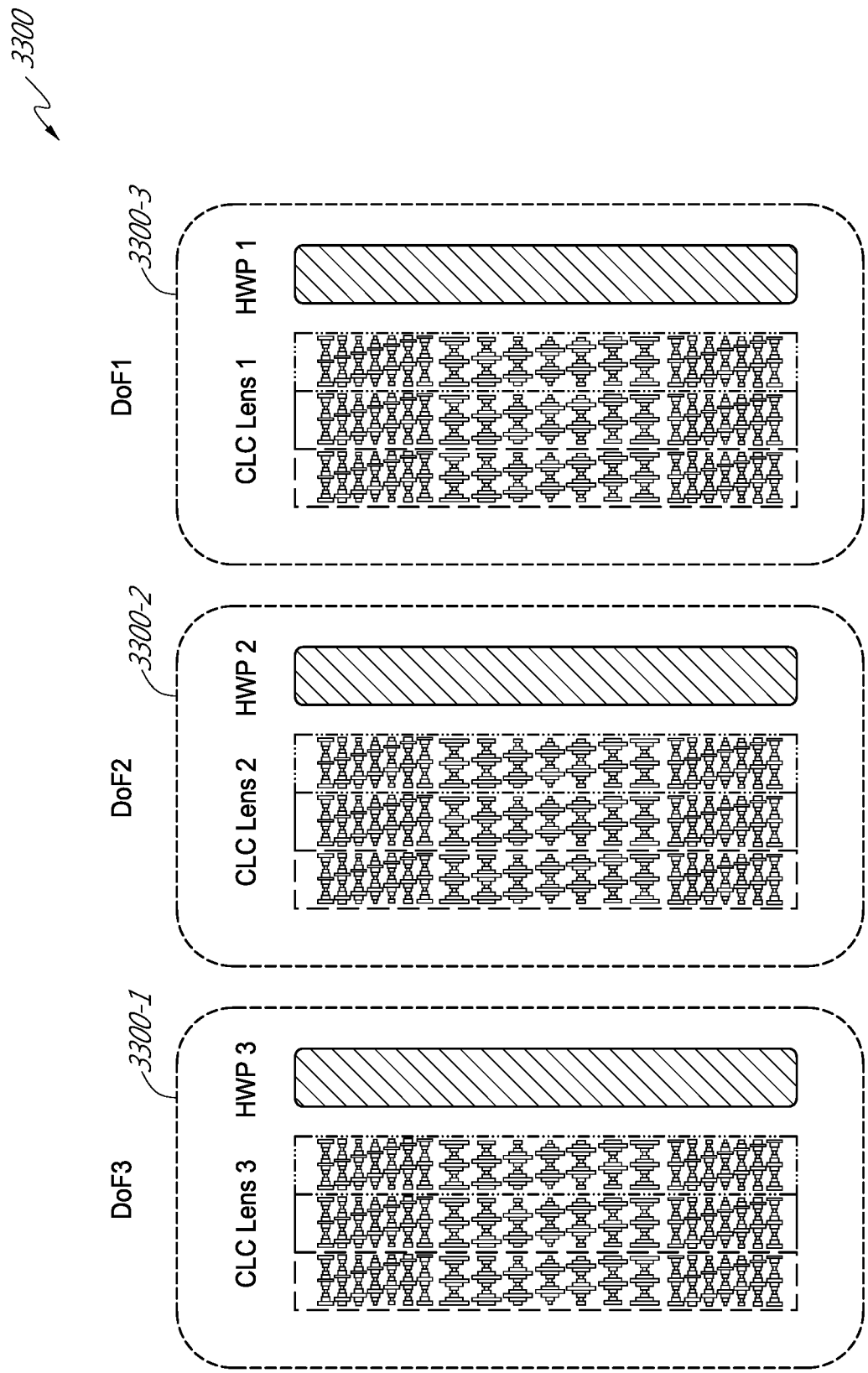
FIGS. 33A-33D illustrates example reflective diffraction lens assemblies and their operation for dynamic switching between different focal distances.

FIG. 33A illustrates a reflective diffraction lens assembly 3300 configured for dynamic switching between different focal distances. The dynamic switching is achieved by stacking a plurality of reflective diffraction lens sub-assemblies 3300-1, 3300-2 and 3300-3 comprising first, second and third multi-layer diffraction lenses CLC L1, CLC L2 and CLC L3, where each of the multi-layer diffraction lenses CLC L1, CLC L2 and CLC L3 comprises a plurality of lenses 3100-R, 3100-G and 3100-B. As configured, the reflective diffraction lens sub-assemblies 3300-1, 3300-2 and 3300-3 are configured to have different focal distances. The plurality of reflective diffraction lens sub-assemblies 3300-1, 3300-2 and 3300-3 include first, second and third switchable half-wave plates HWP1, HWP2 and HWP3 (e.g., switchable LC half-wave plates). In the illustrated embodiment, the reflective diffraction lens sub-assemblies 3300-1, 3300-2 and 3300-3 are in a stacked configuration such that the multi-layer diffraction lenses CLC L1, CLC L2 and CLC L3 of the sub-assemblies 3300-1, 3300-2 and 3300-3 alternate with switchable half-wave plates (HWP) of the sub-assemblies 3300-1, 3300-2 and 3300-3.

Figure 33B:
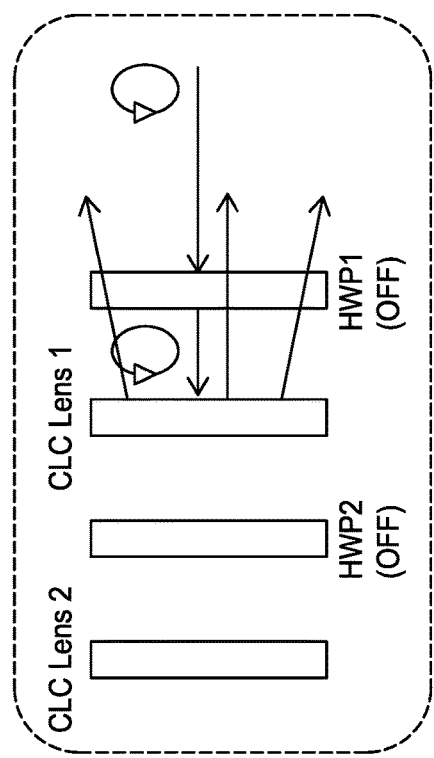
Figure 33C:
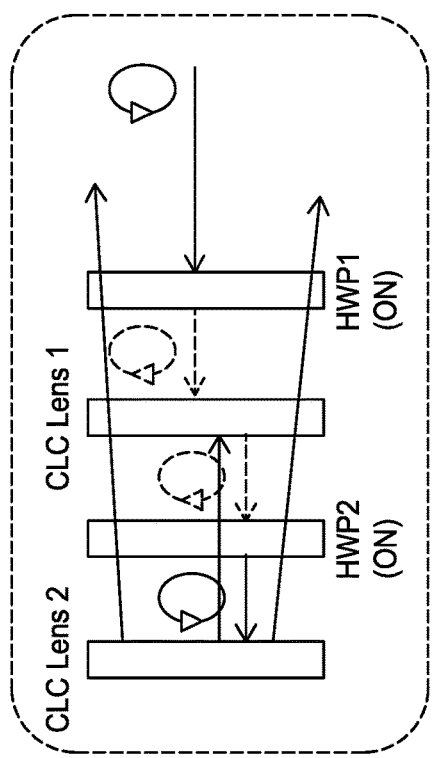

FIGS. 33B and 33C illustrate an example switching operation between two different reflective diffraction lens sub-assemblies 3300-1 and 3300-2 by modulating the HWPs disposed in each. When the first HWP (HWP1) is in an OFF-state (e.g., no retardation), light is reflected by the first CLC lens (CLC L1) and the image focus is determined by the first CLC L1. When both HWP1 and HWP2 are in an ON state (e.g., half-wave retardation), light is not reflected from the CLC L1 as its polarization becomes orthogonal (e.g., LHCP) to the operating polarization (e.g., RHCP). The polarization state is restored by the HWP2 and light is reflected from the CLC L2). The image focus is now determined by the CLC L2.

Figure 33D:
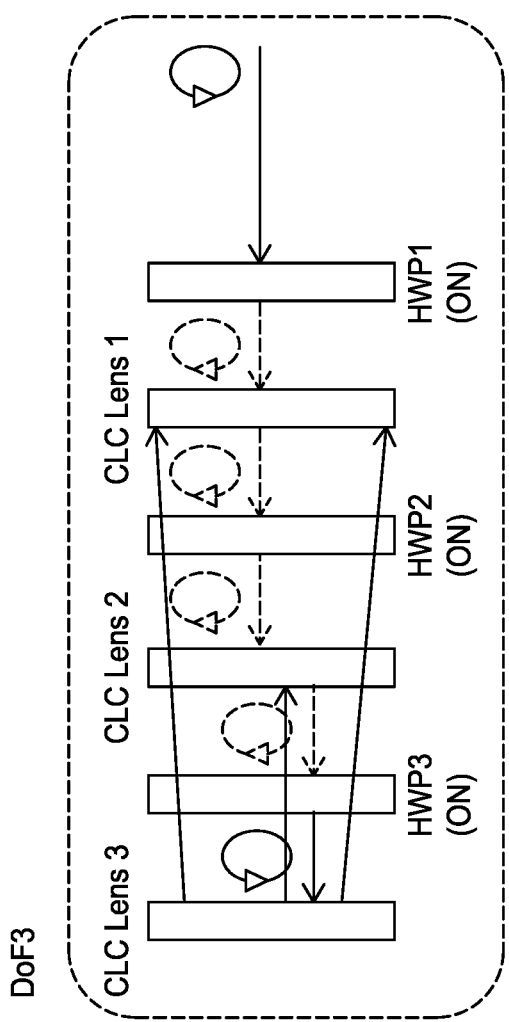

Similarly, three different focal distances can be implemented by adding additional pair of CLC lens and HWP as shown in FIG. 33D. Light polarization is converted to the orthogonal polarization (e.g., LCHP) to the operating polarization (e.g., RHCP) by the HWP1. Since the HWP2 is in an OFF state, the polarization is not affected and light propagates through the CLC L2 without interference. After the HWP3, the polarization is flipped again and becomes the operating polarization (e.g., RHCP) and light is reflected by the CLC L3. The image focus is now determined by the CLC L3 as shown in FIG. 33D.

In embodiments, variable focus of virtual images can be implemented by combining a waveguide assembly 3404 (also and a CLC lens 3408 as illustrated in FIG. 34. The CLC lens 3408 can include any of the embodiments of the CLC lenses 3100A, 3100C, 3200A, 3200B, 3300 described herein. Since images projected from the waveguide assembly 3404 propagate preferentially toward the CLC lens (e.g., world-ward, in the direction away from the user's eyes) with uniform circular polarization, the image focus can be controlled by CLC lenses as described above. The CLC lens 3408 can include multiple depth planes (e.g., DoF1-DoF3 shown in FIG. 33A) and be dynamically switchable as described with reference to FIGS. 33B-33D. When a color-sequential display is used to generate virtual images, the waveplates in CLC lenses need to be modulated in synchronization with operating colors projected by the eyepiece 3404. As described above, the CLC lens 3408 can be used alone or in combination with a deformable mirror (e.g., mirror 3004) to provide a variable focus display device for virtual images.

Additional Aspects

In a 1$^{st}$ aspect, a display device comprises a waveguide configured to propagate visible light under total internal reflection in a direction parallel to a major surface of the waveguide. An outcoupling element is formed on the waveguide and configured to outcouple a portion of the visible light in a direction normal to the major surface of the waveguide. A polarization-selective notch reflector disposed on a first side of the waveguide and configured to reflect visible light having a first polarization while transmitting visible light having a second polarization. A polarization-independent notch reflector disposed on a second side of the waveguide and configured to reflect visible light having the first polarization and visible light having the second polarization, where the polarization-independent notch reflector is configured to convert a polarization of visible light reflecting therefrom.

In a 2$^{nd}$ aspect, in the display device of the 1$^{st}$ aspect, each of the polarization-selective notch reflector and the polarization-independent notch reflector is configured to reflect visible light having a wavelength in a wavelength range corresponding to one of red, green or blue light, while transmitting light having a wavelength outside the wavelength range.

In a 3$^{rd}$ aspect, in the display device of any of the 1$^{st}$ to 2$^{nd}$ aspects, the polarization-selective notch reflector comprises one or more cholesteric liquid crystal (CLC) layers.

In a 4$^{th}$ aspect, in the display device of any of the 1$^{st}$ to 3$^{rd}$ aspects, each of the one or more CLC layers comprises a plurality of chiral structures, where each of the chiral structures comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction. Arrangements of the liquid crystal molecules of the chiral structures vary periodically in a lateral direction perpendicular to the layer depth direction.

In a 5$^{th}$ aspect, in the display device of any of the 1$^{st}$ to 4$^{th}$ aspects, the first polarization is a first circular polarization and the second polarization is a second circular polarization.

In a 6$^{th}$ aspect, in the display device of any of the 1$^{st}$ to 5$^{th}$ aspects, the display device further comprising a first quarter-wave plate and a second quarter-wave plate, wherein the polarization-independent notch reflector is interposed between the first quarter-wave plate and the waveguide, and wherein the polarization-selective notch reflector is interposed between the waveguide and the second quarter-wave plate.

In a 7$^{th}$ aspect, in the display device of the 6$^{th}$ aspect, the display device further comprises a first linear polarizing lens and a second linear polarizing lens, wherein the first quarter-wave plate is interposed between the first linear polarizing lens and the polarization-independent notch reflector, and wherein the second quarter-wave plate is interposed between the polarization-selective notch reflector and the second linear polarizing lens.

In an 8$^{th}$ aspect, in the display device of any of the 1$^{st}$ to 4$^{th}$ aspects, the display device further comprises a first Pancharatnam-Berry (PB) lens and a second Pancharatnam-Berry (PB) lens disposed on outer sides of the polarization-independent notch reflector and the polarization-selective notch reflector.

In a 9$^{th}$ aspect, in the display device of any of the 1$^{st}$ or 2$^{nd}$ aspects, the display device further comprises a first quarter-wave plate interposed between the polarization-independent notch reflector and the waveguide.

In a 10$^{th}$ aspect, in the display device of the 9$^{th}$ aspect, the display device further comprises a second quarter-wave plate, wherein the polarization-independent notch reflector is interposed between the first quarter-wave plate and the second quarter-wave plate.

In an 11$^{th}$ aspect, in the display device of the 10$^{th}$ aspect, the display device further comprises a first linear polarizing lens and a second linear polarizing lens, wherein the first quarter-wave plate is interposed between the first linear polarizing lens and the polarization-independent notch reflector, and wherein the polarization-selective notch reflector is interposed between the waveguide and the second linear polarizing lens.

In a 12$^{th}$ aspect, in the display device of the 9$^{th}$ aspect, the display device further comprises a first Pancharatnam-Berry (PB) lens, a second Pancharatnam-Berry (PB) lens disposed on outer sides of the polarization-independent notch reflector and the polarization-selective notch reflector, and a second quarter-wave plate interposed between the second PB lens and the polarization-selective notch reflector.

In a 13$^{th}$ aspect, a display device comprises a wave-guiding device interposed between a first switchable lens and a second switchable lens. The wave-guiding device comprises one or more cholesteric liquid crystal (CLC) layers each comprising a plurality of chiral structures, wherein each chiral structure comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light. One or more waveguides are formed over the one or more CLC layers and configured to propagate visible light under total internal reflection (TIR) in a direction parallel to a major surface of the waveguide and to optically couple visible light to or from the one or more CLC layers.

In a 14$^{th}$ aspect, in the display device of the 13$^{th}$ aspect, the one or more waveguides are interposed between a polarization-selective notch reflector and a polarization-independent notch reflector, wherein the polarization-selective notch reflector is configured to reflect visible light having a first polarization while transmitting visible light having a second polarization, and wherein the polarization-independent notch reflector is configured to reflect visible light having the first polarization and visible light having the second polarization.

In a 15$^{th}$ aspect, in the display device of the 13$^{th}$ aspect, the one or more CLC layers serve as the polarization-selective notch reflector.

In a 16$^{th}$ aspect, in the display device of the 13$^{th}$ aspect, the polarization-selective notch reflector comprises one or more cholesteric liquid crystal (CLC) layers.

In a 17$^{th}$ aspect, in the display device of the 16$^{th}$ aspect, each of the one or more CLC layers comprises a plurality of chiral structures, wherein each of the chiral structures comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction. Arrangements of the liquid crystal molecules of the chiral structures vary periodically in a lateral direction perpendicular to the layer depth direction.

In an 18$^{th}$ aspect, in the display device of any one of the 13$^{th}$ to 17$^{th}$ aspects, the polarization-selective notch reflector is configured to preserve a polarization of visible light reflecting therefrom, and wherein the polarization-independent notch reflector is configured to convert a polarization of visible light reflecting therefrom.

In a 19$^{th}$ aspect, in the display device of any one of the 13$^{th}$ to 18$^{th}$ aspects, the first switchable lens and the second switchable lens have optical powers having opposite signs when activated.

In a 20$^{th}$ aspect, in the display device of any one of the 13$^{th}$ to 19$^{th}$ aspects, the first switchable lens comprises a Pancharatnam-Berry (PB) lens and the second switchable lens comprises a second Pancharatnam-Berry (PB) lens.

In a 21$^{st}$ aspect, in the display device of any one of the 13$^{th}$ to 20$^{th}$ aspects, the display device further comprises a first quarter-wave plate interposed between the polarization-independent notch reflector and the waveguide.

In a 22$^{nd}$ aspect, in the display device of any one of the 13$^{th}$ to 21$^{st}$ aspects, the display device further comprises a second quarter-wave plate interposed between the second switchable lens and the polarization-selective notch reflector.

In a 23$^{rd}$ aspect, a display device configured to display an image to an eye of a user comprises an optical display comprising a forward side and a rearward side, the rearward side closer to the eye of the user than the forward side, the optical display configured to output light having a wavelength range toward the rearward side. A first notch reflector is disposed rearward of the optical display, the first notch reflector configured to reflect light having the wavelength range output from the optical display. A second notch reflector is disposed forward of the optical display, the second notch reflector configured to reflect light having the wavelength range. The first notch reflector is configured to substantially transmit light having a first polarization and substantially reflect light having a second polarization that is different from the first polarization. The second notch reflector is configured to convert light incident on a rearward face having the second polarization to the first polarization and to redirect the light rearward.

In a 24$^{th}$ aspect, in the display device of the 23$^{rd}$ aspect, the first notch reflector comprises a cholesteric liquid crystal (CLC) grating (CLCG).

In a 25$^{th}$ aspect, in the display device of the 23$^{rd}$ aspect, the first notch reflector comprises a multi-layer, and the second notch reflector comprises a non-polarizing notch reflector and a quarter-wave plate.

In a 26$^{th}$ aspect, in the display device of any one of the 23$^{rd}$ to 25$^{th}$ aspects, the display device further comprises a first variable focus lens disposed rearward of the first notch reflector and a second variable focus lens disposed forward of the second notch reflector, wherein second optical characteristics of the second variable focus lens compensate for first optical characteristics of the first variable focus lens.

In a 27$^{th}$ aspect, in the display device of the 26$^{th}$ aspect, each of the first variable focus lens and the second variable focus lens comprises a linear polarization lens.

In a 28$^{th}$ aspect, in the display device of the 26$^{th}$ aspect, each of the first variable focus lens and the second variable focus lens comprises a Pancharatnam-Berry (PB) phase lens.

In a 29$^{th}$ aspect, in the display device of the 28$^{th}$ aspect, the display device further comprises a spatial offset compensator configured to compensate for a spatial offset introduced by the PB phase lenses.

In a 30$^{th}$ aspect, a dynamically focused display system comprises a display configured to output circularly polarized light in a first circular polarization state. The display is disposed along an optical axis and has a forward side and a rearward side, the rearward side closer to the eye of the user than the forward side, the optical display configured to output light having a wavelength range toward the rearward side. A first switchable optical element is disposed forward of the first CLC lens along the optical axis, the first switchable optical element configured to change the circular polarization state of light transmitted through the first switchable optical element from the first circular polarization state to a second, different, circular polarization state. A first cholesteric liquid crystal (CLC) lens is disposed forward of the first switchable optical element along the optical axis. A second switchable optical element is disposed forward of the first CLC lens along the optical axis, the second switchable optical element configured to change the circular polarization state of light transmitted through the second switchable optical element from the first circular polarization state to a second, different, circular polarization state. A second CLC lens disposed forward of the second switchable optical element along the optical axis. A controller is configured to electronically switch the states of the first and the second switchable optical elements to dynamically select either the first CLC lens or the second CLC lens.

In a 31$^{st}$ aspect, in the dynamically focused display system of the 30$^{th}$ aspect, in response to selection of the first CLC lens, the first switchable optical element is switched to permit transmission of light having the first polarization state. In response to selection of the second CLC lens, the first switchable optical element is switched to change polarization of light from the first circular polarization state to the second circular polarization state and the second switchable optical element is switched to change polarization of light from the second circular polarization state to the first circular polarization state.

In a 32$^{nd}$ aspect, in the dynamically focused display system of the 30$^{th}$ or 31$^{st}$ aspects, the first and the second switchable optical elements comprise half-wave plates.

In a 33$^{rd}$ aspect, a wearable augmented reality display system comprises the dynamically focused display system of any one of the 30$^{th}$ to 32$^{nd}$ aspects.

In a 34$^{th}$ aspect, a wearable augmented reality head-mounted display system is configured to pass light from the world forward a wearer wearing the head-mounted system into an eye of the wearer. The wearable augmented reality head mounted display system comprises an optical display configured to output light to form an image; one or more waveguides disposed to receiving said light from said display; a frame configured to dispose the waveguides forward of said eye such that said one or more waveguides have a forward side and a rearward side, said rearward said closer to said eye than said forward side; a cholesteric liquid crystal (CLC) reflector disposed on said forward side of said one or more waveguides, said CLC reflector configured to have an optical power or a depth of focus that is adjustable upon application of an electrical signal; and one or more out-coupling elements disposed with respect to said one or more waveguides to extract light from the one or more waveguides and direct at least a portion of said light propagating within said waveguide to the CLC reflector, said light being directed from said CLC reflector back through said waveguide and into said eye to present an image from the display into the eye of the wearer.

In a $35^{th}$ aspect, a display device comprises a waveguide configured to propagate visible light under total internal reflection in a direction parallel to a major surface of the waveguide and to outcouple the visible light in a direction normal to the major surface. A notch reflector is configured to reflect visible light having a first polarization, wherein the notch reflector comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light.

In a $36^{th}$ aspect, in the display device of the $35^{th}$ aspect, the waveguide is configured to outcouple the visible light selectively towards the notch reflector.

In a $37^{th}$ aspect, in the display device of the $35^{th}$ or $36^{th}$ aspects, the notch reflector comprises a deformable mirror having the one or more CLC layers formed (or disposed) thereon.

In a $38^{th}$ aspect, in the display device of any of one the $35^{th}$ to $37^{th}$ aspects, different ones of the one or more CLC layers are configured to reflect visible light having a wavelength in a wavelength range corresponding to different ones of red, green or blue light, while being configured to transmit light having a wavelength outside the wavelength range.

In a $39^{th}$ aspect, in the display device of any one of the $35^{th}$ to $38^{th}$ aspects, each of the chiral structures of the CLC layers comprises a plurality of liquid crystal molecules that extend in a layer depth direction by at least a helical pitch, wherein different ones of the one or more CLC layers have different helical pitches.

In a $40^{th}$ aspect, in the display device of the $38^{th}$ or $39^{th}$ aspects, different ones of the one or more CLC layers have substantially the same optical power.

In a $41^{st}$ aspect, in the display device of any one of $35^{th}$ to $40^{th}$ aspects, the display device comprises a plurality of notch reflectors, wherein each of the notch reflectors is configured to reflect visible light having a first polarization, wherein each of the notch reflector comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light.

In a $42^{nd}$ aspect, in the display device of any one of the $35^{th}$ to $41^{st}$ aspects, different ones of the notch reflectors have different optical powers.

In a $43^{rd}$ aspect, in the display device of the $41^{st}$ or $42^{nd}$ aspects, the display device further comprises a half-wave plate corresponding to each of the notch reflectors.

Additional Considerations

In the embodiments described above, augmented reality display systems and, more particularly, spatially varying diffraction gratings are described in connection with particular embodiments. It will be understood, however, that the principles and advantages of the embodiments can be used for any other systems, apparatus, or methods with a need for the spatially varying diffraction grating. In the foregoing, it will be appreciated that any feature of any one of the embodiments can be combined and/or substituted with any other feature of any other one of the embodiments.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of one or more of the items in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. No element or combinations of elements is necessary or indispensable for all embodiments. All suitable combinations and subcombinations of features of this disclosure are intended to fall within the scope of this disclosure.

What is claimed is:

1. A wearable augmented reality head-mounted display system configured to pass light from the world forward a wearer wearing the head-mounted system into an eye of the wearer, the wearable augmented reality head mounted display system comprising:
    an optical display configured to output light to form an image;
    one or more waveguides disposed to receiving said light from said optical display;
    a frame configured to dispose the one or more waveguides forward of said eye such that said one or more waveguides have a forward side and a rearward side, said rearward side closer to said eye than said forward side;
    a cholesteric liquid crystal (CLC) reflector disposed on said forward side of said one or more waveguides, said CLC reflector configured to have an optical power or a depth of focus that is adjustable upon application of an electrical signal; and
    one or more out-coupling elements disposed with respect to said one or more waveguides to extract light from the one or more waveguides and direct at least a portion of said light propagating within said one or more waveguides away from the eye of the wearer to the CLC reflector, said light being directed from said CLC reflector back through said one or more waveguides and into said eye to present an image from the optical display into the eye of the wearer that appears to originate from a certain depth plane to the wearer in dependence on the adjustable optical power or depth of focus of the CLC reflector.

2. The wearable augmented reality head-mounted display system of claim 1, wherein the CLC reflector comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction.

3. The wearable augmented reality head-mounted display system of claim 2, wherein arrangements of the liquid crystal molecules of the chiral structures vary periodically in a lateral direction perpendicular to the layer depth direction such that the one or more CLC layers are configured to Bragg-reflect incident light.

4. The wearable augmented reality head-mounted display system of claim 1, further comprising a deformable mirror used in combination with the CLC reflector to provide a variable focus display device for virtual images.

5. The wearable augmented reality head-mounted display system of claim 1, wherein the CLC reflector includes a plurality of multi-layer cholesteric liquid crystal (CLC) lenses.

6. The wearable augmented reality head-mounted display system of claim 5, wherein the plurality of multi-layer CLC lenses are configured to reflect visible light having a wavelength in a wavelength range corresponding to different ones of red, green and blue light, while being configured to transmit light having a wavelength outside the wavelength range.

7. The wearable augmented reality head-mounted display system of claim 1, wherein the CLC reflector is dynamically switchable to selectively present virtual images at multiple depth planes.

8. The wearable augmented reality head-mounted display system of claim 1, wherein the one or more waveguides are configured to propagate visible light under total internal reflection in a direction parallel to a major surface of the one or more waveguides and to outcouple the visible light in a direction normal to the major surface.

9. The wearable augmented reality head-mounted display system of claim 1, wherein the CLC reflector includes a plurality of cholesteric liquid crystal (CLC) lenses.

10. The wearable augmented reality head-mounted display system of claim 9, wherein the CLC reflector includes a plurality of switchable half-wave plates, each of the switchable half-wave plates being positioned adjacent a respective one of the CLC lenses.

* * * * *